US012715042B2

(12) United States Patent
Almeida

(10) Patent No.: US 12,715,042 B2
(45) Date of Patent: Aug. 25, 2026

(54) DISTORTION MITIGATION IN DIRECTED ENERGY DEPOSITION

(71) Applicant: Norsk Titanium AS

(72) Inventor: Pedro Almeida, Asker (NO)

(73) Assignee: Norsk Titanium AS, Hønefoss (NO)

( * ) Notice: Subject to any disclaimer, the term of this patent is extended or adjusted under 35 U.S.C. 154(b) by 0 days.

(21) Appl. No.: 18/974,668

(22) Filed: Dec. 9, 2024

(65) Prior Publication Data

US 2025/0187075 A1 Jun. 12, 2025

Related U.S. Application Data

(63) Continuation of application No. 16/952,559, filed on Nov. 19, 2020, now Pat. No. 12,162,069.

(Continued)

(51) Int. Cl.

| | |
|---|---|
| ***B22F 10/25*** | (2021.01) |
| ***B22D 23/00*** | (2006.01) |
| ***B22F 12/17*** | (2021.01) |
| ***B22F 12/30*** | (2021.01) |
| ***B22F 12/53*** | (2021.01) |

(Continued)

(52) U.S. Cl.

CPC ............ *B22F 10/25* (2021.01); *B22D 23/003* (2013.01); *B22F 12/17* (2021.01); *B22F 12/30* (2021.01); *B23K 37/003* (2013.01); *B23K 37/0435* (2013.01); *B33Y 10/00* (2014.12); *B33Y 30/00* (2014.12); *B22F 12/53* (2021.01)

(58) Field of Classification Search

CPC .......... B22F 10/25; B22F 12/17; B22F 12/30; B22F 12/53; B33Y 10/00; B33Y 30/00; B22D 23/003; B23K 37/003; B23K 37/0435

See application file for complete search history.

(56) References Cited

U.S. PATENT DOCUMENTS

| | | | |
|---|---|---|---|
| 4,090,697 | A | 5/1978 | Perrine |
| 4,321,310 | A | 3/1982 | Ulion et al. |

(Continued)

FOREIGN PATENT DOCUMENTS

| | | | |
|---|---|---|---|
| CN | 102762323 | A | 10/2012 |
| CN | 106662439 | A | 5/2017 |

(Continued)

OTHER PUBLICATIONS

Office Action for U.S. Appl. No. 16/952,559, mailed on Dec. 21, 2023, Almeida, "Distortion Mitigation in Directed Energy Deposition", 5 pages.

(Continued)

*Primary Examiner* — David H Banh

(74) *Attorney, Agent, or Firm* — Lee & Hayes, P.C.

(57) ABSTRACT

Provided are a curved clamping mold and systems and methods using the curved clamping mold for manufacturing objects, especially titanium and titanium alloy objects, by directed energy deposition. The methods include thermally pre-bending the substrate onto which the object is to be manufactured to form a pre-bent substrate, attaching the pre-bent substrate to a jig using the curved clamping mold as an underlying support, pre-heating the substrate, and forming the object on the pre-heated, pre-bent substrate using a directed energy deposition technique.

20 Claims, 19 Drawing Sheets

Related U.S. Application Data

(60) Provisional application No. 62/938,734, filed on Nov. 21, 2019.

(51) Int. Cl.

| | |
|---|---|
| ***B23K 37/003*** | (2025.01) |
| ***B23K 37/04*** | (2006.01) |
| ***B33Y 10/00*** | (2015.01) |
| ***B33Y 30/00*** | (2015.01) |

(56) References Cited

U.S. PATENT DOCUMENTS

| | | | | |
|---|---|---|---|---|
| 5,304,519 | A | 4/1994 | Jackson et al. | |
| 5,789,330 | A | 8/1998 | Kondo et al. | |
| 5,874,175 | A | 2/1999 | Li | |
| 6,387,539 | B1 | 5/2002 | Subramanian | |
| 6,390,115 | B1 | 5/2002 | Rohwer et al. | |
| 6,998,064 | B2 | 2/2006 | Gadow et al. | |
| 7,381,364 | B2 | 6/2008 | Yamashita | |
| 9,555,475 | B2 | 1/2017 | Sidhu et al. | |
| 9,950,476 | B2 | 4/2018 | Nguyen et al. | |
| 12,048,965 | B2 | 7/2024 | Almeida et al. | |
| 2004/0040653 | A1 | 3/2004 | Nuzzo et al. | |
| 2006/0161421 | A1 | 7/2006 | Kissell | |
| 2006/0248718 | A1 | 11/2006 | Szela et al. | |
| 2008/0190888 | A1 | 8/2008 | Heejoon et al. | |
| 2010/0034983 | A1 | 2/2010 | Fuwa et al. | |
| 2014/0290309 | A1* | 10/2014 | Chang | C03B 23/0352 65/106 |
| 2014/0367894 | A1 | 12/2014 | Kramer et al. | |
| 2015/0029369 | A1* | 1/2015 | Nagata | H10F 39/806 348/294 |
| 2015/0209908 | A1 | 7/2015 | Peters et al. | |
| 2015/0306665 | A1 | 10/2015 | Sidhu et al. | |
| 2016/0108483 | A1 | 4/2016 | Meyer et al. | |
| 2017/0173891 | A1 | 6/2017 | Bosveld et al. | |
| 2017/0207193 | A1 | 7/2017 | Bower et al. | |
| 2017/0323915 | A1* | 11/2017 | Tanaka | H04N 1/028 |
| 2017/0326681 | A1 | 11/2017 | Sidhu et al. | |
| 2017/0333990 | A1 | 11/2017 | Garry | |
| 2018/0072606 | A1* | 3/2018 | Chou | C22C 19/055 |
| 2018/0326670 | A1 | 11/2018 | Peters | |
| 2019/0001437 | A1 | 1/2019 | Mathisen et al. | |
| 2019/0061061 | A1 | 2/2019 | Fischer et al. | |
| 2019/0283161 | A1 | 9/2019 | Yun et al. | |
| 2021/0022470 | A1 | 1/2021 | Chu | |
| 2021/0154732 | A1 | 5/2021 | Almeida | |
| 2021/0276096 | A1 | 9/2021 | Almeida | |
| 2025/0065404 | A1 | 2/2025 | Almeida | |

FOREIGN PATENT DOCUMENTS

| | | | |
|---|---|---|---|
| CN | 108393628 | A | 8/2018 |
| CN | 112536542 | A | 3/2021 |
| GB | 2491472 | A | 12/2012 |
| GB | 2550855 | A | 12/2017 |
| JP | S5542129 | A | 3/1980 |
| JP | WO2011102382 | A1 | 6/2013 |
| JP | 2017144446 | A | 8/2017 |
| JP | 2017160485 | A | 9/2017 |
| JP | 2018134797 | A | 8/2018 |
| KR | 20180124542 | A | 11/2018 |
| WO | WO2016102876 | A1 | 6/2016 |
| WO | WO2018153656 | A1 | 8/2018 |
| WO | WO2020128169 | A1 | 6/2020 |

OTHER PUBLICATIONS

Office Action for Chinese Application No. 2020800810905, Dated Dec. 16, 2024, 14 pages.
Office Action for Chinese Application No. 2020800810905, Dated May 22, 2025, 16 pages.
Office Action for Chinese Application No. 2020800810905, Dated May 27, 2024, 9 pages.
Office Action for Japanese Application No. 2022-529819, Dated Jan. 28, 2025, 6 pages.
Office Action for Japanese Application No. 2022-529819, Dated Sep. 9, 2025, 6 pages.
Office Action for U.S. Appl. No. 18/760,595, mailed on Jan. 16, 2025, Almeida, "Distortion Mitigation in Directed Energy Deposition", 5 pages.
Office Action for U.S. Appl. No. 17/303,176, mailed on Feb. 16, 2023, Almeida, "Distortion Mitigation in Directed Energy Deposition", 10 Pages.
Office Action for U.S. Appl. No. 16/952,559, mailed on Mar. 3, 2023, Almeida, "Distortion Mitigation in Directed Energy Deposition", 6 pages.
The International Preliminary Report on Patentability for PCT Application No. PCT/EP20/82678, mailed Jun. 2, 2022, 10 pages.
PCT International Preliminary Report on Patentability mailed Aug. 18, 2023 for PCT Application No. PCT/US22/14879, 22 pages.
PCT Search Report and Written Opinion mailed Feb. 2, 2021 for PCT application No. PCT/EP20/82678, 16 pages.
PCT Search Report and Written Opinion mailed Apr. 11, 2023 for PCT Application No. PCT/EP2021/063608, 47 pages.
The International Search Report and Written Opinion for PCT Application No. PCT/EP2021/063608, mailed Mar. 24, 2022.
Examination Report for Singapore Application No. 11202205318Q, Dated Jan. 14, 2025, 8 pages.
Office Action for Korean Application No. 10-2022-7020561, Dated Sep. 25, 2025, 8 pages.
Search Report for Singapore Application No. 11202308556V, dated Oct. 10, 2025, 6 pages.
Examination Report for Canadian Application No. 3,160,960, Dated Jan. 22, 2026, 5 pages.
Office Action for Korean Application No. 10-2023-7043882, dated Feb. 11, 2026, 8 pages.
Examination Report for Australian Application No. 2020388435, Dated Nov. 6, 2025, 3 pages.
Notice of Allowance, for Japanese Patent Application No. 2022-529819, mailed by the Japenese Patent Office on May 19, 2026, with machine generated English translation, 8 pages.

* cited by examiner

DISTORTION MITIGATION IN DIRECTED ENERGY DEPOSITION

CROSS-REFERENCE TO RELATED APPLICATIONS

This application is a continuation of U.S. patent Ser. No. 16/952,559, filed Nov. 19, 2020, which claims priority to and the benefit of U.S. Provisional Patent Application Ser. No. 62/938,734, filed Nov. 21, 2019, the entire contents of which are incorporated herein by reference in their entirety.

This application is related to International PCT Application No. PCT/EP2020/082678, filed Nov. 19, 2020, which also claims priority to U.S. Provisional Application Ser. No. 62/938,734. The subject matter of the above-noted International application is incorporated by reference in its entirety.

FIELD OF THE INVENTION

The present invention relates to a device and method for mitigating distortion in metal objects manufactured using a directed energy deposition additive manufacturing process, also known as solid freeform fabrication, especially in titanium and titanium alloy objects.

BACKGROUND OF THE INVENTION

Related Art

Structural metal parts, such as those made of titanium or titanium alloys, are made by conventional manufacturing methods such as casting, forging or machining from a solid billet. These techniques have a disadvantage of high material waste of the expensive titanium metal that often is machined away, and large lead times associated with the fabrication of the metal part.

Fully dense physical objects can be made by a manufacturing technology known as Directed Energy Deposition (DED), rapid prototyping, rapid manufacturing, layered manufacturing, additive layer manufacturing, shaped metal deposition or additive manufacturing. DED of metals is an additive manufacturing process in which focused thermal energy is used to fuse materials by melting as they are being deposited. Additive manufacturing offers great fabrication freedom and potential cost-savings due to the layered build-up of near-net-shape products. Also it is desirable to match the material properties of conventional bulk forming processes such as forging while utilizing the same established metal alloys. DED is used for repair, rapid prototyping and low/high volume part fabrication.

DED systems include multiple categories of machines using one or a combination of DED energy sources, such as laser beam (LB), electron beam (EB), or arc-based energy sources such as plasma arc (PA), gas tungsten arc (GTA) and gas metal arc (GMA). The metal feedstock used in DED systems typically includes metal in the form of a powder and/or wire. DED typically is performed under an inert gas (e.g., DED using arc-based or LB systems) or in a vacuum (EB systems) atmospheres. Although these are the predominant methods employed in practice, the use of other energy sources, feedstocks and atmospheres can be used in any combination.

Residual stresses can be defined as self-equilibrating stresses which exist in an elastic body even in absence of external loads, such as thermal and/or mechanical. Owing to localized heat and cooling cycling, as the thermal source melts a metal material and deposits each new metal layer and re-melts previously solidified metal layers, large amounts of welding-induced residual stress can arise and accumulate during DED of metal preforms. The incompatible elastic and/or plastic strain field involved in DED of metals, caused by non-uniform thermal loading near the processing region, leads to an inevitable build-up of complex thermally induced residual stresses and distortion during layer upon layer fabrication. Thermal expansion and contraction can occur as a result of transient thermal excursions and steep thermal gradients that can be present during DED. The formation and relaxation of residual stresses during DED of metals can cause unwanted plastic deformation in areas bordering the processing zone, which can carry over to the as-deposited preform. The residual stress locked in the as-deposited DED preform can lead to permanent loss of tolerance in the workpiece, because the workpiece self-equilibrates the residual stress field that still exists in the structure when released from the clamping fixture platform or jig. Residual stress-induced deformation is of greater concern for larger components, since larger temperature differentials coexist along the DED build up process. Adverse distributions of residual stress in engineered components also can lead to unexpected or premature failure, i.e. in areas of high tensile stresses prone to fracture and fatigue. Stress relieve heat treatment is commonly used to relieve stresses that remain locked in the as-deposited preform due to the DED manufacturing sequence. Tolerance loss remains however one of the primary concerns in most DED processes.

Residual stress during DED of metals typically results from the fact that different areas of a component being manufactured experience different cycles of thermal expansion and contraction. The resulting thermal stress can cause a non-uniform distribution of irreversible material deformation, and some of this deformation can remain after the material has cooled, resulting in an internal and completely self-equilibrating stress field in the workpiece. This self-equilibration can result in metal structures that are geometrically out of tolerance due to distortion or warping. All forms of DED processing involve a large amount of localized heat delivery to the top of the new deposited layer (exposed to the thermal source), the interface between the newly deposited and the previous layer, and/or the substrate for achieving appropriately fused interfaces.

Typically, a thermal source with high heat concentration is used in a DED manufacturing process to generate rapid heating. The heat generated can cause thermal dilation of material, accompanied by a gradual decrease in yield strength. The heat generated by the thermal source is utilized to melt the powder and/or wire feedstock and to create a weld pool in a portion of the workpiece. This locally applied energy causes the welding area to heat up sharply relative to the surrounding area which remains at relatively low temperature throughout, causing it to fuse locally. Because molten material will not support a load, stress underneath the thermal source is close to zero. At a short distance from the area of energy application, i.e. material in the immediate vicinity of the melt pool and in underlying build layers, the material expands as a result of being heated, but is restricted by the adjacent and underlying colder material, inducing elastic compressive strains. As a consequence, stresses in adjacent areas from the thermal source are compressive. Since the temperatures in adjacent areas of the thermal source are high and the material's yield strength low, stresses in these areas can be as high as the yield strength of the material at corresponding temperatures. As the thermal energy source travels away from the area of energy application, the heated molten material cools and contracts as a solid, but the contracting metal is mechanically inhibited by the adjacent and underlying layers of material. Upon continued cooling, residual stresses within the object are distributed, typically exhibiting large tensile stresses at the top layer, where the material was prevented from contracting, and balancing compressive stresses below. In some applications, the tensile stress developing at the top layer can approach the magnitude of the yield strength of the material. For the balancing compressive forces, if the distortion and compressive loads they include exceed the critical buckling load, buckling of the metal structural members can occur.

Due to the layer-by-layer nature of DED processes, the differences in heating and cooling loads imposed by each successive layer will cause a spatial competition between material expansion and contraction, ultimately resulting in the accumulation of residual stress in the object being produced. Because hot layers of molten metal are deposited on the previous cooler layer of the object being built, there can be a large thermal gradient and significant contraction locally as the heat from the thermal source travels across the workpiece, introducing residual stresses into the workpiece caused by incompatible strain fields. The longitudinal and transverse shrinkage that occurs during solidification of layer upon layer can amplify the buildup of residual stresses within the as-deposited preform. The stresses can be a function of tensile modulus of the material, the coefficient of thermal expansion, and percent shrinkage upon cooling. If the stresses resulting from these incompatible strains remain in the finished object and are not relieved, the residual stresses can combine and react to produce internal forces that cause unwanted distortion of the object, such as bending, buckling and rotation of the object. The residual stresses that can be formed during conventional additive manufacturing processes are sometimes large enough to cause significant distortion, mismatch, tearing or formation of stress-induced cracks in the additively manufactured object (see FIGS. 1A-1H).

Methods are known in the art for measuring, or modeling to predict, stress induction in a formed product (e.g., see U.S. Pat. No. 9,555,475 (Sidhu et al. (2017); U.S. Pat. No. 9,950,476 (Nguyen et al. (2018)). Prior techniques developed to address these shortcomings have met with limited success. For example, post-weld high pressure mechanical rolling for plastically deforming consolidated material before formation of a subsequent layer has been used (see, e.g., Colegrove et al., UK Patent Application GB2491472 (2012). Peening processes, such as those taught in and U.S. Pat. App. Pub. Nos. US2017/0326681 (Sidhu et al. (2015)) are taught to be useful in mitigating distortion for each metal layer deposited during the building of additive layer manufactured parts. In these processes one or more impact treatment devices are used to peen or strike a common point on the workpiece to plastically deform at least a part of a deposited layer after it has cooled. Each impact treatment device may strike the workpiece one or more times, and can strike at a frequency of up to 20 Hz. Laser peening also has been used to impart residual compressive stress into a workpiece (see U.S. Pat. App. Pub. No. US2014/0367894 Kramer et al. (2014)). These methods are not suitable for complex shaped pieces to relieve residual stress in areas that cannot be accessed by the peening or rolling tools. They also can increase the time and complexity for manufacturing a workpiece, and thus can be overly costly or impractical to utilize.

These methods also can increase waiting times between layers, which can negatively affect productivity and potentially limit fabrication freedom. Excessive cooling between layer deposition also can increase the temperature differential between layers and further exacerbate residual stress development. For the methods that physically work the deposited layer, contaminations from tooling also will be a concern since any contaminations can get enclosed between layers of the final product in an additive process.

Accordingly, there exists a need in this art for an economical method of performing direct metal deposition at a rate of metal deposition in an additive manufacturing system that yields metal products having reduced or minimized residual stress, or distortion, or both, than is achieved in traditional additive manufacturing processes. It would be desirable to provide DED processes that reduce the incidence of residual stresses or cracking in the DED manufactured object. It also would be desirable to provide DED processes that reduce the incidence of local distortion of the object being manufactured as additional metal layers are deposited.

SUMMARY OF THE INVENTION

Accordingly, embodiments provided herein are directed to production of workpieces having reduced or minimized residual stress, or distortion, or both using additive manufacturing processes that substantially obviates one or more of the problems due to limitations and disadvantages of the related art. As embodied and broadly described, provided are devices, systems and methods to reduce or minimize residual stress or distortion or both during metal additive manufacturing to achieve products with improved material quality. DED manufactured products having these reductions in residual stress or distortion demonstrate increased strength, fatigue resistance, and durability. The devices, system and methods provided can increase throughput and yield of DED formed products, and yield workpieces within specified tolerances.

Because the methods provided herein can reduce or eliminate residual stress or distortion or both, the methods can be used to fabricate DED formed components of a medium to large size (e.g., up to 3 m), which cannot easily be produced using conventional additive manufacturing processes. In addition, because of the reduction or elimination of the typical large amounts of residual stress, distortion or a combination thereof in conventional DED metal structure, manufactured metal structures can be produced that are geometrically within tolerances and specifications.

Because residual stress and distortion often can be seen as key barriers for mainstream acceptance of DED technologies for metals, particularly in safety-critical applications, the devices, systems and methods provided herein that can minimize residual stress or distortion can open new markets or engender wider acceptance of DED produced components. Devices, systems and methods provided herein also can result in effective control over residual stress and distortion in DED metal structures so that material utilization efficiencies of both substrate and DED material can be improved. These improvements in material utilization, in conjunction with production of DED produced products within tolerances, can result in less waste and reworking, which can significantly reduce DED manufacturing costs.

Provided are methods for DED manufacturing that include pre-bending a metallic substrate to form a plastically pre-bent substrate prior to DED of single-sided metallic structures. Also provided are methods for DED manufacturing that include pre-bending a metallic substrate to form a plastically pre-bent substrate and pre-heating the pre-bent substrate prior to DED of metallic structures. Also provided is an apparatus for manufacturing components having reduced residual stress and distortion by DED. The apparatus can be used with conventional DED energy supply sources used to melt a metal powder and/or wire feedstock. The apparatus includes a curved clamping mold as an underlying support structure for a plastically pre-bent substrate. Also provided are systems using conventional DED energy supply sources modified using CAD-CAM program instructions that when executed cause the DED process to follow the shape of the underlying curved clamping mold.

Provided are methods for DED manufacturing that minimize or prevent distortion in a DED manufactured product. This can increase the efficiency of the manufacturing process, such as by minimizing waste of substrate and the amount of deposited material that must be used. In particular, because the highest thermally induced stress fields can be introduced in the first deposited layers, and the distortion effect can particularly be seen in the substrate, methods provided herein can conserve substrate material sacrificed or lost in conventional additive manufacturing processes. The methods can result in improved material utilization efficiencies of both substrate and DED material compared to conventional methods. Methods provided herein can provide effective control over residual stress and distortion in DED structures. This can lead to reducing material waste, buy-to-fly or BTF ratios can be driven close to unity. Reducing material waste, as well as reducing or eliminating rework time, can significantly reduce cost of manufacture.

Provided is a curved clamping mold. The curved clamping mold includes a first side that includes two or more cavities separated by one or more than one stiffening member, and a rim having a flat surface around a perimeter of the first side; a second side opposite of the first side, the second side having a curved surface and including knurls or corrugations. The curved clamping mold can include a ceramic coating. The stiffening member can maintain mold rigidity or can provide mold deformation resistance or both. The curved clamping mold can include or be made out of a non-magnetic metal. The curved clamping mold can include or be made out of a metal having a melting point of 1350° C. or greater. The curved clamping mold can include or be made out of a metal that is or includes an austenitic stainless steel. The austenitic stainless steel can include carbon, chromium, copper, manganese, molybdenum, nickel, nitrogen, phosphorus, silicon or a combination of any two or more thereof. The austenitic stainless steel can include at least 18% chromium. The austenitic stainless steel can be a 300 series stainless steel. The austenitic stainless steel can include a 304 stainless steel, a 309 stainless steel, a 310 stainless steel, a 316 stainless steel, a 318 stainless steel, a 321 stainless steel or a 330 stainless steel or a combination thereof.

The ceramic coating of the curved clamping mold can be applied to any one or more surfaces. The ceramic coating can include zirconium dioxide, zirconium dioxide stabilized by addition of yttrium oxide, yttrium aluminum oxide, alkaline earth metal silicates, $ZrV_2O_7$, $Mg_3(VO_4)_2$ or a combination thereof. The ceramic coating can include $ZrO_2$ $8Y_2O_3$. The ceramic coating can have a thickness of 0.1 mm to about 5 mm. The curved clamping mold can include a nominal mold deflection of from about 3 mm to about 35 mm. The curved clamping mold can include a bond coat onto which the ceramic coating is applied. The bond coat can be between a surface of the curved clamping mold and the ceramic coating.

Also provided is a directed energy deposition method for producing a metal workpiece. The method can include pre-bending a substrate of a metal material with thermal energy by forming a plurality of melting tracks on a first surface of the substrate using a first melting tool to produce a pre-bent substrate; using the curved clamping mold described herein as an underlying support structure to support the pre-bent substrate when it is secured to a jig, and securing the pre-bent substrate and the curved clamping mold supporting the pre-bent substrate to the jig using a plurality of clamps. After the pre-bent substrate and the curved clamping mold are secured to the jig, the method includes forming the metal workpiece on a second surface of the substrate by an additive manufacturing process that can a) deposit a layer of molten metal on the second surface of the substrate to form a base material and deposits subsequent layers of molten metal on the base material to form the workpiece; or b) deposit a layer of metal powder and melts the metal powder on the second surface of the substrate to form a base material, and deposits subsequent layers of metal powder and melts the powder on the base material to form the workpiece, where the second surface of the substrate is opposite the first surface of the substrate. The method can include pre-heating the pre-bent substrate while secured to the jig to a temperature of about 400° C. to about 900° C. by applying thermal energy to the second side of the substrate. The pre-bending the substrate can include inducing thermal gradients in the substrate. In the methods, a melting tool that includes a thermal source selected from among a laser beam, an electron beam, a plasma arc, a gas tungsten arc, a gas metal arc and any combination thereof can be used. During the pre-bending the first surface of the substrate, an area of application of thermal energy can reach a temperature that is a melting point of the metal material, or a temperature from about 5° C. to about 50° C. less than or greater than the melting point of the metal material. During the pre-bending of the first surface of the substrate, formation of the melting tracks can result in formation of tensile stress at a centerline of each of the melting tracks and formation of a compressive stress in an area away from the centerline of each of melting tracks upon cooling of the substrate. The tensile stress at the centerline of the melting track can be within about 10% of a yield strength of the substrate. The tensile stress at the centerline of the melting track can exceeds the magnitude of a yield strength of the substrate.

The pre-bending step can include directing a cooling gas toward the melting tracks using a gas jet device to accelerate cooling of the melting track. Directing the cooling gas toward the melting tracks can form a thermal gradient in the substrate, and can impart a residual stress in the substrate upon cooling. The gas jet device can direct the cooling gas toward of the melting tracks at a rate from about 50 L/min to about 500 L/min. The cooling gas can be applied in a constant stream, or applied intermittently, or applied in a pulsed flow. The cooling gas can include an inert gas selected from among argon, helium, neon, xenon, krypton and combinations thereof. The cooling gas can be applied at a temperature 100° C. or less. The cooling gas can be applied at a temperature of 25° C. or less. The gas jet device can produce a turbulent flow of the cooling gas, a laminar flow of the cooling gas, or a combination of a turbulent flow and laminar flow of the cooling gas. The gas jet device can include a plurality of nozzles, and the nozzles can direct the cooling gas in a direction away from the thermal source of the melting tool, and at least one nozzle can direct the cooling gas to an as-solidified metal of the melting track.

In the methods provided herein, the melting tracks can be produced equidistant from each other. The distance between the melting tracks can be from about 10 mm to about 60 mm. The method can include determining a centerline of each wall of a preform that is to be formed on the second surface of the substrate; and positioning the melting tracks on the first surface of the substrate from about 10 mm to about 20 mm away from the centerlines of the majority of walls of the preform or workpiece to be formed on the second surface of the substrate. A majority of the melting lines can be formed on the first surface at one or more locations other than those corresponding to one or more areas occupied by of one or more walls of the workpiece to be formed on the second side of the substrate.

In the methods, the pre-bending can form a pre-bent substrate having a uniform elasto-plastic bend. The pre-bending of the substrate can be performed while the substrate is clamped to a jig and thermally insulated from the jig. The substrate can be clamped to the jig using a plurality of clamps, where one or more of the clamps can include an insulating coating on each surface that comes into contact with the pre-bent substrate. The insulating coating can include a ceramic material, a silicon carbide, a silicon nitride, a boron carbide or a combination thereof. The ceramic material can include an alumina, a zirconia, titanium oxide, an alkaline earth metal silicate, an aluminum titanate, a zirconium dioxide, a zirconium dioxide stabilized by addition of yttrium oxide, a yttrium aluminum oxide, $ZrV_2O_7$, $Mg_3(VO_4)_2$ or a combination thereof. The thickness of the insulating coating can be from 0.1 mm to 5 mm. The clamps can include a knurling pattern or corrugation on a surface in contact with the pre-bent substrate. The clamps can be tightened to bring the pre-bent substrate into full contact with the underlying curved clamping mold. Each of the clamps can be tightened to a torque of from about 10 N·m to about 100 N·m. The clamps can be positioned so that the clamps meet at a start or an end of a wall of the workpiece being produced.

In the methods provided herein, the pre-heating of the pre-bent substrate can be done using one or more melting tools including a DED thermal source under conditions that a) form melting tracks but do not melt the surface of the pre-bent substrate; or b) form melting tracks and melt the surface of the pre-bent substrate at the melting tracks. Positioning of the melting tool can be at a standoff position greater than a standoff position used for forming the workpiece.

The methods can include pre-heating the pre-bent substrate, which includes a first short edge and an opposite second short edge, and a first long edge and an opposite second long edge, by a) positioning a melting tool comprising a DED thermal source at the first short edge and within about 10 mm to about 60 mm of the first long edge of the pre-bent substrate secured to the jig; b) applying the thermal energy form the DED thermal source of the melting tool across the surface of the pre-bent substrate starting at the first short edge and across the surface to the second opposite short edge to form a first line of energy application to the surface; c) repositioning the DED thermal source of the melting tool to the first short edge and displaced a distance of about 10 mm to about 60 mm from the first line of energy application and toward the second long edge; and d) repeating steps b) and c) until lines of energy application are applied across the surface of the pre-bent substrate to a position from about 10 mm to about 60 mm from the second opposite long edge. The pre-heating can raise the temperature of the pre-bent substrate to a temperature of about 350° C. to about 650° C.

The forming of the metal workpiece can include providing a metallic material in the form of a wire; using a single melting tool to heat and melt the metallic material such that molten metallic material is deposited onto an area of the substrate to form a base material; moving the base material relative to a position of the melting tool in a predetermined pattern such that the successive deposits of molten metallic material onto the base material solidifies and forms the three-dimensional object.

The forming of the metal workpiece can include a) providing a metallic material in the form of a wire; b) using a first melting tool to heat at least a portion of a surface of the substrate to form a preheated area on the substrate; c) using a second melting tool to heat and melt the metallic material such that molten metallic material is deposited onto the preheated area to form a base material; d) moving the base material relative to a position of the first melting tool and second melting tool in a predetermined pattern; e) using the first melting tool to heat at least a portion of a surface of the base material to form a preheated area on the base material and depositing molten metallic material produced by the second melting tool melting the metallic material onto the preheated area on the base material; and f) repeating steps d) and e) such that the successive deposits of molten metallic material onto the preheated areas on the base material solidifies and forms the three-dimensional object.

The methods can include using a gas jet device to direct a cooling gas to impinge upon a surface of the as-solidified material adjacent to the liquid-solid boundary of the molten metallic material, or any combination thereof; and moving the base material relative to the position of the melting tool(s) and the gas jet device in a predetermined pattern such that the successive deposits of molten metallic material solidifies and forms the three-dimensional object. The first melting tool can include a PTA torch, a laser device, a coaxial powder feed nozzle laser system, an electron beam device, or any combination thereof, and the second melting tool can include a PTA torch, a laser device, a coaxial powder feed nozzle laser system, an electron beam device, or any combination thereof. The first melting tool can include a first PTA torch and the second melting tool can include a second PTA torch. The first melting tool can include laser device and the second melting tool can include a PTA torch. The first melting tool can include a PTA torch and the second melting tool can include a laser device. The first melting tool can include a coaxial powder feed nozzle laser system and the second melting tool can include a laser device. The first melting tool can include a coaxial powder feed nozzle laser system and the second melting tool can include a PTA torch. The first melting tool can include a PTA torch and the second melting tool can include an electron beam device. The first melting tool can include an electron beam device and the second melting tool can include a PTA torch. The first melting tool can include an electron beam device and the second melting tool can include a laser device. The first melting tool can include laser device and the second melting tool can include an electron beam device. When the second melting tool includes a PTA torch, the PTA torch can be electrically connected to a direct current power source such that an electrode of the PTA torch becomes the cathode and the metallic material can be a consumable electrode that becomes the anode.

In the methods provided herein, every step of the methods, including each of pre-bending the substrate, pre-heating the pre-bent substrate, and forming the metal workpiece, can be performed within a closed chamber containing an inert atmosphere. The inert atmosphere can include argon, neon, xenon, krypton, helium or a combination thereof.

Also provided is a system for directed energy deposition. The system can include a jig for securing a pre-bent substrate; a curved clamping mold as described herein to be positioned between the jig and when the pre-bent substrate is secured to the jig; insulated clamps for securing the pre-bent substrate to the jig; one or more melting tools comprising a DED thermal source to melt a source of metal into metallic molten material that is deposited on a surface of a base material; a gas jet device to direct a cooling gas to impinge upon the as-solidified material adjacent to the liquid-solid boundary of the liquid molten pool, or any combination thereof, a supply of the cooling gas; and an actuator for positioning and moving the base material relative to the melting tool and the gas jet device.

Additional features and advantages of the embodiments described herein will be set forth in the description which follows, and in part will be apparent from the description, or may be learned by practice of the invention. The objectives and other advantages of the exemplary embodiments will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1A:
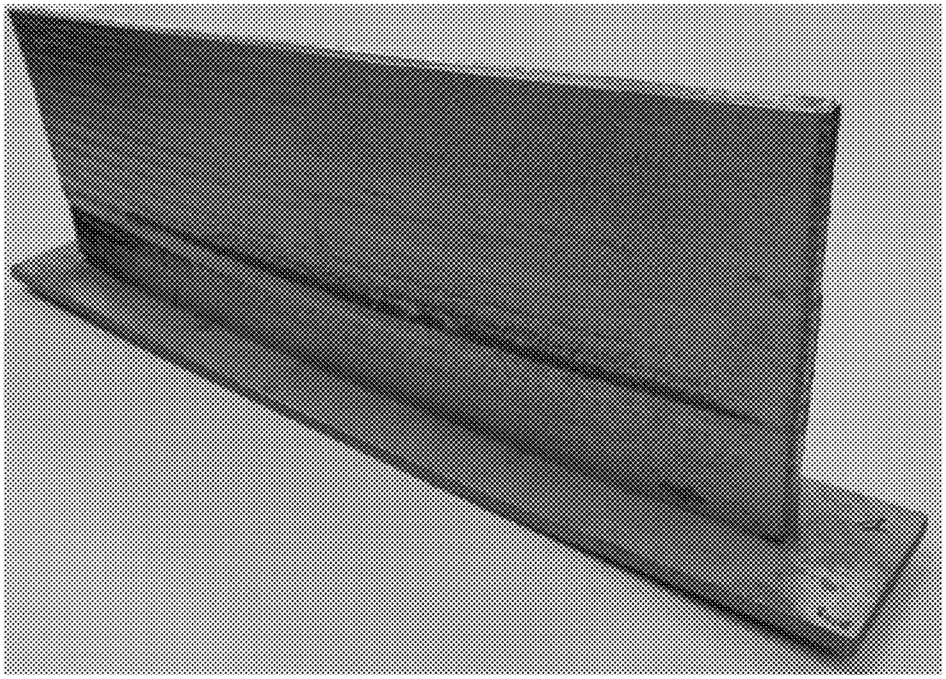
FIG. 1A is a photograph of a workpiece produced using conventional DED additive manufacturing without stress mitigation.

Reference will now be made in detail to an embodiment of the present invention, example of which is illustrated in the accompanying drawings.

A. Definitions

Unless defined otherwise, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety. In the event that there are a plurality of definitions for terms herein, those in this section prevail.

As used herein, the singular forms "a," "an" and "the" include plural referents unless the context clearly dictates otherwise.

As used herein, ranges and amounts can be expressed as "about" a particular value or range. "About" also includes the exact amount. Hence "about 5 percent" means "about 5 percent" and also "5 percent." "About" means within typical experimental error for the application or purpose intended.

As used herein, "optional" or "optionally" means that the subsequently described event or circumstance does or does not occur, and that the description includes instances where the event or circumstance occurs and instances where it does not. For example, an optional component in a system means that the component may be present or may not be present in the system.

As used herein, a "combination" refers to any association between two items or among more than two items. The association can be spatial or refer to the use of the two or more items for a common purpose.

As used herein, the terms "comprising", "including" and "containing" are synonymous, and are inclusive or open-ended. Each term indicates that additional, unrecited elements or method steps optionally can be included.

As used herein, "and/or," means "either or both" of the elements so conjoined, i.e., elements that are conjunctively present in some cases and disjunctively present in other cases. Multiple elements listed with "and/of" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "additive manufacturing" is also known as "additive fabrication" and "additive layer manufacturing" and "solid free form fabrication" and "shaped metal deposition" and "layered manufacturing" and refers to an additive process implementing the manufacturing, layer after layer, of an object. The process can employ a 3D model data, a metal feedstock source, such as wire or powder, a thermal source (such as a plasma arc, laser or electron beam) to melt the metal source, or a combination thereof.

As used herein, "additive manufacturing system" refers to the system used for additive manufacturing.

As used herein, "Directed Energy Deposition" or "DED" refers to an additive manufacturing process in which a thermal source is used to fuse materials, particularly metals, by melting as they are being deposited.

The term "plasma transferred arc torch" or "PTA torch" as used interchangeably herein refers to any device able to heat and excite a stream of inert gas to plasma by an electric arc discharge and then transfer the flow of plasma gas including the electric arc out through an orifice (such as a constricting nozzle) to form a highly collimated arc column of ionized plasma gas that exits the nozzle orifice at high speed and transfers the intense heat of the arc to a target region, such as a metal wire or a substrate.

The term "metallic material" as used herein refers to any known or conceivable metal or metal alloy which can be employed in a directed energy deposition process to form a three-dimensional object. Examples of suitable materials include, but are not limited to titanium and titanium alloys such as i.e. Ti-6Al-4V alloys.

As used herein, a "thermal source" refers to a part of a device from which thermal energy can be transferred to a metallic material, such as a metal wire or metal powder, or to a substrate or base material, or any combination thereof. Exemplary thermal sources include a plasma arc, a laser beam, and an electron beam.

As used herein, a "melting tool" refers to a device that produces a thermal source for pre-heating or melting a metallic material or a portion of a surface of a workpiece or both in a DED additive manufacturing process. Examples include a PTA torch that produces an electric arc plasma as a thermal source, a laser device that produces a laser beam as a thermal source, and an electron beam device that produces an electron beam as a thermal source.

The term "base material" as used herein refers to the target material onto which molten metal is to be deposited to form a workpiece. This will be the substrate when depositing the first layer of metallic material. When one or more layers of metallic material have been deposited onto the substrate, the base material will be the upper layer of deposited metallic material onto which a new layer of metallic material is to be deposited.

As used herein, the term "workpiece" refers to a metal body or object being produced using directed energy deposition.

The term "computer assisted design model" or "CAD-model" as used interchangeably herein refers to any known or conceivable virtual three-dimensional representation of the object that is to be formed which can be employed in the DED system to regulate the position and movement of the substrate and to operate the DED thermal source and source of metallic material, such as a metal powder supply or metal wire feeder, such that a physical object is built by fusing successive deposits of the metallic material onto the substrate in a pattern which results in building a physical object according to the virtual three-dimensional model of the object. This may, for instance, be obtained by forming a virtual vectorized layered model of the three-dimensional model by first dividing the virtual three-dimensional model into a set of virtual parallel layers and then dividing each of the parallel layers into a set of virtual quasi one-dimensional pieces. Then, the physical object can be formed by engaging the controller to deposit and fuse a series of quasi one-dimensional pieces of the metallic material feed onto the substrate in a pattern according to the first layer of the virtual vectorized layered model of the object.

Then, repeating the sequence for the second layer of the object by depositing and fusing a series of quasi one-dimensional pieces of the weldable material onto the previous deposited layer in a pattern according to the second layer of the virtual vectorized layered model of the object. Repetition continues the deposition and fusing process layer by layer for each successive layer of the virtual vectorized layered model of the object until the entire object is formed. However, the invention is not tied to any specific CAD-model and/or computer software for running the controller of the arrangement according to the invention, and nor is the invention tied to any specific type of controller. Any known or conceivable controller (CAD-model, computer software, computer hardware and actuators etc.) able to build metallic three-dimensional objects by directed energy deposition can be used.

As used herein, a "cooling gas" is a gas directed at the as-solidified surface, such as towards the melting tracks, to directly influence and accelerate cooling and solidification of the as-solidified metal. The temperature of the gas can be any temperature that cools the surface with which it interacts. The temperature can be less than 100° C., or less than 50° C., or less than 30° C., or less than 25° C., or less than 10° C., or less than 5° C., or less than 0° C. or in a range of from about −10° C. to about 100° C., or from about −5 C to about 90° C., or from about 0° C. to about 80° C. The temperature can be about 25° C. or less.

As used herein, "residual stresses" are stresses that would exist in a structure even if all external loads were removed due to residual strain inhomogeneity. Residual stresses typically are self-equilibrating.

As used herein, "jig" refers to a device used to hold or secure the workpiece, mold, and clamps in place during deposition. For example, a jig can include a tray, pedestal or platform to which a substrate or other part of a workpiece can be secured during the DED process.

As used herein, a "preform" is the workpiece produced by an additive manufacturing process. A preform can be an intermediate of the final finished part or a semi-finished part. The preforms can have a near-net shape to the final finished product, and can require some, if minimal, further processing. For example, a preform can require a final finish machining to high tolerance configurations.

As used herein, a "buy-to-fly ratio" or "BTF ratio" refers to the weight ratio of the weight of the raw material used to fabricate the component and the weight of the finished product. This ratio can depend on how close the shape of the initial as-deposited DED preform shape is relative to the shape of the finished component. The more material that needs to be removed from the DED preform in order to fabricate the final component, the higher the BTF ratio.

As used herein, the "length" or "length direction" with reference to a substrate, refers to the direction along the greatest of the three dimensions of the substrate.

As used herein, the "width" or "width direction" with reference to a substrate, refers to the direction along the second greatest of the three dimensions of the substrate, typically referring to a measurement from one short side to the other short side.

As used herein, the "thickness" or "thickness direction" with reference to a substrate, refers to the direction along the smallest of the three dimensions of the substrate.

As used herein, a "high-strength steel" refers to a steel having a tensile strength of 300 MPa or greater.

As used herein, a "high-strength low-alloy steel" refers to a steel having a tensile strength of 370 MPa or greater.

As used herein, an "ultra high-strength steel" refers to a steel having a tensile strength of 780 MPa or greater.

As used herein, a "warm forming temperature" is a temperature below a material's recrystallization temperature that maximizes the material's malleability without allowing re-crystallization, grain growth, or metallurgical fracture. Warm forming temperature can range from about 200° C. to about 850° C., depending on the material.

As used herein, a "hot forming temperature" is a temperature above a material's recrystallization temperature. Hot forming temperature can be in the range of about 600° C. to about 2000° C., depending on the material.

As used herein, "backside of the substrate" refers to a side of the substrate that during DED manufacturing faces away from the deposition apparatus. For example, the backside of the substrate can be directed toward the jig during deposition. The backside of the substrate is the side opposite of the side onto which deposition occurs.

As used herein, the "frontside of the substrate" refers to the side of the substrate facing the deposition apparatus. For example, the front side of the substrate can be the side onto which molten material is deposited during DED. The front side of the substrate can be the side on which the workpiece is formed by DED. The frontside of the substrate is the side reverse of the backside of the substrate.

As used herein, a "cavity" refers to any unfilled space or void within a mass that does not traverse the mass to form a hole. The cavity can be a hollowed-out space or carved-out space, or a space formed by adding additional material.

As used herein, the "nominal mold deflection" or "$h_{mold}$ (bow)" of the curved clamping mold is the difference between the maximum height of the bowed surface measured at the center of the bowed surface and the top surface of an edge of the curved clamping mold.

It should also be understood that, unless clearly indicated to the contrary, in any methods claimed herein that include more than one step or act, the order of the steps or acts of the method is not necessarily limited to the order in which the steps or acts of the method are recited.

B. Curved Clamping Mold

Figure 1B:
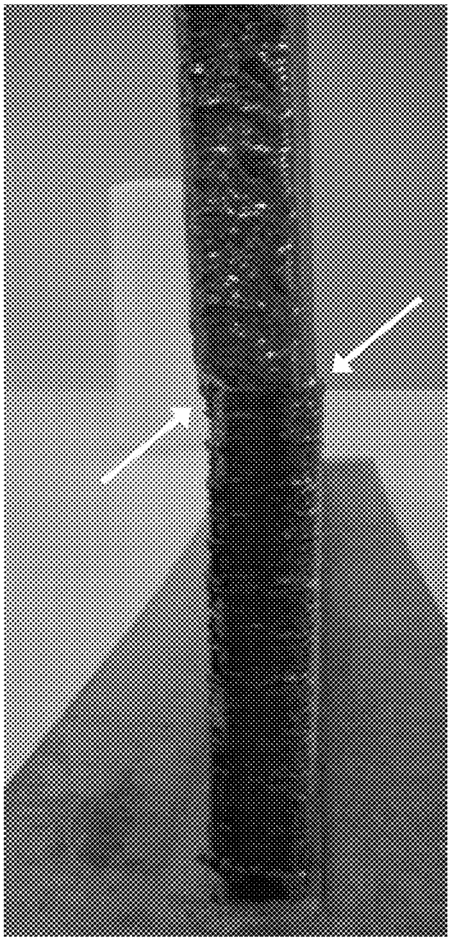
FIGS. 1B and 1C shows mismatch (the arrows point to the mismatched positions).
Figure 1C:
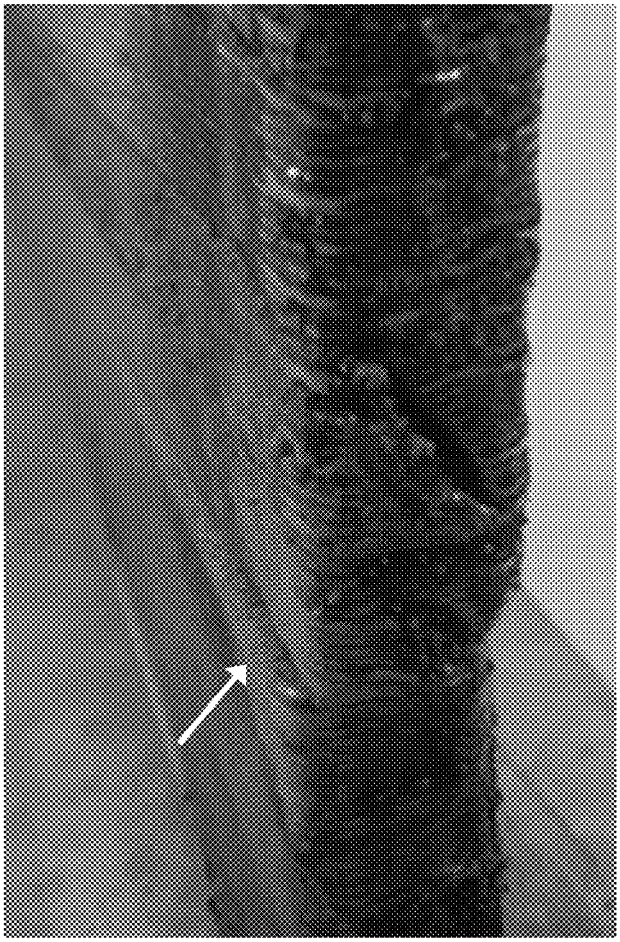
Figure 1D:
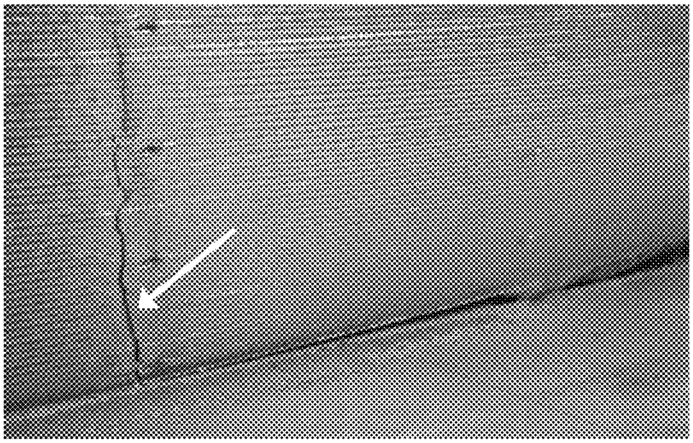
FIGS. 1D, 1E, and 1F show cracking of the workpiece (the arrows point to cracks).
Figure 1E:
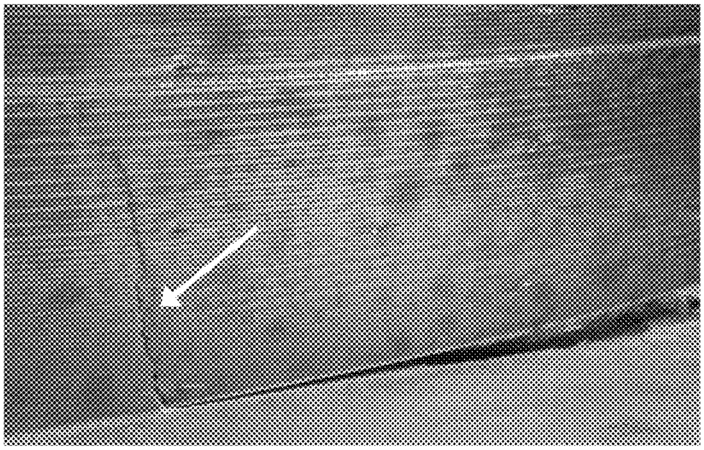
Figure 1F:
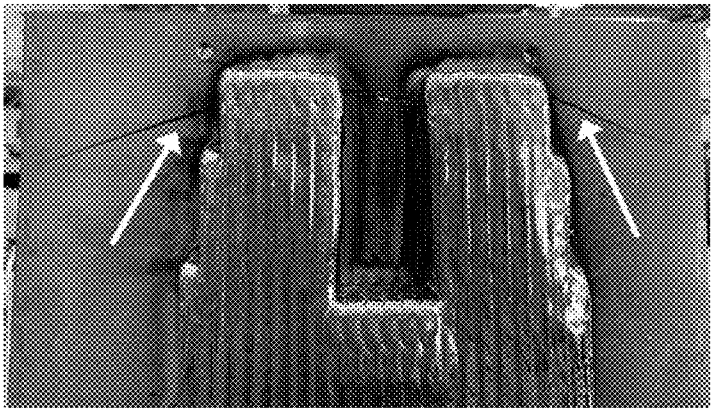
Figure 1G:
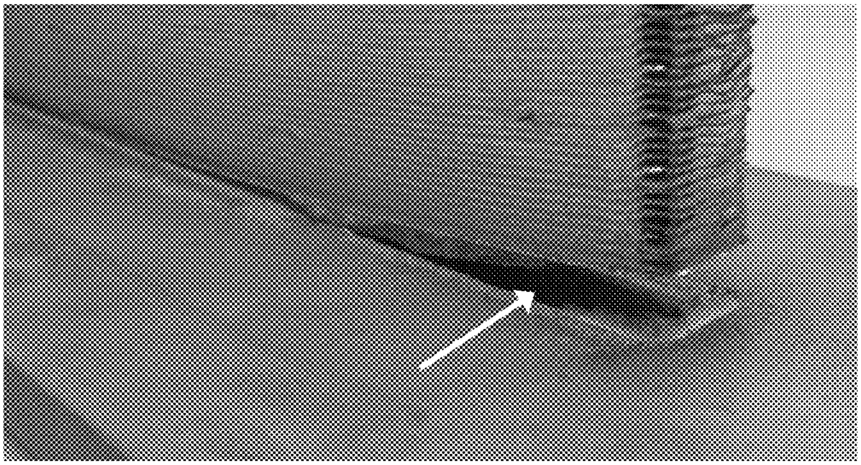
FIGS. 1G and 1H show tearing of the workpiece (the arrows point to the tears).
Figure 1H:
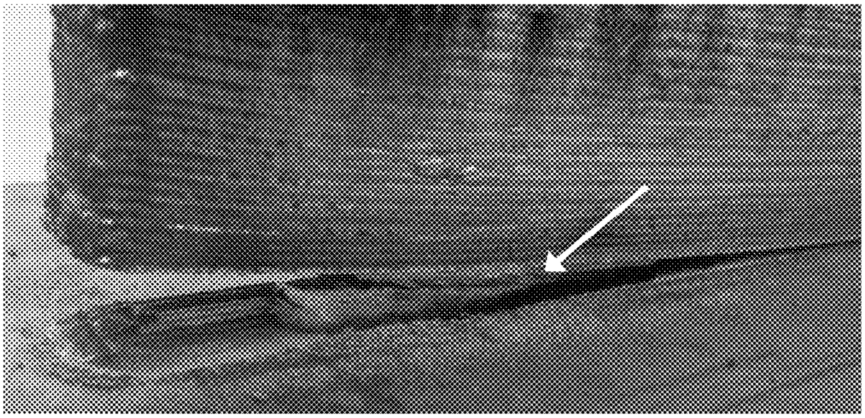

Conventional DED of metals to produce a preform can introduce residual stress in the preform. Residual stress during DED of metals typically results from the fact that different areas of a component being manufactured experience different cycles of thermal expansion and contraction. The resulting thermal stress can cause a non-uniform distribution of irreversible material deformation, and some of this deformation can remain after the material has cooled, resulting in an internal and completely self-equilibrating stress field in the workpiece. The stress, if not mitigated, can promote a large number of manufacturing failures. As shown in FIGS. 1A through 111, a workpiece produced using conventional DED additive manufacturing without stress mitigation (FIG. 1A) can exhibit mismatch (FIGS. 1B and 1C), cracking (FIGS. 1D, 1E and 1F), and tearing (FIGS. 1G and 111). Provided is an apparatus comprising a curved clamping mold as an underlying support structure for a pre-bent substrate for manufacturing residual stress-free and distortion-free single-sided metallic components by DED, or metallic components having reduced residual stress or reduced distortion. The apparatus can be used with conventional DED thermal sources used to melt a metal powder or wire feedstock, or a combination thereof. The curved clamping mold includes a first side that includes a peripheral rim having a flat or planar surface, cavities or depressions that create one or more void areas, and one or more stiffening members. The planar perimeter and the stiffening member(s) share a common plane. Only the peripheral rim and the stiffening member(s) come into contact with the jig or the clamping fixture platform. The curved clamping mold also includes a second side opposite of the first side, the second side having a curved surface, as show in in FIG. 2A and FIG. 8B.

In use, the first side of the clamping mold can be directed toward the welding jig. The curved side of the clamping mold can be directed away from the jig and toward and positioned against the pre-bent substrate. The planar surface of the peripheral rim and the stiffening member(s) of curved clamping mold can rest flat on the jig surface. One or more clamps can be used to secure the pre-bent substrate to the jig. This can result in the pre-bent substrate being pressed toward the jig, so the forces necessary to secure the pre-bent substrate to the jig will be between the clamps and the jig, with the curved clamping mold as a support between the substrate and the jig. In embodiments, the pre-bent substrate is pressed axially downward.

Some compressive stress can be felt on the curved mold due to the contact between the curved mold and the pre-bent substrate. The curved clamping mold can be made of a stiff material that is resistant to twisting and deformation to help maintain its shape. In addition, the curved clamping mold can be made of a material that is resistant to thermal shock, corrosion and is non-magnetic.

The curved clamping mold can act as a support structure for the pre-bent DED substrate, positioned between the pre-bent DED substrate and the jig. An exemplary arrangement can include the jig as the lowermost surface, unto which the curved clamping mold is positioned. The curved clamping mold is positioned so that the first surface of the curved clamping mold faces the jig. The planar surface of the peripheral rim and the stiffening member(s) of the first side of the curved clamping mold can rest flat on the jig surface. The backside (first side) of pre-bent substrate, on which the melting tracks can be present, is positioned so that it faces the side of the curved clamping mold (facing away from the jig (the second side). In this configuration, the backside of the pre-bent substrate is facing downward toward the curved surface of the curved clamping mold and the jig. One or more clamps can secure the pre-bent substrate to the jig, with the curved clamping mold between the pre-bent substrate and the jig. The force exerted by the clamps on the pre-bent substrate can bring the pre-bent substrate into full contact with the curved second side of the curved clamping mold, straightening the pre-bent substrate and forcing it to conform to the curvature of the second side of the curved clamping mold. The one or more clamps around at least a portion of the periphery of the DED substrate can uniformly compress the pre-bent substrate downwards toward the jig and can secure the pre-bent substrate to the jig.

The curved clamping mold can help to mitigate or can eliminate deformations such as welding-induced buckling distortion, which are caused by an elastic instability produced by compressive residual stresses, if the critical buckling stress of the substrate is exceeded. Because of the thermal insulation that can be on the second surface of the curved clamping mold, or the cavities in the first surface of the curved clamping mold, or a combination thereof, the curved clamping mold can minimize the development of local temperature gradients that can induce large local stains, and a resultant deformation pattern. The curved clamping mold can maintain a consistent interface with the pre-bent substrate to optimize thermal and mechanical homogeneity across the pre-bent substrate.

The dimensions of the substrate are selected to accommodate one or more workpieces to be constructed on the substrate. Typically, the only limitation as to size of the curved clamping mold with respect to the substrate is that the substrate must be able to be clamped to the jig with the curved clamping mold positioned between the substrate and the jig. The curved clamping mold can be designed to be the same size as the substrate. The curved clamping mold can be designed to be from 0.5% to 10% larger than the substrate so long as to the substrate can be clamped to the jig.

The curved clamping mold can be designed to be from 0.05% to 2.5% smaller than the substrate so long as to the substrate does not come into contact with the jig when clamped to the jig with the curved clamping mold between the substrate and the jig. Generally, it would not be desirable if the curved clamping mold is much smaller than the substrate, as this could influence manufacturing consistency. Thermal conditions outside of the mold/substrate interface area would be different; in particular, areas that are not in contact with each other could experience different heat transfer conditions, and as a result residual stress distribution.

The curved clamping mold is thicker in the center than the edges, resulting in a curved surface having the greatest height near the center of the curved surface. In embodiments provided herein, the height of the curved clamping mold measured at or near the center of the curved clamping mold can be in the range of from about 3 mm to about 60 mm, or from about 12 mm to about 50 mm, or from about 15 mm to about 45 mm. The height of the curved clamping mold measured at or near the outer edges of the curved clamping mold can be in the range of from about 0.5 mm to about 55 mm, or from about 3 mm to about 45 mm, or from about 10 mm to about 40 mm. The thickness profile of the curved clamping mold when viewed from the side has the greatest height in the center of the curved clamping mold, and the height gradually is reduced toward the outer edges to from a curved surface. The differences in height across the cross-section of the curved clamping mold results in a concave downward curve in the top surface of the curved clamping mold. In cross-section when viewed from the side, the shape of the curved clamping device can resemble an upper half of an ellipse whose semi-minor axis is much smaller than its semi-major axis. The ellipse can have an eccentricity close to, but less than 1 (an eccentricity of 1 would be a flat surface).

The thickness of the curved clamping mold can be designed to mimic or provide the same or similar thermal insulative properties achieved with sheets of ceramic insulation conventionally used in DED processes. For example, one or more sheets or plates of alumina ($Al_2O_3$) insulation are used in conventional DED processes to thermally separate the substrate from the clamping fixture platform, such as the jig. The conventional use of insulation sheets is to reduce the potential risk of thermal damage to the jig, while contributing to a more homogeneous temperature distribution during the DED process. Although the thickness of the sheets or plates can vary, conventionally used sheets can be about 3 mm to 3.5 mm thick. In conventional DED processes, multiple sheets of ceramic insulation sheets can be used. For example, in some conventional processes, about 4 sheets or plates of ceramic insulation are used to provide a layer of about 12 mm of insulation. More or fewer ceramic insulation sheets can be used conventionally. These alumina insulation plates can be cut to size, but doing so can release particles of alumina that can cause respiratory tract or eye irritation. Alumina insulation sheets also tend to be hygroscopic and initially can release water vapor during the heat temperature of the DED process, which can result in fluctuations in the deposition environment during processing, which is undesirable. The ceramic insulation sheets conventionally used between a substrate and jig also have to be discarded after use due to their brittleness and fragility, thus representing a consumable that adds to the cost of DED manufacturing.

The curved clamping mold can be used in combination with conventional ceramic insulation plates. The curved clamping mold can replace traditional ceramic insulation plates and provide similar thermal insulation while maintaining the same height so that minimal changes to the setting of the melting tool(s) providing a thermal source or CAD-CAM path planning defining the piece to be made by DED needs to be made. As discussed above, there is no physical limitation to the thickness of the curved clamping mold, other than machine-dependent operating constraints. For example, the DED systems' height stroke can dictate the thickness of the curved clamping mold used. The thickness of the curved clamping mold can be selected to maximize heat flow reduction at the mold/jig interface while allowing sufficient clearance for manufacture of the workpiece based on the height stroke of the system.

The curved clamping mold can be constructed from any metal having sufficient strength and temperature resistance for use under typical conditions of DED processing. The curved clamping mold can be made of a corrosion-resistant metal. The curved clamping mold can be made of a heat-resistant metal. The curved clamping mold can be made of a non-magnetic metal. The curved clamping mold can be made of a metal having a melting point of 1350° C. or greater. In some configurations, the curved clamping mold contains an austenitic stainless steel. The austenitic stainless steel can contain carbon, chromium, copper, manganese, molybdenum, nickel, nitrogen, phosphorus, silicon or combinations thereof. The austenitic stainless steel can contain at least 18% chromium. The curved clamping mold can be made of a 300 series stainless steel. The curved clamping mold can be made of stainless steel series 304, 309, 310, 316, 318, 321 or 330. The curved clamping mold can be made of grade AISI 330 stainless steel. The curved clamping mold can be made of a non-magnetic metal in order to avoid unbalanced magnetic field conditions surrounding the weld arc in arc-based DED systems, which can cause a number of processing issues such as i.e. magnetic arc blow.

Figure 2A:
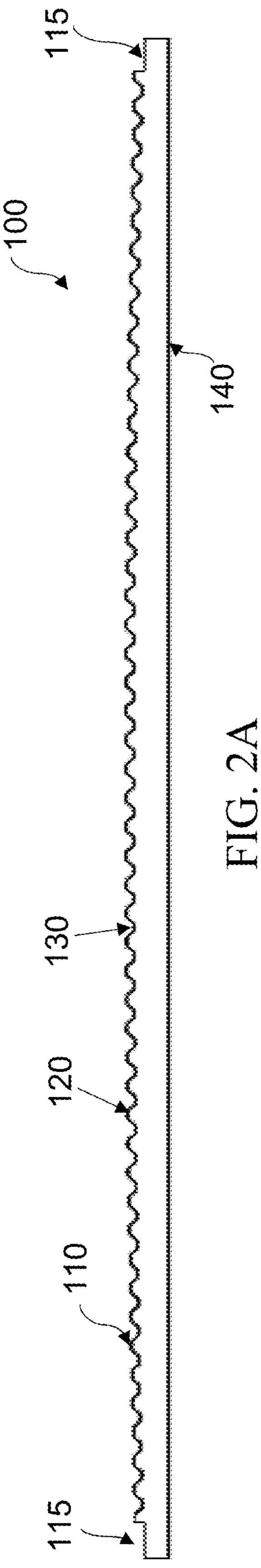
FIG. 2A is a side view of the curved clamping mold showing an embodiment with a corrugated curved surface where the ridges have as an exemplary cross-section shape that is frustum-type shape, particularly a truncated pyramid shape.
Figure 2B:
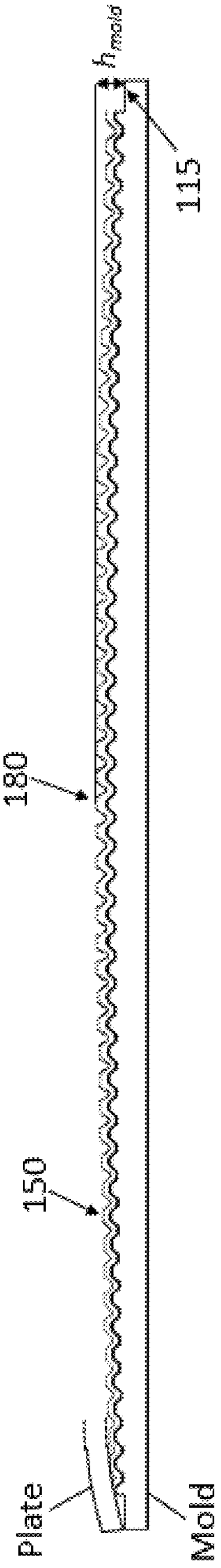
FIG. 2B is a side view of the same curved clamping mold showing a ceramic coating by dashed lines (exaggerated in the figure) on the curved surface that will be in contact with the DED substrate (plate). The figure also shows the nominal mold deflection $h_{mold}$.

To minimize or prevent thermal energy transfer from the substrate to a top surface of curved clamping mold during the DED process, the curved clamping mold can include a ceramic coating. For example, a ceramic coating can be applied on the surface of the curved clamping mold that faces the DED substrate (the second curved surface that contains knurls or corrugations), as shown in FIG. 2B. The ceramic coating can be applied directly to the curved surface, or the ceramic coating can be applied to a bond coat that is directly applied to the second curved surface. A ceramic coating can be applied directly to the opposite first flat surface of the mold, or the ceramic coating can be applied to a bond coat that is directly applied to the first flat surface. The ceramic coating can provide thermal insulation to minimize or prevent thermal contact between the curved clamping mold and the pre-bent substrate.

The ceramic coating can be applied using any process, including atmospheric plasma spray, magnetron sputtering, chemical or electrochemical deposition, such as electrophoretic deposition, or physical vapor deposition, such as electron beam physical vapor deposition. Any high temperature ceramic coating known in the art can be used (e.g., see U.S. Pat. No. 4,321,310 (Ulion et al., 1982), U.S. Pat. No. 5,789,330 (Kondo et al., 1998), U.S. Pat. No. 5,304,519 (Jackson et al., 1994); U.S. Pat. No. 6,387,539 (Subramanian, 2002); and U.S. Pat. No. 6,998,064 (Gadow et al., 2006). Exemplary types of ceramic coatings include zirconium dioxide, zirconium dioxide stabilized by addition of yttrium oxide, yttrium aluminum oxide, alkaline earth metal silicates, $ZrV_2O_7$, $Mg_3(VO_4)_2$ and combinations thereof. The curved clamping mold can be coated with zirconium dioxide stabilized by addition of yttrium oxide, such as a plasma sprayed $ZrO_28Y_2O_3$, such as those commercially available as Metco™ 22xx and 23xx powders, including Metco 222A, 231A, 233A, 233B, 233C and 234A (available from Oerlikon Metco, Frankfurt, Germany). The coating can include multiple layers of different types of ceramics, or multiple layers of one type of ceramic.

A ceramic coating used on the curved clamping mold can be selected to be less hygroscopic than conventional alumina insulation. A ceramic coating used on the curved clamping mold can be selected to be non-hygroscopic compared to conventional alumina insulation. Replacing conventional ceramic insulation sheets with the curved clamping mold can result in a significantly more stable processing chamber atmosphere, as less or no water vapor is released from the ceramic coating of the curved clamping mold into the chamber during DED processing, compared to the amount of water vapor released from conventional alumina ceramic plates.

Figure 2C:
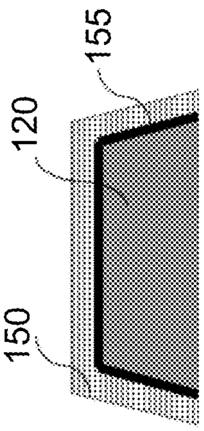
FIG. 2C shows an exemplary cross section shape (zoomed view), that is frustum-type, particularly a truncated pyramid shape.
Figure 3A:
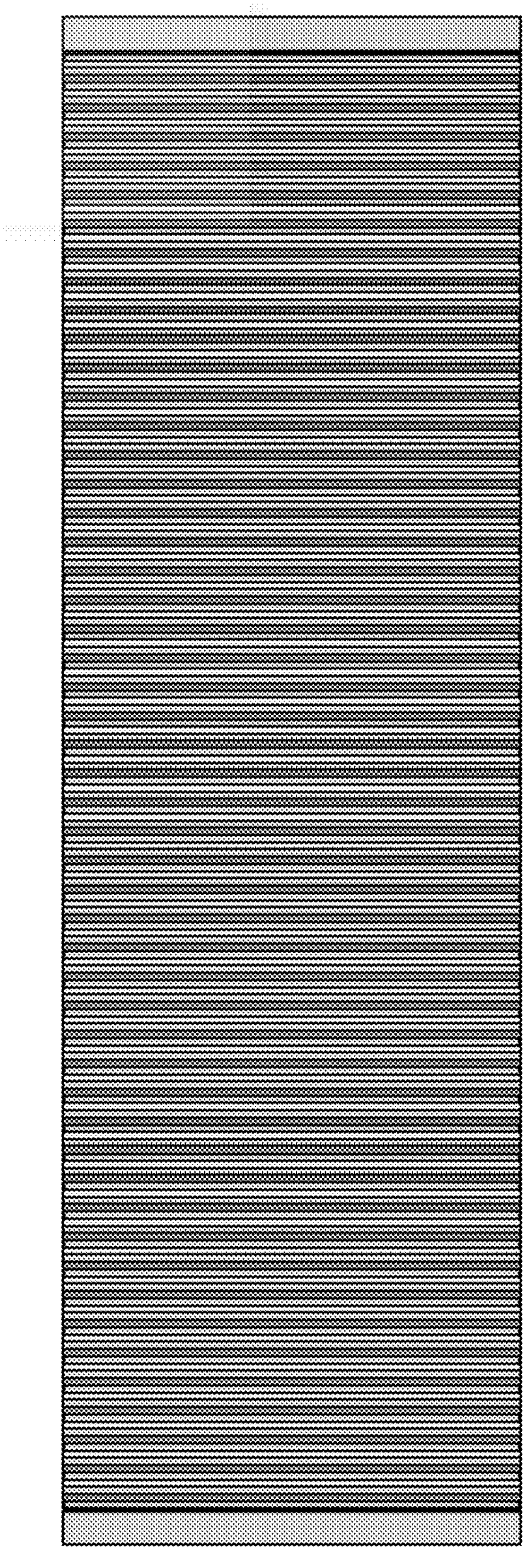
FIG. 3A is a top view of the same curved clamping mold.
Figure 3B:
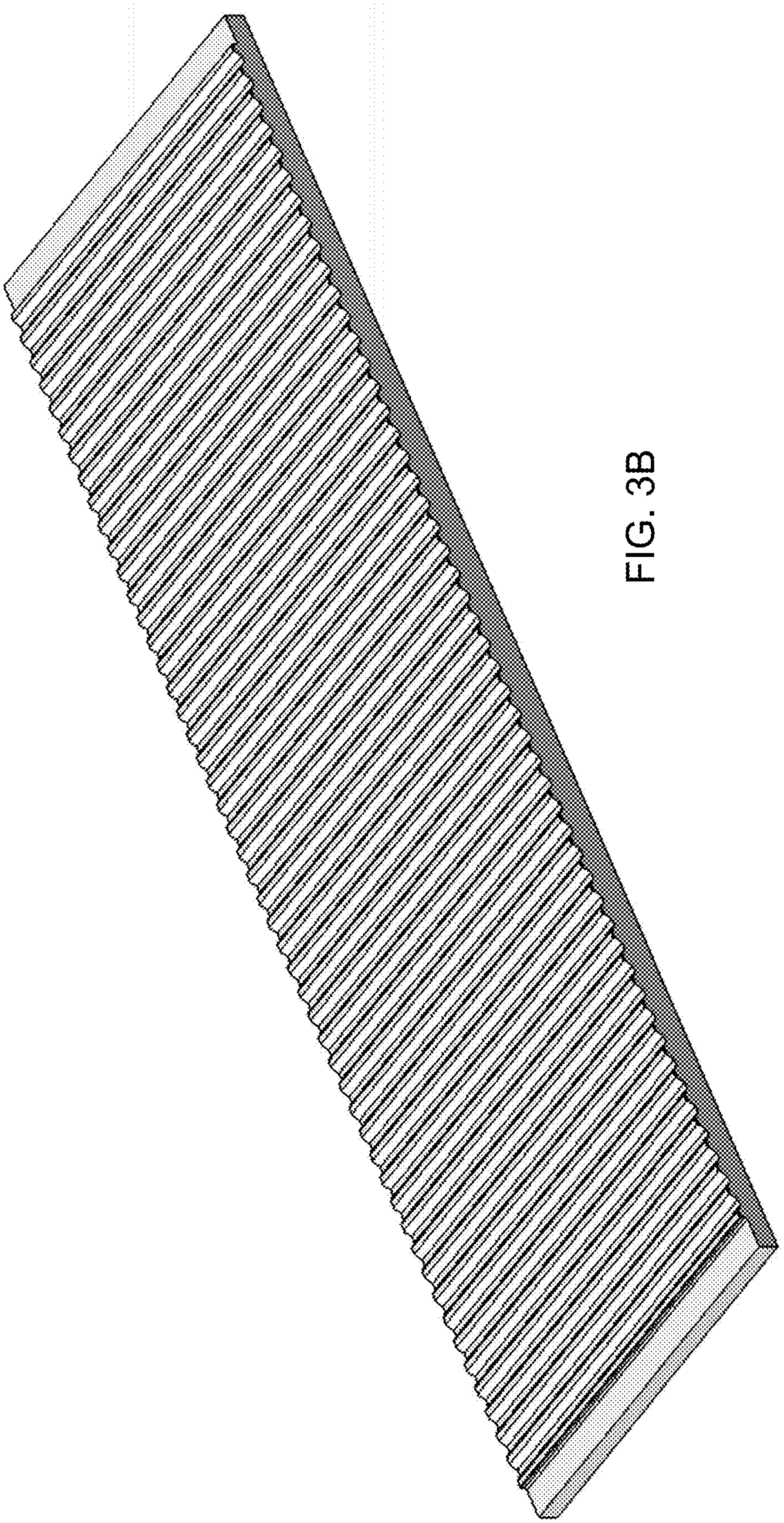
FIG. 3B is an isometric projection view of the same curved clamping mold.

The curved clamping mold can include a bond coat. A bond coat is a coating of material that can increase the adhesion between a substrate and a ceramic coating. A bond coat can provide corrosion resistance to a substrate to which it is applied. The bond coat can be used alone or in combination with a ceramic coating. The bond coat can include chromium and aluminum. The bond coat can include MCrAlY, where M is a metal selected from the group consisting of Co, Ni, Fe, Cr, Co, and a Ni/Co combination. In some applications the bond coat includes MCrAlY, where M is Ni, Co or a combination thereof. Exemplary bond coat materials include Amdry™ powder products, such as Amdry™ 962, 9621,9624, 9625, 963 and 964 (available from Oerlikon Metco, Frankfurt, Germany). The bond coat can be present at a thickness of from about 1 to 250 μm. An exemplary embodiments is shown schematically in FIG. 2C. The ridge 120 is coated with a bond coat 155 which is subsequently coated with a ceramic coating 150.

The thickness of the ceramic coating applied to the curved clamping mold can vary depending on the type of ceramic used, and its ability to support both mechanical and thermal loads. In some configurations, the thickness of the entire ceramic coating can be from about 0.1 mm to about 5 mm, or from about 0.25 to about 4 mm, or from about 0.3 to about 3 mm. Each deposited layer can be thinner than the entire amount of ceramic coating to be applied, but in aggregate all applied layers of the ceramic together can form a ceramic coating that is at least 0.1 mm, or at least 0.25 mm, or at least 0.5 mm, or at least 0.75 mm, or at least 1 mm, or at least 1.25 mm, or at least 1.5 mm, or at least 2.0 mm, or at least 2.5 mm, or at least 3.0 mm, or at least 3.5 mm, or at least 4.0 mm, or at least 4.5 mm. The ceramic coating can have a thickness of 0.1 mm, or 0.25 mm, or 0.5 mm, or 0.75 mm, or 1 mm, or 1.25 mm, or 1.5 mm, or 2.0 mm, or 2.5 mm, or 3.0 mm, or 3.5 mm, or 4.0 mm, or 4.5 mm or 5 mm. The ceramic coating layer assists in reducing heat transferred from the pre-bent substrate to the curved clamping mold, thereby reducing heat loss from the pre-bent substrate during DED.

To further minimize or prevent thermal communication between the curved clamping mold and the pre-bent substrate, the curved surface of the curved clamping mold can be physically modified. A knurled surface can be cut into the curved surface of the curved clamping mold prior to application of the ceramic coating layer. A corrugated surface containing a combination of ridges and troughs can be cut into the curved surface of the curved clamping mold prior to application of the ceramic coating layer. A corrugated surface containing a combination of ridges and troughs, where the surface of one or more ridges has a knurled surface, can be cut into the curved surface of the curved clamping mold prior to application of the ceramic coating layer. Exemplary embodiments are shown in FIGS. 2A, 2B, 3A and 3B. The embodiment illustrated in FIG. 2A shows a curved clamping mold 100 that contains a top surface 110 that is corrugated and contains a combination of ridges 120 and troughs 130, and a bottom surface having a flat or planar rim 140. The curved clamping mold can include an edge 115 on each side, as shown in FIG. 2B. The edge 115 on each side of the mold can help support and/or limit the downward movement of the short edge of the plate (substrate) during clamping.

In embodiments provided herein, the curved surface of the curved clamping mold includes knurls. The knurled surface on the curved surface of the curved clamping mold can produce a straight line pattern, a diagonal line pattern, a diamond pattern, or a combination thereof on the surface. A diamond knurling can be done to result in a male or a female knurling pattern. In a male diamond pattern, raised points are produced. In a female diamond pattern, diamond impressions are produced. The knurling can result in columns each of which have straight sides substantially perpendicular to the arc of curvature of the curved clamping mold. The columns can have a planar top surface. The columns can have a curved top surface. The columns can have a cross section that is square, rectangular, circular, oval, rhomboid, trapezoidal, triangular, pentagonal, hexagonal, heptagonal nonagonal, decagonal, a frustum-type shape, a truncated pyramidal shape, or any combination thereof. The columns can be separated from each other by a space. The gap between columns can be substantially constant.

In embodiments provided herein, the curved surface of the curved clamping mold can include corrugations or is corrugated. The curved surface of the mold can be corrugated to include alternating ridges and grooves. The corrugation can run from one long edge to the other long edge of the curved clamping mold. The corrugation can run from one short edge to the other short edge of the curved clamping mold (e.g., see FIGS. 3A and 3B). The corrugation results in a plurality of columns that are perpendicular to the arc of curvature of the curved clamping mold. The perimeter edges of the mold at the curved surface can be contoured by a metal material, and not coated with a ceramic coating or bond coat.

The ridges can be columns having a planar top surface. The ridges can be columns having a curved top surface. The grooves can have a planar bottom surface, or a curved or U-shape bottom surface. The grooves can include a rounded corner to protect against stress concentration and crack propagation. The ridges can each have a taper of increasing cross section along their longitudinal axis. In cross-section, the ridges can have a trapezoidal shape. In cross-section, the ridges can have an isosceles trapezoid shape, where the long base of the trapezoid forms the bottom the of the ridge, and the short base of the trapezoid forms the top of the ridge. In cross-section, the ridges can have a shape of a convex isosceles trapezoid. In cross-section, the ridges can have the shape of a frustum of a regular pyramid. Exemplary ridges are illustrated in FIGS. 2A, 2B, 2C and 3B.

A ridge having in cross-section a frustum-type shape, particularly a truncated pyramid shape, can transfer stresses from the top of the ridge to the base while avoiding stress deformation of the ridge due to application of pressure to the curved surface of the curved clamping mold when it supports the pre-bent substrate when the pre-bent substrate is attached to the jig. A ridge having in cross-section a frustum-type shape can withstand the applied loads, forces and moments that can be applied during the DED process. The forces and moments acting at the plateau of the ridge (the upper flat surface) can be transferred to the base of the ridge, and ultimately to the backside of the curved clamping mold. When the ridge has in cross-section a frustum-type shape, it can transfer applied loads to a larger surface area at the base of the ridge. The knurled surface or troughs between the ridges form gaps between the curved surface of the curved clamping mold and the pre-bent substrate when the curved clamping mold is brought into contact with the pre-bent substrate. The gaps can be filled with the atmosphere of the DED chamber, or a nobel gas, such as argon, which can act as a thermal insulator. Argon gas is a very effective thermal insulator. Solid/gas/solid interfaces are considerably less conductive, and thus these particular interfaces between pre-bent substrate/argon gas/curved clamping mold will effectively work as thermal barriers. Thus, the gaps also can help to minimize the average heat transfer coefficient between the pre-bent substrate and the curved clamping mold. The knurled surface or a combination of ridges and troughs on the curved surface of the curved clamping mold also minimizes the real area of contact between the pre-bent substrate and the curved clamping mold, further reducing heat transfer, and thus maintaining the most heat in the pre-bent substrate and avoiding thermal transfer to the jig or welding table. Thus, the curved clamping mold design containing a knurled surface or a corrugated surface on the curved surface, and a ceramic coating on the curved surface, effectively reduces conduction heat transfer from the pre-bent substrate to the curved clamping mold. Since the thermal gradients across the thickness of the pre-bent substrate can be substantially less during deposition of first layers, the welding-induced residual stress arising during DED of metal preforms will be reduced. Also, because titanium and titanium alloys such as i.e. Ti-6Al-4V have high yield stress and comparatively low elastic modulus, these metals exhibit a high degree of spring-back at room temperature. The reduction of conduction heat transfer from the pre-bent substrate to the curved clamping mold can promote heat accumulation in the substrate during the DED process, thus minimizing the degree of spring-back.

The knurled pattern or corrugation on the curved surface of the curved clamping mold can have a ceramic coating layer, as discussed above, on its surface. An exemplary embodiment showing a curved clamping mold 100 with a ceramic coating 150 is shown in FIG. 2B. Because the ceramic typically is applied to the surface of the curved clamping mold to form the ceramic coating, the ceramic coating also can be present in the troughs of the knurled pattern or troughs of corrugations. The thickness of the ceramic coating only is limited by the limitations of application to the mold and the ability of the thickness of the ceramic to support the pre-bent substrate, and the axial downward clamping forces, without damage to the ceramic coating when the substrate is clamped to the jig. Due to limitations in the coating technology, thicker layers of ceramic can be more difficult to achieve while maintaining the ability of the ceramic layer to support the pre-bent substrate without damage to the ceramic coating when the support is clamped to the jig. The exact support strength of the ceramic and its thermal conductivity can be determined by the composition of the ceramic. For example, a 2 mm coating of a ceramic based on zirconium dioxide stabilized by addition of yttrium oxide can provide good thermal isolation as well as good mechanical support of the substrate without damage to the ceramic coating when the substrate is clamped to the jig.

The curved clamping mold can serve as a shaping back structure. In embodiments, the curved clamping mold can serve as a supporting/shaping back structure. The curved clamping mold can be positioned between the pre-bent substrate and the jig when the pre-bent substrate is secured to the jig. The pre-bent substrate can be clamped to the jig, bringing the substrate into full contact, such as from about in contact with about 95% to 100% of the curved upper surface of the curved clamping mold. When the DED manufacturing process is complete, a self-equilibrating residual stress state is achieved which allows an upward recovery (spring-back) of the substrate and DED structure built upon the substrate after releasing the clamps holding the substrate to the jig. The substrate straightens out after it is released from the clamps.

The nominal mold deflection $h_{mold}$ (bow) of the curved clamping mold is the difference between the maximum height at the center of the curved surface of curved clamping mold and the upper surface of an edge of the curved clamping mold, as illustrated in FIG. 2B. In FIG. 2B, the difference between the maximum height 180 of the curved surface and an edge 115 of the curved clamping mold is $h_{mold}$. The mold length ratio $L_r$ is the ratio between the new x dimension of the mold $L_i$ and the original mold length $L_0$. The predicted maximum mold deflection $h_{Lr}$ is approximately proportional to the product between the nominal mold deflection $h_{mold}$ and the square of the mold length ratio $L_r$ which is calculated according to the formula:

$$L_r = L_i/L_0$$

and thus $$h_{Lr} \approx h_{mold} \times L_r^2.$$

Hence, for a curved clamping mold with xy dimensions of 635 mm×190 mm (L×W), the predicted maximum mold deflection $h_{Lr}$ is about 3.8 mm. A longer mold, such as a curved clamping mold with xy dimensions of 1905 mm×635 mm would have a mold length ratio of three ($L_r$=1905/635=3) and a maximum mold deflection $h_{Lr}$ of $3.8\times3^2\approx34.2$ mm. The nominal mold deflection can be from about 3 mm to about 35 mm. The amount of deflection of the mold thus can depend on the characteristics of the mold. The longer the curved clamping mold needs to be to accommodate a longer substrate, the higher/larger the deflection of the curved clamping mold will need to be.

Figure 4:
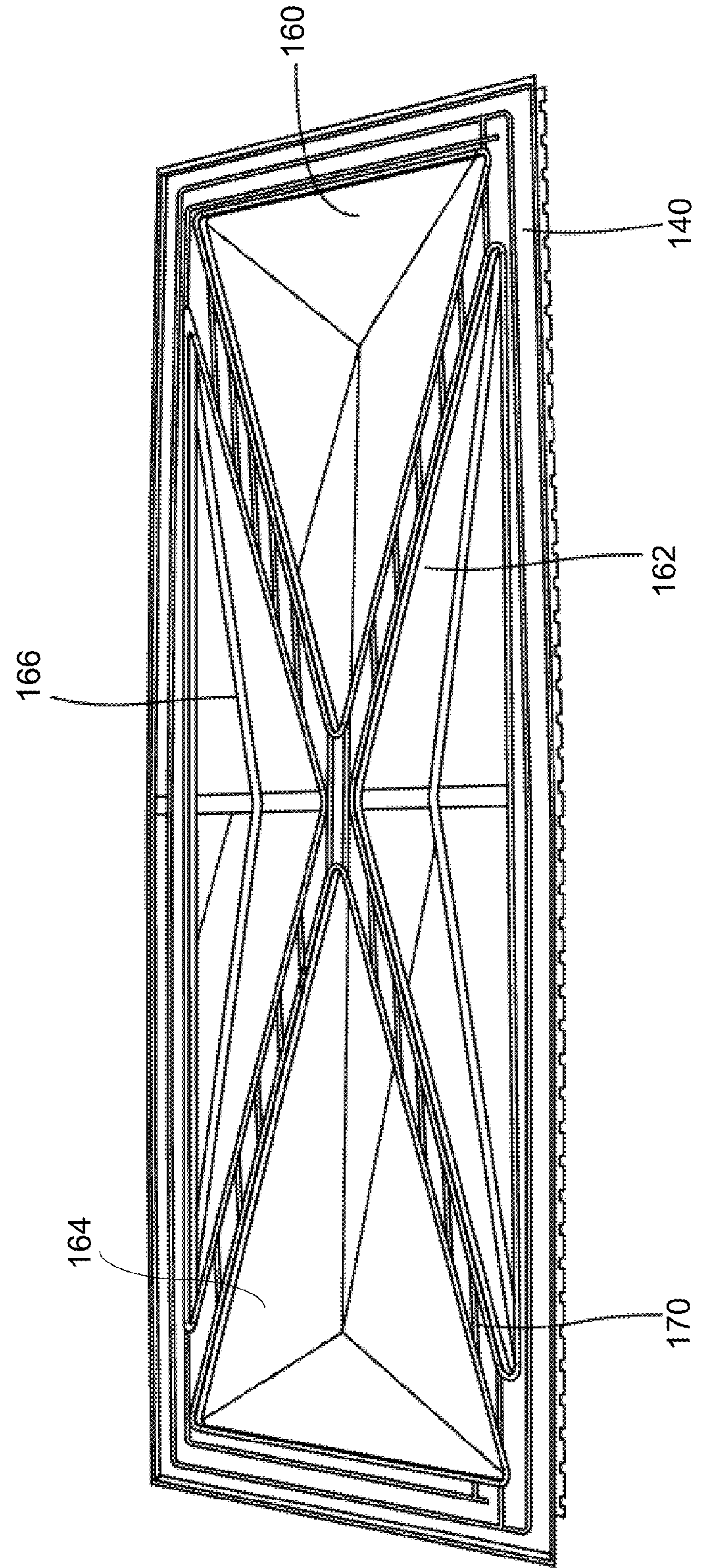
FIG. 4 is a bottom view of the curved clamping mold having four triangular cavities separated by an X-shaped stiffening member and having a peripheral rim, where the peripheral rim and the X-shaped stiffening member share a common plane. Only the peripheral rim and the stiffening member contact the clamping fixture platform, such as a jig or welding table, when the curved clamping member is place on the jig or welding table.

The curved clamping mold also can be designed so that the underside of the mold includes cavities or depressions, while still retaining mold rigidity and deformation resistance. An exemplary design is shown in FIG. 4. Segments of the non-magnetic metal on the bottom surface of the curved clamping mold can be machined away to produce two or more cavities or depressions. The cavities or depressions can be separated from each other by an unmilled area of metal that can serve as a stiffening member. An area of unmilled metal also can be present around the perimeter of the bottom surface of the mold to form a rim. This design reduces the amount of material required to fabricate the curved clamping mold while still maintaining the physical stability of the mold. By reducing the need for the full bulk of material to be used to form the mold, the weight of the mold can be reduced while maintaining stiffness of the structure of the mold. As an alternative to milling the metal to achieve the desired cavities and stiffening members, a casting mold can be used to fabricate the curved clamping mold by casting to include these attributes, minimizing the amount of material that would need to be removed to achieve the desired final design. Further, a stiffening member can be added, such as by attaching a separately prepared stiffening member to the bottom surface of the curved clamping mold. The stiffening member can be attached via any suitable method. Exemplary methods include welding, screws, bolts, adhesive, or combinations thereof.

The cavities can have any shape. The cavities can be four triangular cavities, separated by mold material to form an X-shaped stiffening member that separates the cavities from one another. An exemplary embodiment is shown in FIG. 4. In the configuration shown, the substrate is machined to produce triangular shaped cavities 160, 162, 164 and 166, while leaving material to form an X-shaped stiffening member 170 and a flat perimeter rim 140. The outer surface of the flat perimeter rim 140 and the outer surface of the X-shaped stiffening member 170 are in the same plane, and when secured to the jig can sit flat on the jig surface. The cavities can be four square or rectangular cavities, separated by the mold material to form an H-shaped stiffening member that separates the cavities from one another. The cavities can be any shape selected from the group consisting of a square, rectangle, circle, oval, ellipse, trapezoid, parallelogram, pentagon, hexagon, heptagon, starburst, cross, multi-pointed star, intersecting geometric shapes, polygon, geometric shape, irregular shape, regular shape, symmetric shape, asymmetric shape, and a combination thereof.

In addition to cost saving achieved by reducing the amount of the non-magnetic metal needed for fabrication, the cavity-plus-stiffening member-plus-perimeter-rim design provides several functional advantages. One advantage is that only the unmilled portions of the bottom surface of the mold will come into contact with the high strength steel jig. This reduces conduction heat transfer from the curved clamping mold to the jig while maintaining rigidity of the curved clamping mold. This reduction in heat transfer also contributes to heat retention in the pre-bent substrate, minimizing loss to the jig.

In addition, the cavities in the bottom surface of the curved clamping mold can retain atmosphere or argon gas. Argon can be effectively used as an insulator under a large part of the mold due to the presence of the cavities and the perimeter rim. Argon is a very effective insulator. Any flow of heat from the curved clamping mold to the underlying steel jig only will be at solid/solid contact interface(s) by conduction heat transfer as a result of the thermal gradient. Because the solid/gas/solid interfaces are considerably less thermally conductive, the cavities in the lower surface of the curved clamping mold can effectively act as thermal barriers between the curved clamping mold and the jig (e.g., air or inert gas gaps). Air or inert gas gaps can be utilized at interfaces between the baseplate and the clamping mold, and/or between clamping mold and the jig to help reduce heat transfer from the baseplate to the jig. Thus, the curved clamping mold can help to maintain more heat in the pre-bent substrate, thereby further reducing uneven temperature distribution and reducing thermal stresses in the pre-bent substrate.

The curved clamping mold can exhibit high durability. After repeated use, the curved clamping mold may experience some thermal stress that cumulatively could build up and result in some small degree of bow distortion of the mold (such as a 0.05 mm to about a 0.5 mm lift at edges after repeated use). The degree of bow distortion observed in the curved clamping mold after repeated use is not expected to significantly change the distortion mitigation effects produced on the DED preforms. Different object designs can require the use of curved clamping molds of different sizes in order to accommodate substrates of different sizes. Similar curved clamping molds can be used for the production of objects with similar geometries and/or substrate sizes. For example, objects having similar geometries and/or substrate sizes can be grouped into families and the same curved clamping mold design can be used within the same object family.

Exemplary curved clamping molds provided herein can be free standing. The curved clamping mold can be separate and apart from the jig. In exemplary embodiments, the curved clamping mold can sit flat on a jig. Exemplary clamping molds can include a rim having a flat surface or planar surface around the perimeter. The curvature of the mold can be empirically determined based on data gathered on initial trials performed using ceramic plates. Ceramic plates were cut into different sizes which were then used to produce different current curvatures and tested for their ability to minimize distortion in preforms prepared on the curved molds. Modelling was used thereafter to confirm that the curvature used experimentally provided the targeted end results, i.e., a close to distortion free preform. In cross-section when viewed from the side, the shape of the curved clamping device can resemble an upper half of an ellipse whose semi-minor axis is much smaller than its semi-major axis. The ellipse can have an eccentricity close to, but less than 1 (an eccentricity of 1 would be a flat surface).

The curved clamping molds provided herein can allow redesign of jigs to be simpler i.e. lighter, cheaper and more versatile. Current jigs are over-designed to accommodate anticipated reaction forces and stresses encountered when directly clamping the substrate to the jig and during DED. The curved clamping mold can reduce these anticipated forces and stresses. The curved clamping molds provided herein also can allow modification of the clamping arrangement compared to traditional clamping arrangements. In some application, the entire periphery of the substrate can be clamped to the jig when the curved clamping mold is used.

C. Methods of Directed Energy Deposition

Provided herein are methods of directed energy deposition that mitigate or reduce distortion in objects manufactured using directed energy deposition, especially in titanium and titanium alloy objects. The methods include thermally pre-bending the substrate on which the object is to be manufactured, attaching the pre-bent substrate to the curved clamping mold provided herein, pre-heating the substrate prior to DED deposition, and producing the object by deposition of metal layer by layer. The pre-bending of the substrate includes inducing steep through-thickness thermal gradients in the substrate.

Figure 5:
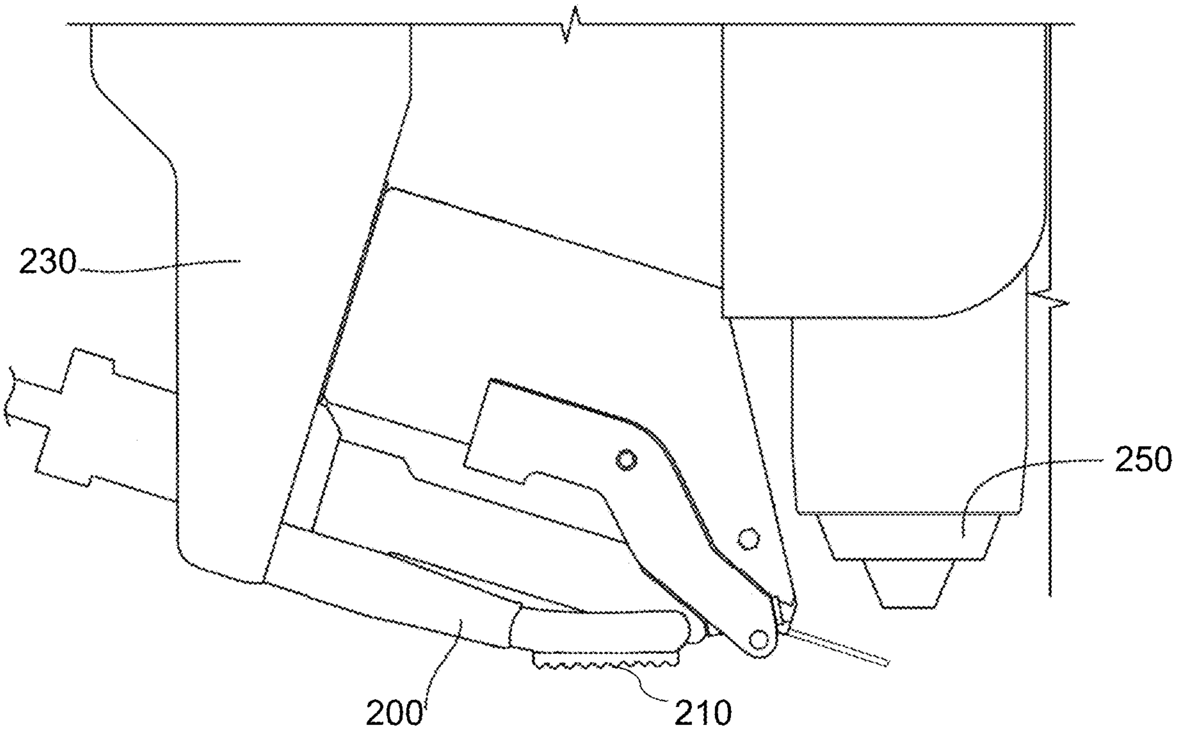
FIG. 5 depicts an exemplary rapid cooling gas jet device.

For the thermally induced pre-bending step, a thermal source can be used to apply thermal energy at a high energy density to a surface of the first side or backside of the substrate. The thermal energy can be applied to defined portions of the backside of the substrate in order to create large thermal gradients in the substrate. The large thermal gradients can introduce a high residual stress field into the substrate. The thermal energy can be applied, followed by a reduction in the temperature of the surface to which thermal energy was applied. In embodiments, a gas jet device can be used to apply a cooling gas. Application of the cooling gas can increase the cooling rate and thereby further increase the stress imparted to the substrate. For example, the thermal source can comprise an electric arc of a plasma torch, such as a PTA torch, and the gas jet device can be attached to a support relative to the plasma torch, as shown in FIG. 5. In FIG. 5, the gas jet device 200 is attached to a support 230, and nozzles 210 of the gas jet device 200 can apply a cooling gas to an area heated by the PTA torch 250.

In contrast, in the pre-heating step, thermal energy is applied to the surface of the substrate uniformly in order to minimize temperature gradients along the x, y and z directions. Thermal energy is applied as uniformly as possible to the frontside of the substrate as the heating device allows. Any heating device(s) or method(s) that provide(s) uniform heating can be used for pre-heating. For example, direct heating using a heater positioned to apply heat across the surface of the substrate can be used. The heating device can be or include an infrared heater, an inductive heater, a resistive heater, or combinations thereof. Exemplary heaters include a conductor-in-conduit heat source, a heater strip, a resistive heating strip, an infrared heater, a Positive Thermal Coefficient ceramic heater, a thick film ceramic heater, a resistance wire or a resistance ribbon heating device, an infrared heater, and an induction heater. Pre-heating also can be achieved using one or more melting tools to apply thermal energy to the surface of the substrate. The melting tools can be used alone or in conjunction with an infrared heater, an inductive heater, a resistive heater, or combinations thereof. The melting tool (s) can include as a thermal source an electric arc plasma, a laser beam or an electron beam, and a plurality of melting tools containing the same or different thermal sources can be used. The heating area can be maximized by using lower energy densities, and applying more thermal energy over a larger area. A plurality of heating sources can be used in tandem, in serial or in parallel, to generate multiple "lines" of thermal energy applied to the frontside surface of the substrate to more uniformly heat the substrate. This can result in a raising the temperature of the substrate more uniformly using low energy density heating, producing few or minimal thermal gradients particularly in the through-thickness direction. Application of thermal energy using one or more melting tools during the pre-heating dry runs (heat application without adding molten metal) can result in the effective removal of any residual contaminants off the surface of the substrate, such as any contaminants left by any ultrasonic/manual wipe cleaning procedures. Preheating is performed until a target temperature of the substrate is reached.

In some applications, the target temperature to be achieved by the preheating process is the DED process temperature, such as the DED deposition temperature, or about ±25° C. of the DED process temperature. In some applications, the target temperature is within ±25° C. of the plastic deformation temperature of the substrate. In some applications, preheating is performed until the substrate has temperature of about 400-900° C. In some applications, preheating is performed until the substrate has temperature of about 500-850° C. Other authors have report that warm forming can be also performed between 200-300° C. in order to reduce the flow stress and to help minimizing titanium spring back too. In some applications, preheating is performed until the substrate has temperature of about 595-815° C.

The curved clamping mold can act as a support for the pre-bent substrate as the pre-bent substrate is clamped to the jig. Among other advantages, the curved clamping mold provides more consistent and reproducible end residual stress distribution and helps to minimize distortion of the workpiece during and after fabrication.

DED can be performed after the substrate has been pre-heated (and remains heated) in order to mitigate thermal gradient generation during the DED process, particularly in the through-thickness (z-direction). While introduction of no stress in the fabricated object would be optimal, DED processes are effectively welding processes and typically will lead to an inevitable build-up of welding-induced residual stresses and deformation during fabrication. Reducing these residual stresses and deformations results in objects that exhibit improved dimensional accuracy and superior mechanical properties. Steps of the method are described in further detail below.

1. Pre-Bend the Substrate

In the methods provided herein, the substrate can be pre-bent prior to deposition. Pre-bending of the substrate can be a separate step of the DED process. In methods provided herein, thermal energy can be applied to a first side of a substrate to plastically deform the substrate and thus to permanently and uniformly pre-bend the substrate. In embodiments, one or more than one autogenous melting tracks or weld lines can be formed as the thermal energy is applied across a surface of the first side of the substrate. This is significantly different from using clamps to physically constrain and mechanically pre-bend the substrate by mechanical stress. Although mechanical pre-bending can be used to bend the substrate, mechanical stress typically does not involve local melting of planned segments of the substrate surface and is not sufficient to introduce the desired uniform plastic deformation into the substrate. Mechanical forces introduce different stress redistribution patterns than are introduced by applying localized heating after the substrate is released from the clamps. For example, when a substrate pre-bended under mechanical forces is released, the substrate springs back to a much higher condition than achieved by thermal pre-bending.

In embodiments, the substrate can have a first side and an opposite second side. The first side can be the side that during DED manufacturing faces toward the jig, and the second side can be the side onto which the workpiece is formed by DED. For the pre-bending, the substrate can be clamped onto a jig with the first side facing up and the back side facing down toward the jig.

Pre-bending of the substrate can be performed while the substrate is in a flat condition. Pre-bending of the substrate can be performed while the substrate is connected firmly to the jig using a plurality of clamps. Pre-bending of the substrate can be performed while the substrate is thermally isolated from the jig. The substrate can be thermally isolated from the jig by including one or more sheets of alumina insulation having the same dimensions as the substrate. In embodiments, four sheets of alumina insulation can be used. Other materials that can provide thermal isolation of the substrate from the jig can be used. A device with similar thermophysical properties as the curved clamping mold, such as a corrugated surface with a series of ridges and troughs with a ceramic coating providing thermal insulation, but being in a flat configuration instead of a curved configuration, can be used. The use of such a device could eliminate the need to use, alumina insulation sheets or other sheets of insulating material.

The substrate can be clamped to the jig using clamps around the entire periphery of the substrate, along all four edges of the substrate. In some applications, the substrate can be attached to the jig using clamps along only two opposite longest edges of the substrate. This configuration allows the thermal source, such as an electric arc plasma, laser, electron beam device, or any combination thereof, to go to the very edge of the substrate in the length direction. The clamping arrangement can allow energy to be delivered from edge to edge, and can produce a stress field all the way to the edge of the substrate, which can help balancing out subsequent residual stresses introduced during DED manufacturing in this particular area.

It has been found that application of intense thermal energy all the way to the edge or to within about 5 mm of the edge can minimize or prevent the substrate from twisting. As the distance from the edge to where the end of application of intense thermal energy increases, twisting increases as well. Thermal stresses produced when the DED thermal source is applied up to 10 mm from the edge are significantly different from those achieved when the thermal source is applied up the edge, or when the thermal source is applied only up to 20 mm away from the edge. The thickness of the substrate has been found to make little difference when considering a distance away from the edge that can be tolerated without stress formation becoming a concern. Thicker substrates may require higher arc energies (or heat inputs) to be delivered during pre-bending, so that wider and deeper fusion profiles can be achieved. This can be achieved by reducing traverse speed, or increasing thermal energy application, or a combination of both, for example. Taller DED preform builds also may distort less in comparison with shorter builds, meaning that the radius of curvature of the mold could be increased for shorter builds.

The clamps can be used to attach the substrate to a jig, and a constant clamping force can be applied to all clamps. This can be achieved by torque-controlled tightening of the bolts connecting the clamps to the jig. A force of from 10 newton meter (N·m) to 20 N·m, such as 15 N·m can be used to tighten the bolts connecting the clamps to the jig during the pre-bending stage. Higher torques can be used for thicker substrates.

The DED thermal source generates thermal energy to sufficiently melt planned segments of the substrate's surface in a pre-determined order or position or both to form autogenous melt lines on the substrate surface. A gas jet device can be used to direct cooling gas toward the melting tracks to rapidly cool the melting tracks. The heating or heating/cooling thermal cycling can induce controlled formation and development of residual stress in the substrate. As a result, uniform thermally induced pre-bending of the substrate can be achieved or controlled to pre-determined levels as required.

Figure 6:
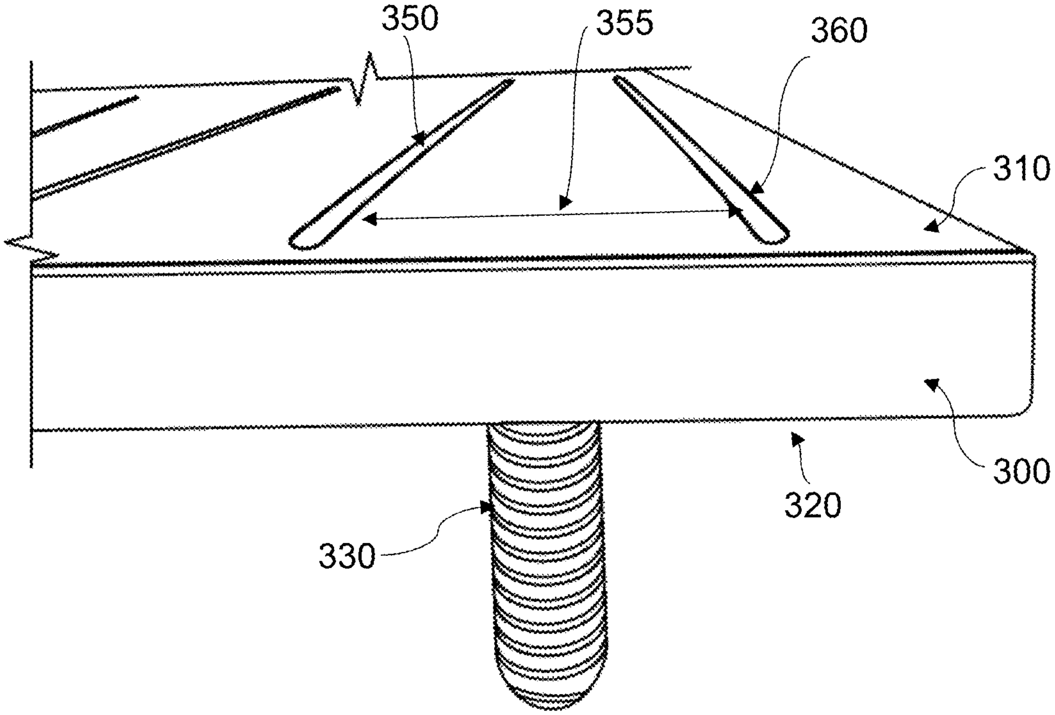
FIG. 6 illustrates melting tracks produced on a first side or backside of a substrate to pre-bend the substrate, and a DED backwall of a workpiece formed on the second side or frontside of the substrate.

The DED thermal source can be configured to provide enough thermal energy to induce melting tracks onto the DED substrate at relatively fast speeds. When used, the gas jet device can deliver high volumes of cooling gas, such as 100 L/min to 200 L/min, to impose a sharp heating/cooling cycle onto the substrate surface. For example, using a plasma transferred arc system, and a substrate thickness of 9.5 mm-10 mm, a current of 190 Amps, a voltage of 25.5V and a traverse speed of 10 mm/s can be used to produce melting tracks that are approximately 3 mm wide and up to 1 mm deep. This can correspond to an arc energy delivery of about 485 J/mm. The energy and traverse speeds can be adjusted for thicker substrates. An exemplary embodiment is shown in FIG. 6. In the embodiment shown, a substrate 300 having a first side 310 is shown having melting tracks 350 and 360 on the first side 310 having a space 355 between the melting tracks 350 and 355, and a DED backwall of the preform 330 on the second side 320 of the substrate 300.

The high temperatures applied quickly in addition to the cooling gas from the gas jet device promoting fast cooling rates can result in the formation of very steep thermal gradients around the melting tracks and towards the substrate (along the x, y and z-direction). A highly stressed state close to the material yield strength of the material of the substrate can be achieved.

Any gas jet device that can be configured to deliver a cooling gas to the melted surface of the substrate to rapidly cool the melted surface can be used. For Ti or Ti alloy material, an inert gas can be used as the cooling gas. The inert gas can be argon, helium, krypton, xenon or a combination thereof. The gas jet device can include a pipe, tube or other conduit or combinations thereof that can carry a cooling gas from a gas supply to an application area. The gas jet device can include a first end attached to a gas supply, and a second end that is positionable to direct the cooling gas exiting the second end to a desired location on the substrate so that the cooling gas impinges on the substrate surface, particularly in the area of the molten metal of the melting tracks. Multiple gas jet devices can be utilized to enhance or accelerate the cooling of the melting track. The second end of the gas jet device can include one or more than one nozzle that is adjustably positionable so that it can direct the cooling gas to a target location. The effect of the cooling gas impingement on the surface of the substrate can be greatest in the vicinity in which the cooling gas directly impinges, but the surrounding areas of the substrate also can be advantageously affected to reduce the temperature in the vicinity of the cooling gas. A pulsed gas flow can be used to provide the cooling gas. A fully turbulent gas flow can be used to increase cooling efficiency. Cooling gas jet devices are known in the art (e.g., see U.S. Pat. No. 4,090,697 (Perrine, 1978); U.S. Pat. No. 6,390,115 (Rohwer et al., 2002); and U.S. Pat. No. 7,381,364, Yamashita, 2008). An exemplary gas jet device is described in U.S. patent application Ser. No. 16/024,275, which published as U.S. Pat. App. Pub. No. US2019/0001437 on Jan. 3, 2019 (Mathisen et al.).

The pipe, tube or conduit of the gas jet device can be of any material having a channel extending therethrough compatible with the conditions expected to be present during DED deposition. The gas supply can be any source of a cooling gas, such as a compressor or a container of high-pressure gas that is in fluid communication with the gas jet device. Methods for delivering a pressurized gas to a gas conduit are known in the art.

The cooling gas can be supplied to provide a target flow rate of gas to impinge on the substrate surface. The flow rate of the gas can be greater than 50 L/minute, or greater than 100 L/minute, or greater than 150 L/minute, or greater than 200 L/minute. The flow rate of the gas can be from 50 L/minute to 500 L/minute. The flow rate of the gas can be from 50 L/minute to 250 L/minute. The flow rate of the gas can be from 50 L/minute to 100 L/minute. The flow rate can be selected to fast cooling and thus formation of high thermal and stress gradient conditions in the substrate.

The cooling gas can comprise an inert gas, such as argon, helium, neon, xenon, krypton and combinations thereof. The cooling gas can be applied in a constant stream, or can be applied intermittently, or can be applied in a pulsed flow. The temperature of the cooling gas applied can be any temperature. The cooling gas temperature can be the ambient temperature of the additive manufacturing process. The cooling gas temperature can be applied at a gas temperature of about 100° C. or less. The cooling gas temperature can be about room temperature or less, such as about 25° C. or less. The cooling gas temperature can be in the range of from about −10° C. to about 80° C.

For a preform or workpiece to be formed on the second surface of the substrate, the number of DED walls that have centerlines that are parallel to the short edge of the substrate, and the number of DED walls that have centerlines that are parallel to the long edge of the substrate, can be determined. If the majority of DED walls of a preform or workpiece have centerlines that are parallel to the short edge of the substrate, then melting tracks can be produced parallel to the short edge of the substrate. In general, substrates with large length-to-width aspect ratios would require melting tracks to be produced along its longest axis i.e. the axis where the largest effects of distortion will be expected. If the majority of DED walls of a preform or workpiece have centerlines that are parallel to the long edge of the substrate, then melting tracks can be preferentially produced parallel to the long edge of the substrate to counteract the largest effects of distortion along the longest axis of the substrate.

Thermally induced pre-bending on the first side or backside of the substrate can be applied so that the resulting melting tracks, and the typical distribution of longitudinal and transverse residual stress caused by welding, are positioned from about 10 mm to about 20 mm away from the centerlines of the majority of the DED walls of the preform or workpiece that will be deposited on the second or frontside of the substrate. The pre-bending forming technique applied on the first side of the substrate can be performed so that the resulting melting tracks are positioned from about 10 mm, or 11 mm, or 12 mm, or 13 mm, or 14 mm, or 15 mm, or 16 mm, or 17 mm, or 18 mm, or 19 mm, or 20 away from the centerlines of the DED walls of the workpiece that will be deposited parallel to a long edge of the substrate on the second or frontside of the substrate. The melting tracks can be positioned so that they can be present under the least area of the DED walls of the workpiece. An exemplary embodiment is shown in FIG. 6.

Preemptive knowledge about the shape of the DED workpiece to be deposited on the second side of the substrate can be used to determine the pre-bending heating procedure applied to the first side of the substrate. The heating procedure can be designed to result in the least number of melting tracks under areas where the DED workpiece is to be constructed. The final aggregated residual stress distribution, resulting from the combination of both DED and the melting tracks, has lower tensile peak at the centerline of the DED, and lower balancing compressive stresses away from the centerline of the DED, when compared to the original residual stress profile of the DED without pre-bending melting tracks (i.e. high tensile peak at the DED centerline and balancing compressive stresses further away).

Figure 7A:
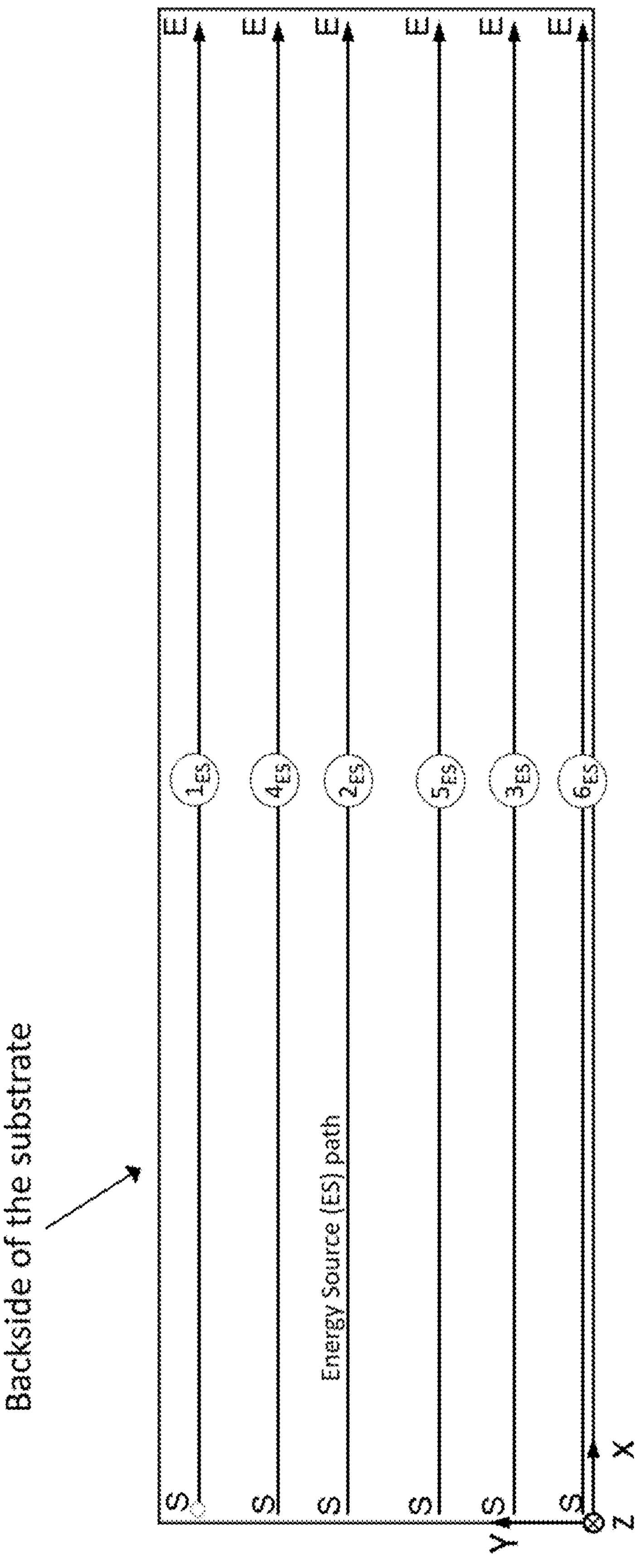
FIG. 7A illustrates an exemplary heating path that can be used to move a DED energy source to create melting tracks on the top surface of a backside or first side of a substrate in order to pre-bend the substrate towards the thermal source.

An exemplary embodiment showing the application of thermal energy to produce melting tracks on a substrate is illustrated in FIG. 7A. The illustration shows schematically an exemplary heating path that can be used to move a DED energy source to create melting tracks on the top surface of a backside or first side of a substrate in order to pre-bend the substrate towards the thermal source. The black arrows indicate the direction/path of the DED energy source, the circles containing $X_{ES}$ indicates the sequence X where X is 1 to 6 across the surface of the first side 310 of the substrate 300, with S indicating the start of the path and E indicating the end of the path of energy application, resulting in a heating path. In the illustrated pattern, heating can begin at a top edge across the x direction ($1_{ES}$), then the heat source can be moved in the y direction to a point less than halfway across the substrate and heat can be applied in the y direction from short edge to short edge ($2_{ES}$). This procedure can be repeated for $3_{ES}$, $4_{ES}$, $5_{ES}$, and $6_{ES}$. The first heating path 370 corresponds to $1_{ES}$. The second heating path 371 corresponds to $2_{ES}$. The third heating path 372 corresponds to $3_{ES}$. The fourth heating path 373 corresponds to $4_{ES}$. The fifth heating path 374 corresponds to $5_{ES}$. The sixth heating path 375 corresponds to $6_{ES}$.

The pre-determined DED heating/cooling thermal cycling can induce controlled formation and development of residual stress in the substrate. Application of a cooling gas using a gas jet device (not shown) can be used to accelerate cooling. As a result, uniform thermally induced pre-bending of the substrate can be achieved/controlled to pre-determined levels.

Figure 7B:
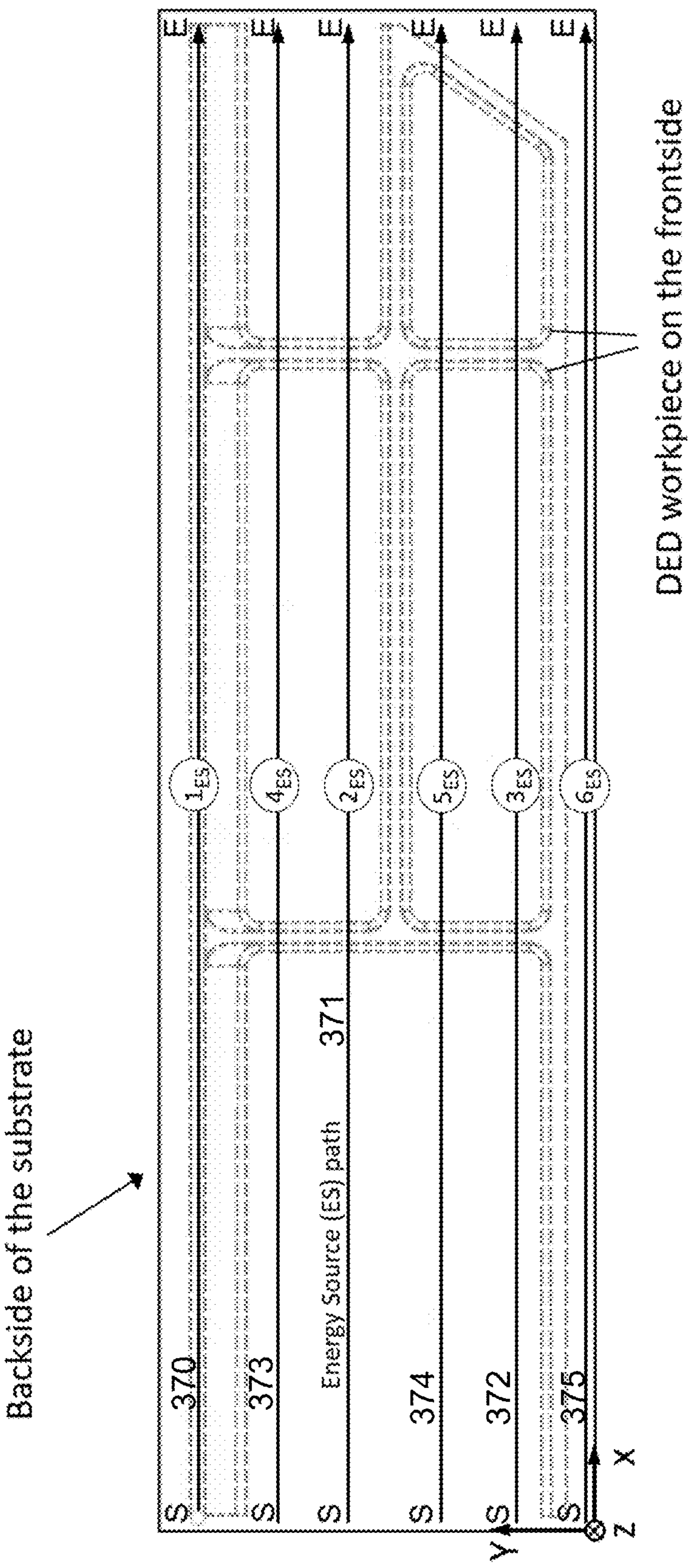
FIG. 7B illustrates schematically the relative positions of the thermally induced pre-bending melting tracks produced by heating paths on the backside or first side of the substrate, relative to the overlaid (grey dashed line) DED workpiece to be manufactured on the reverse frontside or second side of the substrate.

FIG. 7B illustrates schematically the relative positions of the thermally induced pre-bending melting tracks produced by heating paths 370 to 375 (indicated as $1_{ES}$ through $6_{ES}$) on the backside or first side of the substrate, relative to the overlaid (grey dashed line) DED workpiece preform 600 to be manufactured on the reverse frontside or second side of the substrate. The melting tracks can result from application of thermal energy in the heating paths.

Figure 8A:
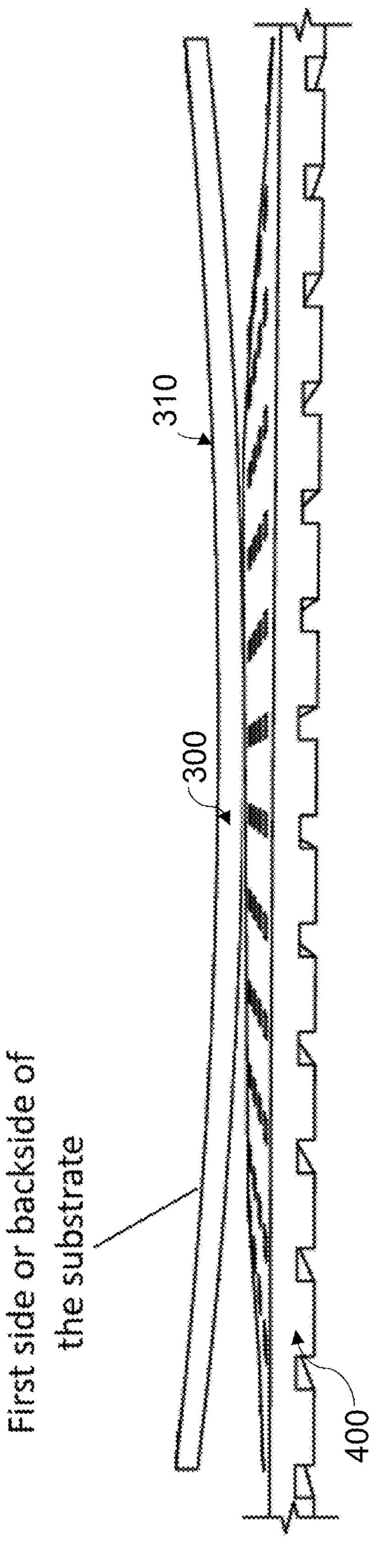
FIG. 8A illustrates the uniform longitudinal bowing resulting in a substrate when heated to induce melting tracks and pre-bend the substrate.
Figure 8B:
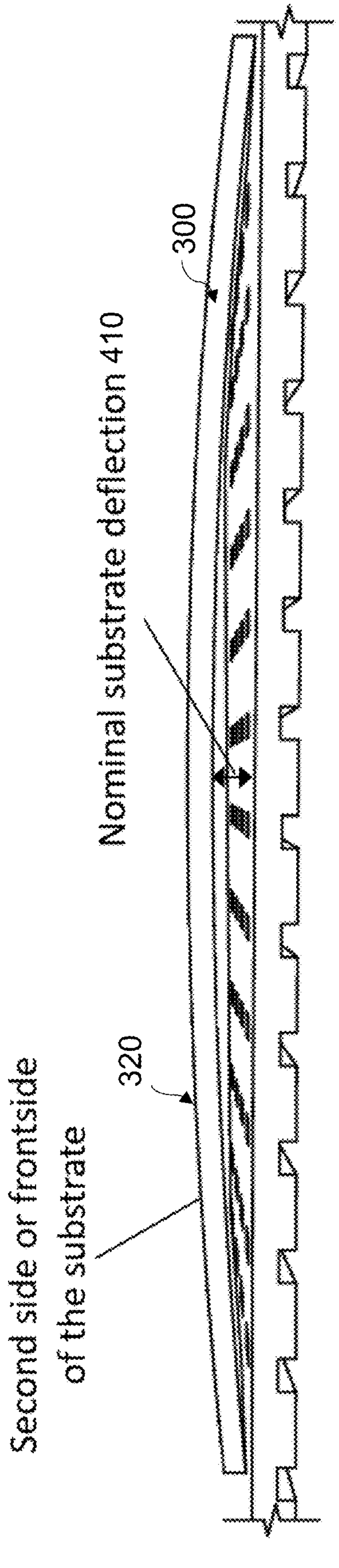
In FIG. 8B the substrate is flipped upside-down. In the substrate depicted, the maximum nominal substrate deflection 410 normal to the plane of the plate was about 15 mm. In both figures the pre-bend substrate is resting on the jig 400.

The thermal source of the melting tool can heat the backside of the substrate to form melting tracks in pre-defined locations onto the substrate to impart thermal stress into the substrate. The thermal stress can cause the substrate to bend. Because the substrate can be securely clamped to the jig, the bend of the substrate is not apparent while the substrate is attached to the jig. Once the clamps are removed, the substrate can bow upwards away from the jig i.e. in the direction of the thermal source. A uniformly deformed pre-bent substrate can be defined by a well-defined radius of the bow. The resulting uniform elasto-plastic pre-bending effect onto the substrate caused by the thermal energy application, after clamps to the jig have been removed is illustrated in FIG. 8A. The resulting substrate 300 is curved upward away from the jig 400 and exhibits a nominal substrate deflection. In FIG. 8B the substrate is flipped upside-down. As seen in FIG. 8B, the pre-bent substrate has a uniform elasto-plastic bend (bow) caused by the application of the intense thermal energy and cooling gas to induce large temperature and stress gradients on the backside of the substrate. In FIG. 8B the nominal substrate deflection 410 is shown.

The thermally induced substrate pre-bending procedure can result in longitudinal residual stress distribution. A comparison of the residual stress map of several pre-bent substrates thermally pre-bent as described herein demonstrated the characteristic distribution of residual stresses, where large tensile stresses develop at the weld centerline ($+\sigma_L$ up to 600 Mpa) and are balanced by compressive stresses further away ($-\sigma_L$ up to −300 MPa).

The nominal substrate deflection $h_{sub}$ (bow) of the substrate along the z-direction ($h_{sub}=z_{max}-z_{min}$) for a substrate having dimensions 635 mm×190 mm×9.5 mm (L×W×T), can be 15 mm after thermally induced substrate pre-bending is applied. This is a measured value that was also validated by modelling. The substrate length ratio $L_r$ is the ratio between the new x dimension of the substrate $L_i$ and the substrate length $L_0$ of 635 mm. The predicted maximum substrate deflection $h_{Lr}$ is approximately proportional to the product between the nominal substrate deflection $h_{sub}$ and the square of the substrate length ratio $L_r$, which is calculated according to the formula:

$$L_r = L_i / L_0$$

and thus $$h_{Lr} \approx h_{sub} \times L_r^2.$$

As an example, a longer substrate size with a substrate length ratio of three (i.e. $L_r$=1905/635=3) is expected to bow $15\times3^2$=135 mm after thermally induced substrate pre-bending is applied. Thus, the amount of deflection of the substrate can depend on the characteristics of the substrate. The longer the substrate, the higher/larger the deflection will need to be.

The thermal source for providing thermal energy to produce melting tracks on the backside of the substrate can be any energy source capable of delivering sufficient thermal energy to melt the substrate at the heat application area to form melting tracks. Exemplary thermal sources that can be used include an electric arc plasma, a laser beam, an electron beam, and any combination thereof. In some configurations, two or more melting tools providing separate thermal sources can be used. For example, one melting tool providing a thermal source can be used to pre-heat the substrate and a second melting tool providing a thermal source can be used to melt the pre-heated substrate to form the melting tracks. When multiple melting tools providing separate thermal sources are used, they can be the same or they can be different from each other. Example combinations of multiple melting tool providing DED thermal sources include two PTA torches producing electric arc plasmas, two laser devices producing laser beams, two electron beam devices producing electron beams, a PTA torch producing an electric arc plasma and a laser heat source producing a laser beam, a PTA torch producing an electric arc plasma and an electron beam heat source producing an electron beam, and a laser device producing an electron beam and an electron beam device producing an electron beam.

Sufficient heat can be applied to the substrate surface in order to heat the substrate to melt at least a portion of the substrate at the heat application area in order to form melting tracks. The targeted temperature to be delivered by the thermal source can be the melting temperature of the substrate material, or a temperature from 5° C.-50° C. greater than the melting temperature of the substrate, or a temperature from 10° C.-20° C. greater than the melting temperature of the substrate. The localized heating of the substrate can help to induce stress into the substrate to produce a highly stressed substrate in an elasto-plastic state, and when the substrate is unclamped from the jig, the substrate bows to form a pre-bent substrate to stabilize or balance the residual stresses imparted by the pre-bending steps. The highest stress typically can be induced at the melting track, with a tensile stress peak at the centerline of the melting track. The tensile residual stress peak can be close to the yield strength of the material. As the distance away from center line increases, residual stress becomes compressive. One can observe if enough stress has been induced by observing the amount of upwards displacement (i.e. bow). The higher the displacement the higher the residual stress introduced during pre-bending. For most substrates, the maximum tensile residual stress is close to the yield strength of the base material. The order and positions of these melting tracks relative to the DED can be varied to achieve a target residual stress redistribution.

The amount of heating and the number of melting tracks produced on the backside of the substrate necessary to induce the targeted stress can be determined experimentally. For example, the object can be produced on a first substrate using DED without pre-bending the first substrate, and the resulting distortion in the substrate can be measured. A second substrate having similar characteristics to the first substrate then can be pre-bent by forming melting tracks on the backside of the second substrate in an amount necessary to fully or partially compensate for the amount of distortion measured in the first substrate. The amount of heating and the number of melting tracks produced on the backside of the substrate necessary to induce the targeted stress also can be determined based on modeling predictions, modeling, calculations or combinations thereof. Modeling can be used, e.g., to predict distortion and residual stress development in the substrate, and experiments can be used to confirm the modeling predictions. Simulations also have been found to be in very good agreement with experimental data. In some embodiments, in addition to the pre-determined placement of the melting tracks from about 10 mm to about 20 mm from centerlines of the preform, the melting tracks also can be produced along the longest substrate length on parts with high aspect ratio. Assuming a squared and relatively symmetric preform shape is to be produced onto a squared substrate, a cross pre-bending thermal energy application pattern onto the underside of the substrate can be used to induce bending on both longitudinal and transverse directions. As a result, the clamping mold could assume a dome shape.

After formation, the pre-bent substrates can be handled in a consistent manner as would be done with a conventional substrate. For sake of consistency, the pre-bent substrate temperature can be selected, and the same temperature can be used for forming similar preforms. The temperature of the pre-bent substrate can be room temperature when used and fixed to the jig. The temperature of the pre-bent substrate can be 50° C. or higher when used and fixed to the jig. In typical additive manufacturing processes, the number of substrates required to manufacture a targeted number of preforms can be determined, and a sufficient number of pre-bent substrates can be produced one by one, and then each individually can be fixed to the jig at a target temperature, such as room temperature.

2. Securing Pre-Bent Substrate to the Jig

After the pre-bending of the substrate is completed, the pre-bent substrate can be attached to the jig or welding table. The pre-bent substrate can be attached to the jig, e.g., using clamps that are attached to the jig. The curved clamping mold can be used as an underlying support between the pre-bent substrate and the jig. The pre-bent substrate can have the same curvature as the curved clamping mold. The pre-bent substrate can have a curvature that is different from the curvature of the curved clamping mold. The pre-bent substrate can be positioned so that the backside with the melting tracks can be in contact with the curved surface of the curved clamping mold. The clamps, which are attached to the jig, can exert a force on the pre-bent substrate to elastically deform the pre-bent substrate. The clamps can force the pre-bent substrate to conform to the curvature of the curved clamping mold. The clamps can be made of a high-strength steel, ultra high-strength steel, or a high-strength low-alloy steel.

As clamping progresses to secure the pre-bent substrate to the jig, the curvature of the pre-bent substrate can become gradually similar to that of the curved clamping mold, and the clamping can result in the curvature of the pre-bent substrate to be the same as the maximum deflection of the curved clamping mold. Sufficient force can be exerted by the clamps so that a surface of the pre-bent substrate is brought completely into contact with the curved surface of the curved clamping mold. A thicker substrate can offer more resistance and thus can require the clamps to apply a higher force to overcome the elastic reaction of the pre-bending in order to conform the pre-bent substrate to the curved clamping mold. The amount of force necessary for the clamps to attach the pre-bent substrate to the jig and bring the pre-bent substrate into contact with the underlying curved clamping support can be from about 10 Nm to about 120 Nm. For example, for a Ti-6Al-4V substrate having a thickness of about 9.5 mm-10 mm, a torque of only 40 Nm can be exerted by the clamps to attach the pre-bent substrate to the jig and to conform the pre-bent substrate to the curved clamping mold.

The clamps can be torqued to apply an initial tightening force to the substrate, followed by application of additional torque to apply a final torque to the substrate. The initial tightening can be achieved by sequential tightening of the clamps, or by tightening of clamps positioned opposite of each other. The curvature of the pre-bent substrate can become gradually similar to that of the curved clamping mold. The pre-bent substrate can be in full contact with the curved clamping mold upon application of the final torque. The pre-bent substrate can be in contact with from about 95% to about 100% of the curved clamping mold upon application of the final torque.

Figure 14A:
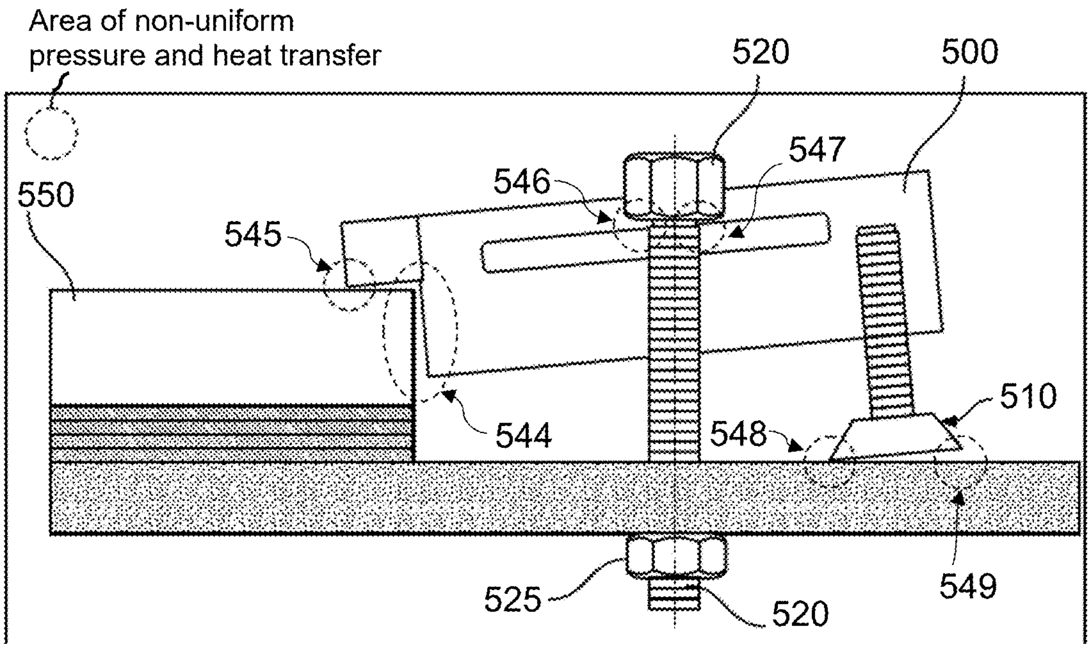
FIG. 14A is an illustration showing non-optimal setup of an individual clamp. The dashed circles indicate areas of non-uniform pressure and heat transfer distribution.

The pre-bent substrate can be connected to the curved clamping mold to ensure that the substrate can be in full contact with the curved surface of the curved clamping mold, such as from about 95% to about 100% contact, to obtain consistent thermal and mechanical conditions at the interface between the pre-bent substrate and the curved clamping mold. Due to the curvature of the curved clamping mold, significantly less torque needs to be applied to the substrate via the clamps than would be required to attach the pre-bent substrate flat to the jig without the curved clamping mold. The curvature of the mold can be mimicked by the plate-boundary conditions. Full contact between the substrate and the curved clamping mold can be a good indicator of satisfactory clamping. To achieve satisfactory clamping, (a) consistent clamping force can be used by applying torque-controlled tightening of the bolt attaching the clamps; (b) consistent dimensions can be selected from the clamps; (c) clamping can be applied symmetrically; (d) an evenly distributed pressure and heat transfer distribution can be ensured by proper attachment of the clamps to avoid gaps and uneven pressure application; or (e) any combination of (a) through (d). For example, the clamp can be attached to the baseplate via a countersunk screw that is flush with the top surface of the clamp to ensure an evenly distributed between the clamp and the baseplate. The bottom and side contact facets of the clamps can be configured and placed so that they are flush and in contact with the baseplate to ensure even pressure and even heat transfer distribution. For example, see FIGS. 14A and 14B. The dashed circles 544, 545, 546, 547, 548, and 549 in FIG. 14A show areas of non-uniform pressure and heat transfer distribution because of the way the countersunk screw 510 and bolt 520 adjusted via nut 525 adjusts clamp 500 to attach the baseplate 550 to the jig's surface 530. In the illustration shown, the baseplate 550 is insulated from the jig's surface 530 by layers of alumna insulation plates 540 to 543.

Figure 14B:
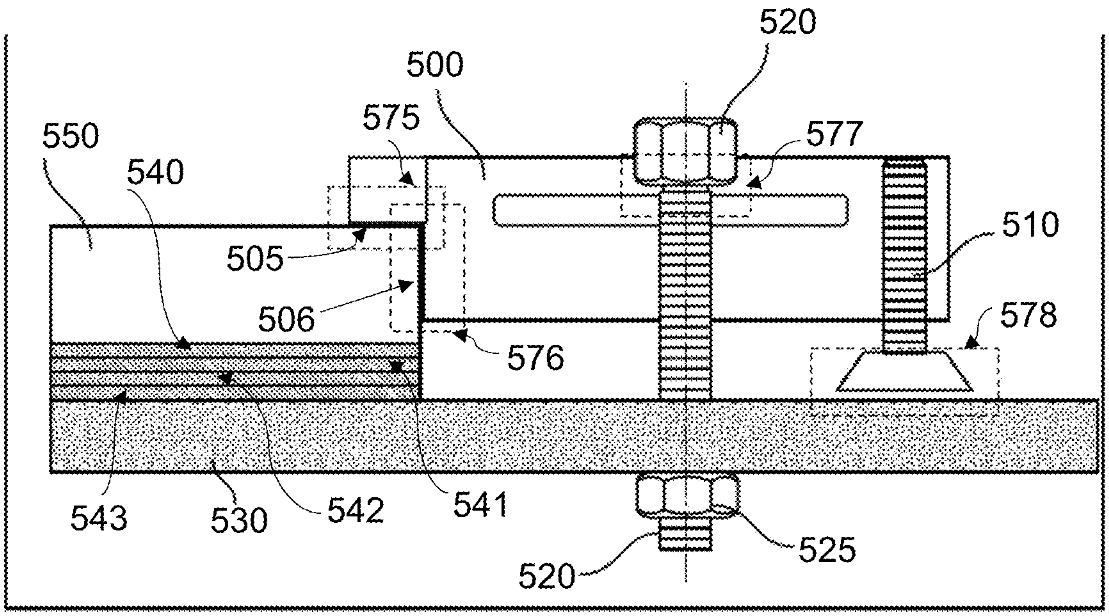
FIG. 14B is an illustration showing a setup of an individual clamp illustrating evenly distributed load onto the contact area of the clamp/baseplate ensuring even pressure and heat transfer distribution.

To avoid non-uniform pressure and heat transfer distribution, the countersunk screw 510 can be adjusted so that the tip 515 of the countersunk screw 510 is flush with the top surface 507 of the clamp 500, as illustrated in FIG. 14B. Doing so can result in uniform pressure and heat transfer distribution. The boxes 575, 576, 577 and 578 in FIG. 14A show areas of uniform pressure and heat transfer distribution achieved because of the way the countersunk screw 510 and bolt 520 adjusted via nut 525 adjusts clamp 500 to attach the baseplate 550 to the jig's surface 530. The illustrated embodiments show bottom contact facet 505 and side contact facet 507 of clamp 500 to be flush with the top and side surfaces, respectively, of the baseplate to ensure even pressure and heat transfer distribution.

When the pre-bent substrate is attached to the jig using the curved clamping mold as an underlying support, there can be a slight redistribution of longitudinal residual stress. For example, the $+\sigma_L$ tensile stress peak at the weld centerline can increase from about 600 Mpa up to about 700 Mpa, while the $\sigma\sigma_L$ compressive stress away from the centerline can decrease from about −300 Mpa to about −200 MPa.

The clamping of the pre-bent substrate to the curved clamping can occur in the elastic mode. The curvature imposed by the clamping of the substrate to the mold can be completely reversible if the substrate were to be unclamped from the curved clamping mold at this point. This is particularly true for substrates made of a metal having high spring-back at room temperature. The elastic deformation imposed by the force of the clamps can be distinguishable from the plastic deformation introduced into the substrate with the pre-bending steps.

The clamps used to fix the substrate to the jig or welding table typically can be made from a material that exhibits high strength and low deformability. Steel can be used as the material for the clamps because of its high strength, thermal stability and resistance to deformation. Steel typically can have a thermal conductivity higher than the substrate. For many substrates, the thermal transfer of the steel in the clamps can be orders of magnitude higher than the substrate. This difference in thermal conductivity between the clamps and the substrate can result in the clamps acting as heat sinks. As heat sinks, during the DED process, the clamps in direct contact with the substrate can result in the rapid flow of thermal energy from areas of the substrate adjacent or in the vicinity of point of attachment of the clamps to the clamps, and then from the clamps to the jig or welding table. This can result in the creation of high thermal gradients in the pre-bent substrate during the DED process. The high thermal gradients can impose stress and distortion on the substrate during the deposition process.

To mitigate or prevent formation of the thermal gradients due to the clamps acting as heat sinks, the clamps can be thermally insulated. The thermal insulation can mitigate or prevent transfer of heat from the substrate to the jig via the clamps. An insulative coating can be applied to all surfaces of the clamps. An insulative coating can be applied to all surfaces of the clamp that can come into contact with the substrate. The insulative coating can be any coating that does not effectively transfer thermal energy. The insulative coating can be made of a ceramic material, a silicon carbide, a silicon nitride, a boron carbide or any combination thereof. The ceramic material can be or comprise an alumina, a zirconia, titanium oxide, an alkaline earth metal silicate, an aluminum titanate, a zirconium dioxide, a zirconium dioxide stabilized by addition of yttrium oxide, a yttrium aluminum oxide, $ZrV_2O_7$, $Mg_3(VO_4)_2$ or a combination thereof. Any high temperature ceramic coating known in the art can be used (e.g., see U.S. Pat. No. 4,321,310 (Ulion et al., 1982), U.S. Pat. No. 5,789,330 (Kondo et al., 1998), U.S. Pat. No. 5,304,519 (Jackson et al., 1994); U.S. Pat. No. 6,387,539 (Subramanian, 2002); and U.S. Pat. No. 6,998,064 (Gadow et al., 2006). The clamps can be coated with zirconium dioxide stabilized by addition of yttrium oxide, such as a plasma sprayed $ZrO_2$ $8Y_2O_3$. The insulative coating can include multiple layers of different types of ceramics, carbides or nitrides or combinations thereof, or multiple layers of one type of ceramic, carbide, nitride or combination thereof.

Many of these materials are commercially available and can be applied using various techniques known in the art. For example, the insulative coating can be applied using any process, including atmospheric plasma spray, magnetron sputtering, chemical or electrochemical deposition, such as electrophoretic deposition, or physical vapor deposition, such as electron beam physical vapor deposition, or any combination thereof.

The thickness of the insulative coating applied to the clamp can vary depending on the type of insulative material used, and its ability to support a load without being damaged by application of a compressive force. In some configurations, the thickness of the insulative coating can be from 0.1 mm to 5 mm, or from 0.25 to 4 mm, or 0.3 to 3 mm, 0.4 mm to 2 mm, or 0.5 mm to 1.5 mm. The insulative coating can be at least 0.1 mm, or at least 0.25 mm, or at least 0.5 mm, or at least 0.75 mm, or at least 1 mm, or at least 1.25 mm, or at least 1.5 mm, or at least 2.0 mm, or at least 2.5 mm, or at least 3.0 mm, or at least 3.5 mm, or at least 4.0 mm, or at least 4.5 mm. The insulative coating can have a thickness of 0.1 mm, or 0.25 mm, or 0.5 mm, or 0.75 mm, or 1 mm, or 1.25 mm, or 1.5 mm, or 2.0 mm, or 2.5 mm, or 3.0 mm, or 3.5 mm, or 4.0 mm, or 4.5 mm or 5 mm. The insulative coating layer can reduce heat transfer from the DED substrate to the jig, thereby reducing heat loss from the DED substrate. An example of an insulative coating is 0.5 mm to 1.5 mm $ZrO_2$ $8Y_2O_3$ plasma sprayed onto the contact surfaces of the clamps to aid in the reduction of conduction heat transfer from the DED substrate to the clamps. This can provide increased thermal insulation and lower thermal conductivity.

To further reduce thermal transfer from the substrate to the jig via the clamp, the surfaces of the clamp in thermal communication with the substrate can be modified to have a knurled pattern. The knurling of the surface can mitigate the amount of the surface of the clamp in contact with the substrate. The knurling can reduce the chance of thermal conductivity between the clamp and the substrate. Any knurling pattern known in the art can be used on a surface of the clamp that can come into contact with the substrate. Exemplary knurling patterns include angled patterns such as diagonal patterns, straight line patterns, diamond patterns, or any combination thereof. The knurled pattern also can have an insulative coating layer on its surface.

To reduce thermal transfer from the substrate to the jig via the clamp, the surfaces of the clamp in thermal communication with the substrate can be modified to have a corrugated surface that includes a series of ridges and troughs. The corrugated surface can mitigate the amount of the clamp in contact with the substrate. The corrugated surface can reduce the chance of thermal conductivity between the clamp and the substrate. Any corrugated pattern known in the art can be used. The corrugations can be in any direction on a surface of the clamp. Exemplary configurations include angled patterns such as diagonal corrugations, straight line corrugations parallel to the long edge, straight line corrugations parallel to the short edge, or any combination thereof. The corrugated surface also can have an insulative coating layer on its surface.

Due to limitations in the coating technology, thicker layers of insulative coating can be more difficult to achieve that can withstand compressive forces necessary to secure the pre-bent substrate to the jig. The specific compressive strength of the insulative coating can be determined by the composition of the insulative coating. For example, a 0.5 to 2.0 mm coating of a ceramic based on zirconium dioxide stabilized by addition of yttrium oxide has been found to provide good thermal isolation as well as good compressive resistance without damage to the insulative coating when the clamp is used to connect the substrate to the jig.

Figures 9A, 9B, 9C:
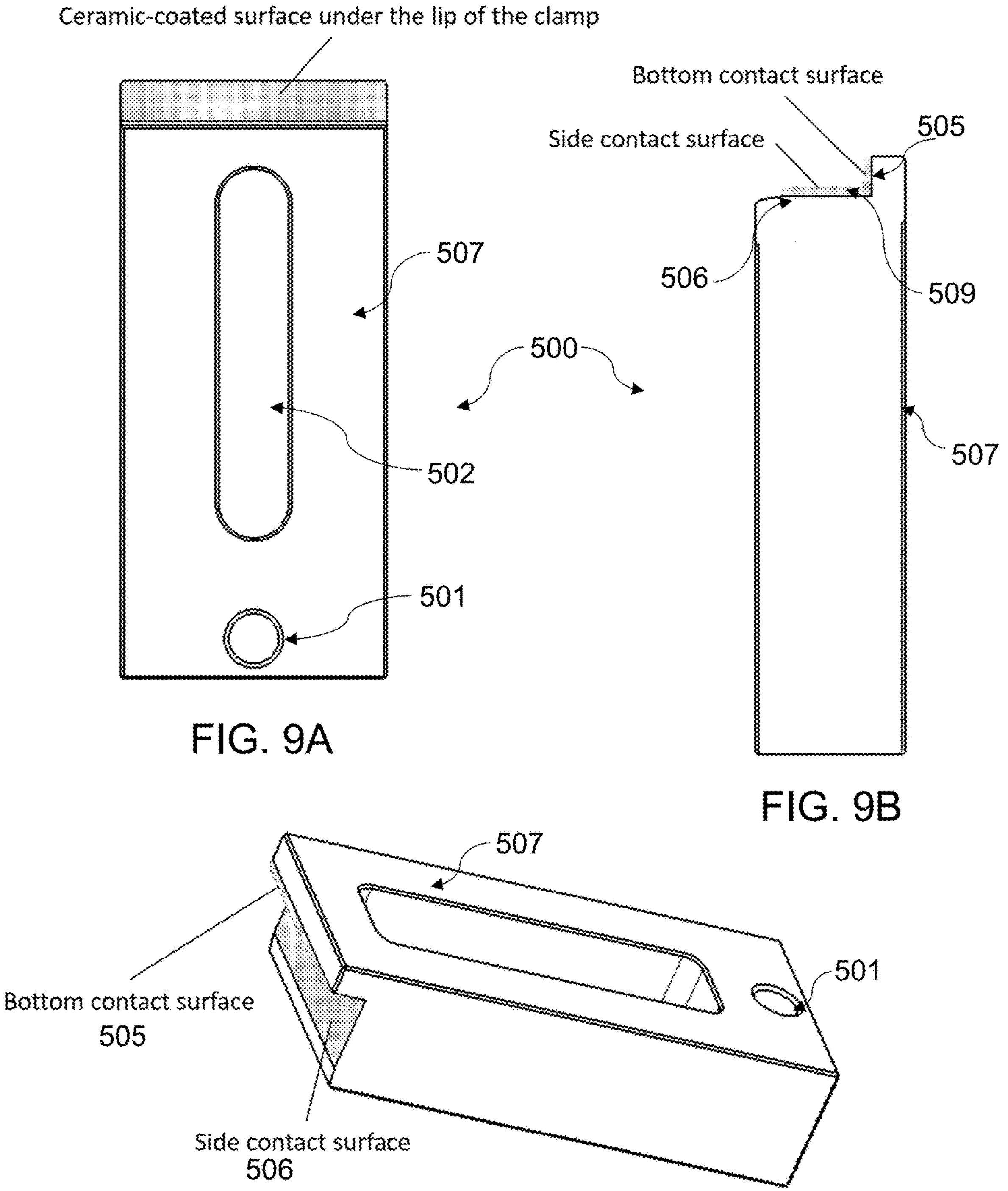
FIG. 9A illustrates a bottom view.
FIG. 9B illustrates a side view.
FIG. 9C illustrates a skewed overhead three-dimensional view of an exemplary insulated high-strength steel clamp. The figures depict exemplary surfaces that can be coated with a ceramic coating to minimize heat flow by conduction between the insulated high-strength steel clamp and the pre-bent substrate when the clamp is used to attach the plastically pre-bent substrate and the jig.

An exemplary configuration of clamp is shown in FIGS. 9A, 9B and 9C. FIG. 9A shows a bottom view of clamp 500 having a threaded hole 501 for accepting a countersunk screw and a hole 502 that accommodates a bolt. The top surface 507 can include a ceramic-coated surface 509 at the edge that will be in contact with the baseplate. The top surface 507 can be corrugated. FIG. 9B shows a side view of clamp 500 showing the ceramic-coated surfaces 509 of the bottom contact facet 505 and side contact facet 506 that comes into contact with the baseplate. FIG. 9C shows a skewed overhead view showing a three-dimensional view of clamp 500, showing the threaded hole 501 and the ceramic-coated bottom contact facet 505 and side contact facet 506 of clamp 500. Clamps having the same design can be used (e.g., all having the same length, or same width, or same length and width). Clamps having differing lengths and/or widths also can be used.

Thermally insulated clamps can be placed around the entire perimeter of the pre-bent substrate to ensure that the pre-bent substrate is in full contact, such as from about 95% to about 100% contact, with the curved clamping mold. An exception to using only insulated clamps would be when a PTA torch is used as a DED melt tool to provide an electric arc plasma as a thermal source. In such configurations, one or more non-insulated clamps can be used to provide a path for current. For example, in an exemplary configuration, two or three uninsulated clamps can be used to ensure a stable electrical current path from the power supplies. In such a configuration, one or two uninsulated clamps can be positioned on the short edges of the baseplate, and one uninsulated clamp can be positioned at the middle section of the longest baseplate dimension. Other configurations can be used.

Figure 10:
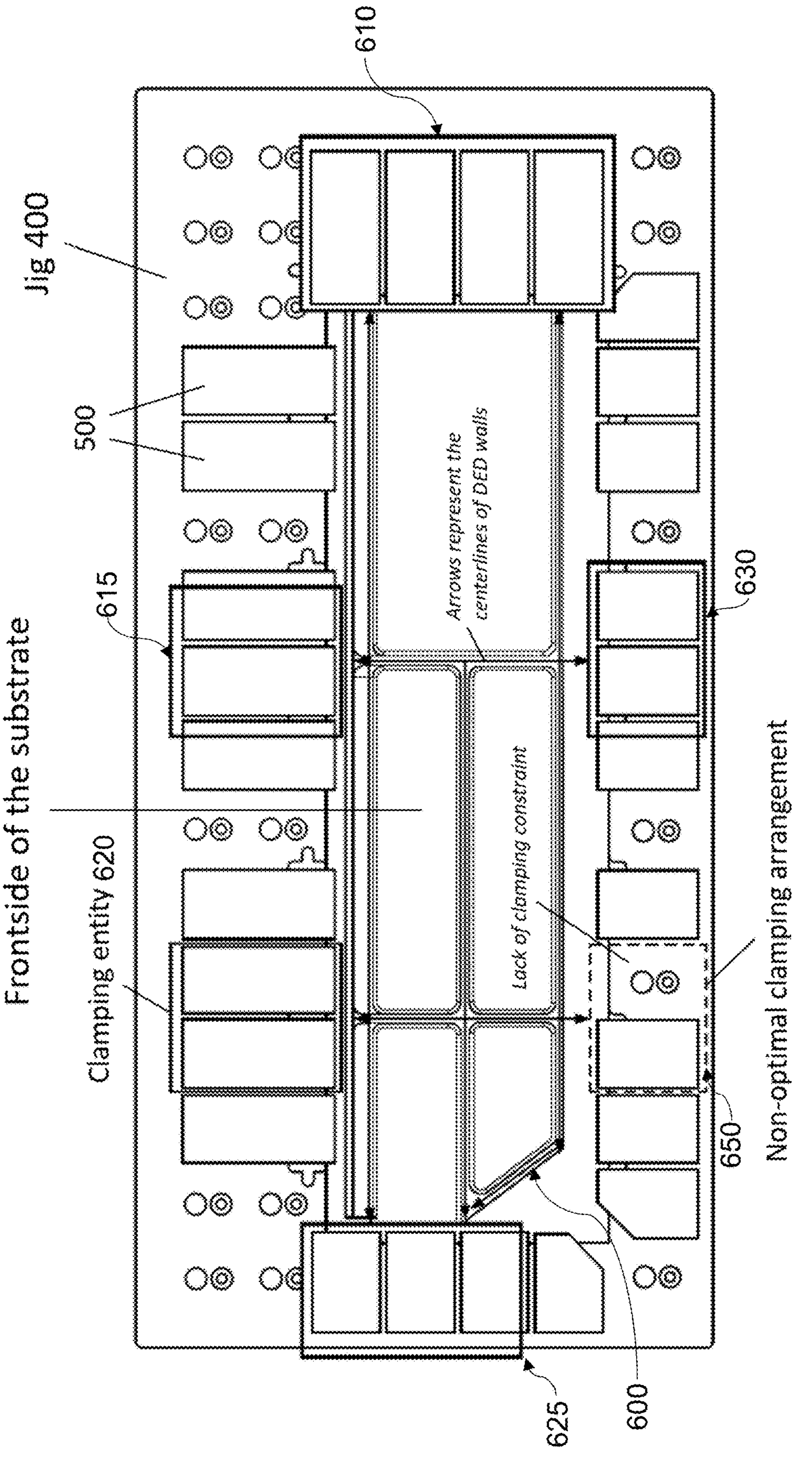
FIG. 10 illustrates an exemplary clamping arrangement to use insulated or corrugated clamps to attach the pre-bent substrate to the jig. The illustration shows that the clamps can be positioned such that the centerlines of the clamp (or clamping entity when several clamps are used in combination, such as showed in the solid boxed outlines around several of the clamps) meet the centerlines of start/end positions of the DED walls wherever possible. These substrate clamping constraints can substantially reduce the deformation effects arising primarily from longitudinal residual stresses. Non-optimal clamping can result in local deformation or buckling caused by the lack of clamping constraint. For illustration, a non-optimal clamping arrangement 650 is illustrated in the dashed box of the drawing. Only one clamp is used off-center to axially constrain the movement of the baseplate upwards. This is a non-optimal clamping arrangement because the centerline of the clamp/entity does not meet the centerlines of start/end positions of the DED wall.

To mitigate stress and distortion in the substrate during metal deposition and object fabrication, clamps can be positioned onto the substrate in a way that the centerlines of the clamps meet at the start/end positions of DED strings/walls wherever possible. An exemplary configuration is shown in FIG. 10. In the configuration illustrated, clamps 500 are positioned around preform 600 so that almost all of the periphery of the substrate 300 is clamped to the jig 400, positioned so that the centerlines of the clamps 500 meet the centerlines of start/end positions of DED strings/walls of preform 600 wherever possible (illustrated as clamping entities 610, 615, 620, 625, and 630). These substrate clamping constraints can substantially reduce the deformation effects arising primarily from longitudinal residual stresses during deposition. Non-optimal clamping can result in local deformation or buckling caused by the lack of clamping constraint, as shown in the dashed box outline 650.

Different clamping arrangements can be using during pre-bending and attaching the pre-bent substrate to the jig for DED processing. The differences in the clamping arrangements can be selected because, during pre-bending, thermal energy application to the backside of the substrate using a melting tool providing the DED thermal source can require increased access by the thermal source to the full-length or nearly full-length of the substrate in order to produce a uniform deflection along the longest substrate length. Insulated clamps may not be used at the edges in order to enable the melting tool providing the DED thermal source to apply thermal energy to the full-length of the substrate. During build of the object by metal deposition on the frontside of the substrate, insulated clamps can be placed around the perimeter of the substrate, particularly at start/end positions of DED walls to help reduce local deformations arising from residual stress development. The clamping configuration can (1) promote symmetry across the plate, (2) make use of clamps with identical geometry when possible, (3) allow desired access to substrate by the melting tool providing the DED thermal source, and (4) fulfill the torque requirements necessary to attach the pre-bent substrate to the jig.

The use of the curved clamping mold can significantly improve the manufacturing process, but it is possible to perform the DED process on the frontside of the pre-bent substrate by using sheets of insulative material, such as the conventional sheets or plates of alumina ($Al_2O_3$) insulation cut to form a curvature roughly matching the bow of the pre-bent substrate. This is significantly more work intensive than the use of the curved clamping mold provided herein. In addition, due to variation in thickness of alumina insulation sheets, and the formation of the layers of the pre-cut sheets to match the curvature of the pre-bent substrates, variations between workpieces can occur. The curved clamping mold provided herein can mitigate or prevent such part-to-part variation by providing a mold with consistent physical and mechanical characteristics that can be used multiple times.

3. Pre-Heat the Substrate

Once the pre-bent substrate has been secured to the jig using the curved clamping mold and insulated clamps, the pre-bent substrate can be pre-heated prior to beginning the DED process. The pre-heating step is intended to treat most of the surface of the frontside of the substrate with a heat source to uniformly heat the substrate as a whole to a target temperature, followed by building of the workpiece using the DED process while the pre-bent substrate is still hot.

Contrary to the way energy is applied to the backside of the substrate in the pre-bending step where steep thermal gradients and high cooling rates are selected in order to create higher internal tensile and compressive stresses, during the pre-heating step, energy is delivered towards the frontside of the substrate in a more gentle and consistent fashion. During the pre-heating step, energy can be directed to the frontside of the substrate using the thermal source under conditions that do not melt locally the substrate surface. During the pre-heating step, energy can be directed to the frontside of the substrate using the thermal source under conditions that do not form continuous melting tracks. Because close-to-uniform heating is desired, energy from the thermal source can be applied at relatively low speeds of the melting tool providing the thermal source, and with the melting tool providing the thermal source positioned at a higher standoff distance (further away from the substrate) in order to apply the thermal energy at a lower energy density. In addition, because the pre-heating step is intended to heat the substrate prior to workpiece build using the DED process, no cooling gas is applied using a gas jet device. Hence, the cooling rate is significantly lower than the cooling rate that can occur in the pre-bending step.

This slower heating/cooling cycle during pre-heating can promote slow cooling rates and low thermal gradient formation in the substrate along the x, y and z-direction. Application of energy during pre-heating can be done in a way that allows slow residual heat build-up, because the heat can dissipate throughout the pre-bent substrate volume by conduction. For example, lower thermal gradients can be delivered to the substrate at lower energy density. These conditions can generate a "close to" uniform temperature distribution across the baseplate to allow the slow build-up of residual heat as heat dissipates throughout the baseplate volume by conduction. Because the pre-bent substrate is thermally isolated from the curved clamping mold, and insulated clamps are used to secure the pre-bent substrate to the jig, residual heat can be more easily retained in the substrate.

Low energy density can be delivered to the substrate in a sequential fashion in order to generate a close-to-uniform temperature distribution across both the surface of the substrate and through the thickness of the substrate. In order to avoid exposure of one area to accumulated thermal energy, the application of energy can begin at a first edge of the substrate and can continue across the surface of the substrate along the x direction until the opposite second edge of the substrate is reached. The melting tool providing the thermal source then can be moved back to the first edge and repositioned in the y direction some distance from the first pass of energy application and energy is applied along the x direction. This process is repeated until the temperature of the pre-bent substrate has reached a targeted temperature. The more uniform the temperature distribution is in the substrate, the better for mitigating stress and distortion effects from occurring in the substrate.

Figure 11:
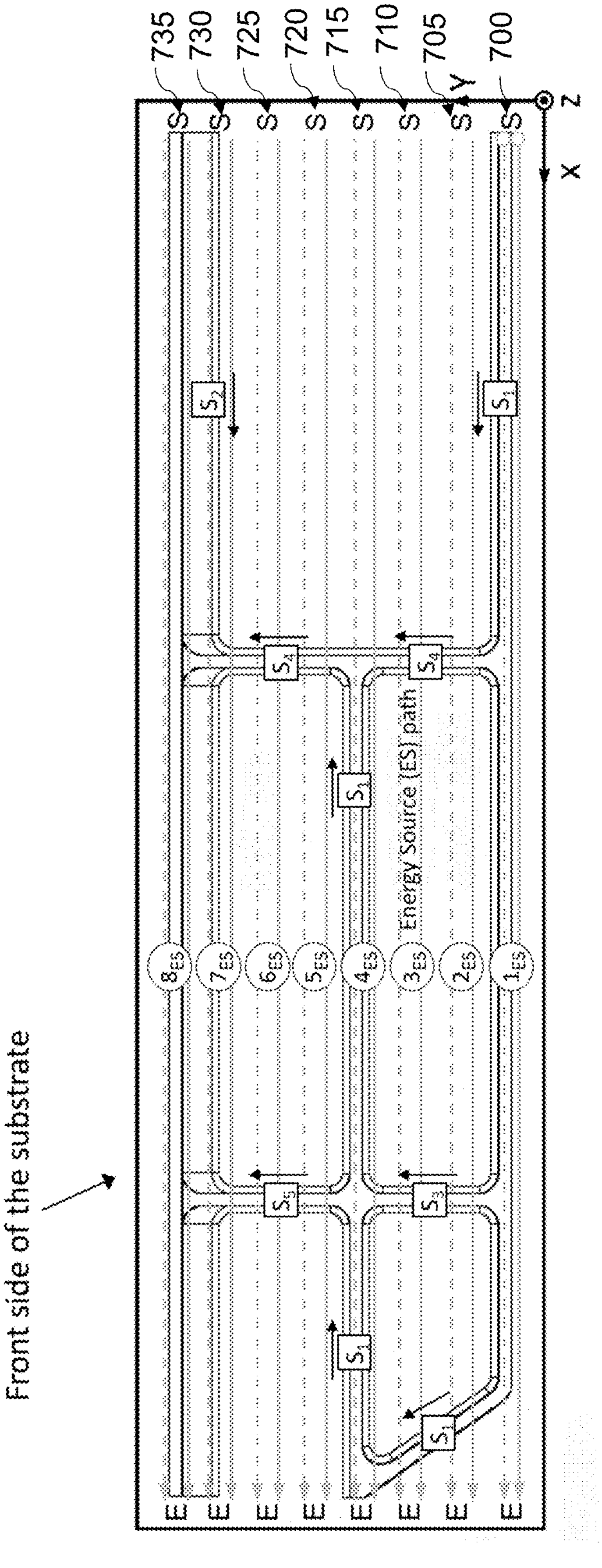
FIG. 11 shows schematically the relative positions of the black faded pre-heating paths on the frontside of the substrate prior to DED deposition, with an overlay of the shape of the workpiece to be formed. The exemplary embodiment shows application of low energy density applied by the thermal source in the x direction from short edge to short edge across the face of the pre-bent substrate in they direction. The figure shows solid and dashed black faded lines which represent for example the toolpaths and preheating sequences of two melting tools running in parallel.

An exemplary pattern for energy application during pre-heating is shown in FIG. 11. The black faded arrows indicate the direction/path of the DED energy source, the circles containing $X_{ES}$ indicates the sequence X where X is 1 to 8 across the surface of the second side 320 of the substrate 300, with S indicating the start of the path and E indicating the end of the path of energy application, resulting in a heating path. In the illustrated pattern, heating begins at a bottom edge across the x direction ($1_{ES}$), then the heat source is moved in the y direction to a point about one-ninth of the way up from the initial heating path and heat is applied in the y direction from short edge to short edge ($2_{ES}$). This procedure is repeated for $3_{ES}$, $4_{ES}$, $5_{ES}$, $6_{ES}$, $7_{ES}$, and $8_{ES}$ until heat has been applied across the surface of the substrate 300. The first heating path 700 corresponds to $1_{ES}$. The second heating path 705 corresponds to $2_{ES}$. The third heating path 710 corresponds to $3_{ES}$. The fourth heating path 715 corresponds to $4_{ES}$. The fifth heating path 720 corresponds to $5_{ES}$. The sixth heating path 725 corresponds to $6_{ES}$. The seventh heating path 730 corresponds to $7_{ES}$. The eighth heating path 735 corresponds to $8_{ES}$. A single energy source or a plurality of energy sources can be used in the pre-heating paths. The figure shows solid and dashed black faded lines which represent the toolpaths and pre-heating sequences of two melting tools running in parallel. While the illustrated embodiment describes heating using a DED energy source, other energy sources can be used. Exemplary alternate energy sources include, e.g., one or more lasers, one or more induction heaters, or a combination of any of a laser, a DED energy source and an induction heater. In addition, other methods and devices that can enable the baseplate to be uniformly heated, such as induction heating, resistive heating, or others, also can be used.

The direction of pre-heating can be the same as the actual DED process forming the preform so that the temperature and residence time in areas under DED deposition areas can be similar. For example, as illustrated in FIG. 11, the start (S) and end (E) positions of pre-heating thermal energy applications (shown as black faded arrows and each labeled with a circle) are in the same direction of the metal deposition during the DED process.

Thermal energy application can be applied using any source that generates thermal energy. For example, electric arc-based, laser beam and electron beam thermal sources can be used, alone or in combination, to achieve pre-heating effects. For example, one or more thermal arc welding sources, such as a preheating PTA torch and a melting PTA torch, can traverse the substrate sideways to heat the substrate. The PTA torches can be positioned to mitigate temperature gradient formation and reduce the total pre-heating time. Other thermal sources based on laser energy or electron beam energy can be also used for the same purpose but using a suitable set of parameters to achieve similar heating of the substrate. The spacing between pre-heating thermal energy application areas can depend on the amount of heat delivered by the thermal sources. The spacing between pre-heating thermal energy application areas can depend on the heat distribution delivered by the thermal sources.

For example, two PTA thermal electric arc plasma welding torches can be used simultaneously traversing sideways to heat the substrate. The two torches can have a relative (fixed) distance from each other, such as about 20 mm to 40 mm. The configuration can apply the thermal energy along the x direction and across the y direction in a way that heat is delivered and spread out as uniformly possible without superimposing heat source centerlines. On the other hand, and for a fixed substrate width, the amount of pre-heating can differ if more concentrated thermal sources are to be used for this purpose, such as laser energy or electron beam energy. The laser or electron beam spots can be designed to be larger in order to affect wider heating areas onto the substrate. Other methods and devices can enable the substrate to be uniformly heated, including induction heaters and resistive heaters.

The melting tool providing the DED thermal source(s) can be used to perform uniform pre-heating. The positioning, sequence and parameters used to perform the pre-heating using the melting tool providing the DED thermal source(s) can be controlled so that application of energy to the substrate can result in a lower thermal gradient generation than was imposed on the substrate during the pre-bending step. The pre-heating can be performed to uniformly raise the temperature of the substrate. In exemplary embodiments, pre-heating can be performed to uniformly raise the temperature of the substrate to a temperature in the range of from about 350° C. to about 650° C., depending on the material of the substrate. For example, substrates containing Ti can be preheated to a temperature in the range of about than 400° C. to about 550° C. For some Ti alloys, the substrate can be pre-heated to a temperature in the range of about 450° C. to about 500° C. to mitigate thermal gradient formation when DED is performed. The pre-heating can mitigate internal stress buildup during DED processing by reducing any localized stress due to heating when molten metal is deposited to build the workpiece. By pre-heating the substrate to elevated temperatures, such as a warm forming temperature or a hot forming temperature, preparation of the weld bead on the substrate during DED workpiece formation can result in a distortion close to zero because the resulting thermal gradient can be significantly smaller than the thermal gradient produced through the thickness when the weld is deposited onto a substrate at room temperature. The pre-heating is not meant to markedly modify or fuse the substrate surface, but can result in the formation of weld lines without any metal being added.

Indirect heating, such as heating a pre-bent substrate clamped to a jig in an oven to uniformly raise temperature of substrate, can be used for pre-heating. In some applications, this is not feasible or practical. The time required to move the substrate/jig combination from an oven into a chamber in which the DED process can be done can result in significant loss of residual heat from the substrate, defeating the purpose of the pre-heating step. The system can be modified to include an oven that can be accessed via the deposition chamber to allow use of an oven to pre-heat the substrate.

Direct heating using a heating device positioned to apply heat across the surface of the substrate when it is attached to the jig can be used. Any method(s) and heating device(s) that enable the substrate to be uniformly heated prior to deposition can be used. The heating devices can be or include inductive heaters, resistive heaters, or combinations thereof. Exemplary heaters include a conductor-in-conduit heat source, a heater strip, a resistive heating strip, an infrared heater, a Positive Thermal Coefficient ceramic heater, a thick film ceramic heater, a resistance wire or a resistance ribbon heating device, and an induction heater and heaters that can include any combination thereof.

4. DED Process to Build the Workpiece

Immediately after the substrate is pre-heated to the target temperature, the DED process can be performed to form the workpiece on the substrate. During build of the object by metal deposition on the frontside of the substrate, clamps can be normally positioned at start/end positions of DED walls to help reduce local deformations arising from residual stress development.

The pre-bent substrate can be brought into full contact, such as from about 95% to about 100% contact, with the curved clamping mold via the insulated/non-insulated clamps attached to the jig prior to pre-heating. The substrate can be thermally separated from jig by the curved clamping mold. The curved clamping mold can include an insulating ceramic layer on its curved surface that can come into contact with the pre-bent substrate. The pre-bent substrate does not bond to the curved clamping member. Further, as can be seen from this arrangement, the workpiece can be built on the surface of the pre-bent substrate while the pre-bent substrate is secured to the jig. While the pre-bent substrate can become part of the workpiece, no part of the curved clamping mold becomes part of the workpiece.

While the pre-bent substrate does have a bow, and is attached to the curved clamping that also has a bow, the slope of the curve of the pre-bent substrate secured to jig with the curved clamping member as a support between the pre-bent substrate and the jig does not affect the overall deposition conditions. The radius of curvature of the curved clamping mold is large enough that the effect of gravity does not adversely affect the weld pool dynamics, so that deposition onto the pre-bent substrate that is in contact with the curved clamping mold can be similar to that achieved if depositing on the substrate in a flat position. The radius of curvature of the curved clamping mold can be selected so that the effect of gravity caused by the slope does not affect the behavior of the liquid melt pool being deposited or formed on the surface of the pre-bent substrate. In addition, the controller used in DED processing to build the workpiece can adapt the z-coordinates to the curvature of the curved clamping mold to ensure that consistent energy/processing conditions can be delivered by the DED process during manufacturing of the workpiece. The CAD-CAM program instructions can be executed to result in the melting tool providing the DED thermal source following the exact shape of the curved clamping mold to ensure that overall processing conditions, particularly standoff distance, are not affected.

The design for the workpiece to be built by the DED process can be positioned on the frontside of the substrate so that the majority of the walls of the workpiece formed by deposition of molten metal are between, and preferably equally distant from, adjacent melting tracks on the backside of the substrate. With this positioning, non-uniform plastic deformation and high tensile stresses that can occur in the melted region during DED manufacture of the workpiece can occur in an area of high compressive forces imposed by the pre-bending treatment, and compressive forces that can form as the weld of the workpiece cools can occur in the areas of high tensile stresses imposed by the pre-bending treatment. Accordingly, because of the positioning of the walls of the workpiece on the frontside of the substrate relative to the melting tracks on the backside of the substrate, the residual stress fields can be balanced, mitigating the total distortion in the as-deposited preform.

An exemplary deposition pattern for formation of a preform is illustrated in FIG. 11. As illustrated, the preform 600 positioned on the frontside or second side 320 of the substrate 300 so that the majority of the walls, such as 380, 382, and 384, of the workpiece preform 600 formed by deposition of molten metal are between, and preferably equally distant from, adjacent pre heating paths 700, 705, 710, 715, 720, 725, 730, and 735 on the backside or first side 310 of the substrate 300. An exemplary DED sequence pathway per layer is indicated sequentially by the boxes $S_1$ through $S_5$, with the arrows indicating DED direction per layer.

In the methods for producing a metal workpiece using DED processes provided herein, a three-dimensional object of a metallic material can be made by fusing together successive deposits of the metallic material onto a substrate. Any DED process can be used to build the workpiece. The DED process can use one or more melting tools providing an energy source, alone or in combination. Exemplary melting tools that can be used include a PTA torch providing an electric arc plasma as a thermal source, a laser device providing a laser beam as a thermal source, an electron beam device providing an electron beam as a thermal source, and any combination thereof. In some configurations, two or more melting tools providing thermal sources can be used. For example, one melting tool providing a DED thermal source can be used to pre-heat the substrate and a second melting tool providing a DED thermal source can be used to melt a metallic material to form molten metal that can be deposited on the pre-heated area. When multiple melting tools providing DED thermal sources are used, they can be the same or they can be different from each other. Exemplary combinations of multiple melting tools include two PTA torches, two laser beam devices, two electron beam devices, a PTA torch and a laser beam device, a PTA torch and an electron beam device, and a laser beam device and an electron beam device.

In some methods, a first melting tool can be used to deliver energy to at least a portion of the surface of the base material, e.g., at the position at which the metallic material is to be deposited, for surface heating of the substrate. This is different from the pre-heating step that is used to raise the temperature of the whole substrate up to a target temperature in order to minimize thermal gradients during the DED process. In contrast, for surface heating of the base material, whether it is the substrate or a layer of previously deposited metal, the first melting tool delivers high intensity energy to a limited area of the base material, raising the temperature of the base material at the area of energy application to a temperature slightly below, such as 0.1% to 10% below melting temperature, or to melting temperature. The surface heating of the base material can improve weld bead wetting and spreading characteristics. The surface heating of the base material can improve weld bead contact angles. The surface heating of the base material can make the surface more receptive to the molten metal that is to be deposited on the heated surface.

A second melting tool can be used to heat and melt a metallic material such that molten metallic material is deposited onto the surface heated area of the base material heated by the first melting tool. A gas jet device can be used to direct a cooling gas across the surface of a liquid molten pool, or to impinge on the surface of the liquid molten pool, or to impinge upon a surface of a solidified material adjacent to a liquid-solid boundary of the liquid molten pool, or any combination thereof. The base material can be moved relative to the position of the first and second melting tools and the gas jet device in a predetermined pattern such that the successive deposits of molten metallic material solidify and form the three-dimensional workpiece. Alternatively, the first and second melting tools and the gas jet device can be moved relative to the position of the base material in a predetermined pattern such that the successive deposits of molten metallic material solidify and form the three-dimensional workpiece.

In the methods provided herein, the cooling gas can be or include an inert gas, such as argon, helium, neon, xenon, krypton and combinations thereof. The cooling gas can have a flow rate measured at the inlet from about 1 L/min to about 300 L/min. The cooling gas can be applied in a constant stream, or can be applied intermittently, or can be applied in a pulsed flow. The flow of the cooling gas can be adjusted to produce a turbulent flow of the cooling gas in the vicinity of the molten pool. For example, the velocity of the cooling gas flowing through gas jet device can be increased so that the cooling gas exiting the gas jet device exhibits turbulent flow instead of laminar flow. The cooling gas can be delivered using a plurality of nozzles on a single gas jet device or using a plurality of gas jet devices so that a combination of laminar flow and turbulent flow of the cooling gas can be directed in the vicinity of the molten pool.

The temperature of the cooling gas applied can be any temperature. The cooling gas temperature can be the ambient temperature of the chamber in which the additive formation process is performed. The cooling gas temperature can be about room temperature or less, such as about 25° C. or less. The cooling gas can be at a refrigerated temperature, such as from −150° C. to about 4° C., or from about −10° C. to about 10° C.

The number and configuration of nozzles of a gas jet device, and/or the number of gas jet devices, and their configuration and placement, can be selected to deliver cooling gas that covers a length of the workpiece, such as a distance at or surrounding the thermal energy impingement area, from about 5 mm to about 50 mm, or from about 10 mm to about 40 mm, or from about 15 to about 30 mm, along the direction of travel.

In the methods provided herein, a melting tool providing a DED thermal source can be used in combination with the gas jet device to control melt pool conditions, with the gas jet device producing a cooling gas resulting in a temperature reduction from about 1200° C. to about 600° C., or from about 1000° C. to about 800° C. In some methods where the workpiece is formed of a Ti alloy, a temperature reduction from 1000° C. to 800° C. can be used.

The methods provided herein can be performed in any additive manufacturing system. The methods can be performed in a system in which an inert gas encompasses just a thermal source, such as an electric arc plasma, or encompasses a melting tool containing a thermal source, or encompasses the melting tool and the workpiece. The methods can be performed in a system that includes a closed chamber filled with an inert gas to provide an inert atmosphere where the whole process is performed in an inert atmosphere. The inert atmosphere can be or contain argon, xenon, neon, krypton, helium or combinations thereof, allowing inert atmosphere deposition.

Figure 12A:
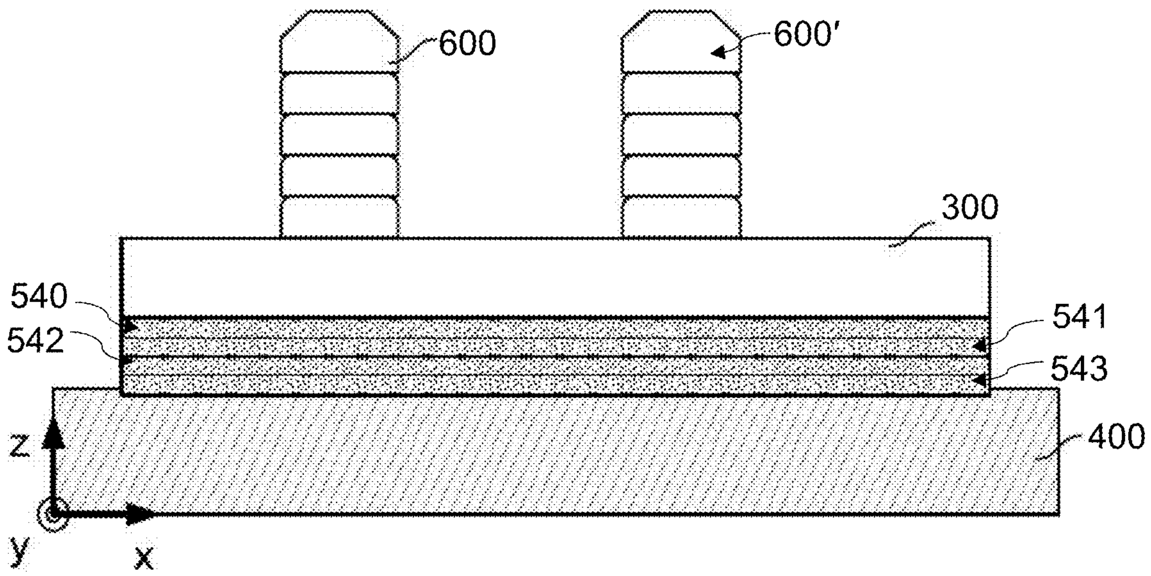
FIG. 12A depicts schematically an example of a conventional directed energy deposition configuration where a substrate is separated from a jig using for example sheets of alumina insulation or other substrate supporting mechanisms, and a workpiece is manufactured in a layer upon layer fashion. This configuration will minimize the heat flow from the DED substrate to the jig, while preventing the withdrawal of heat generated by the DED process.
Figure 12B:
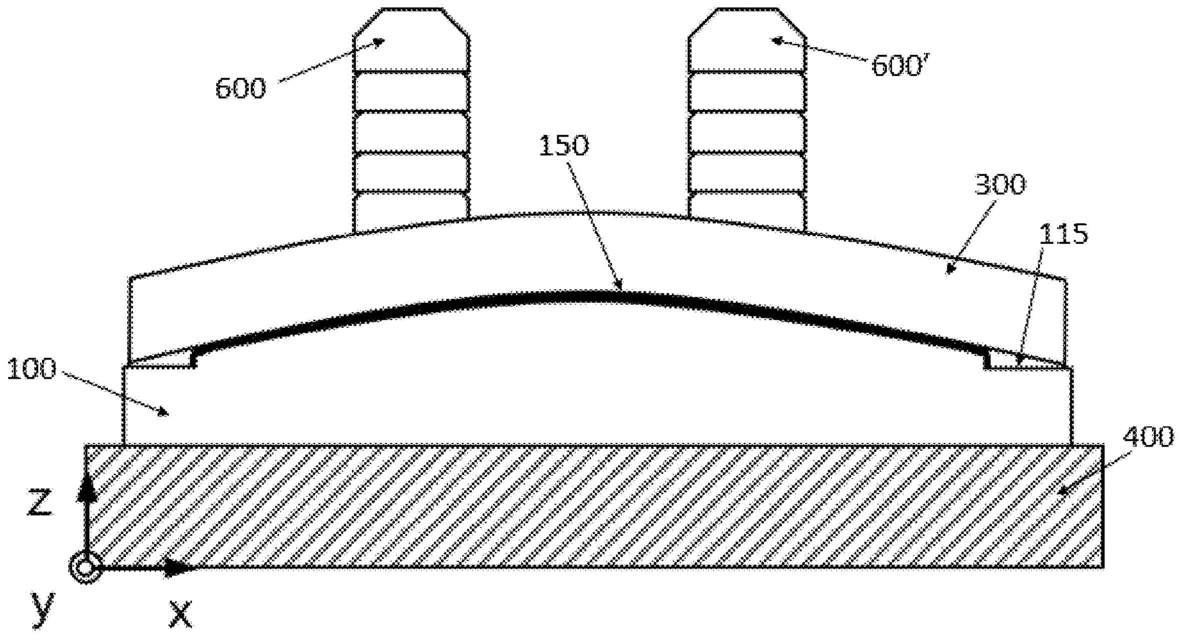
FIG. 12B illustrates an exemplary configuration for directed energy deposition using the curved clamping mold provided herein. The curved clamping mold serves as an underlying support structure for a pre-bent substrate when the pre-bent substrate is attached to a jig. The curved clamping mold has an insulative coating layer on the top of the curved surface and thermally isolates the curved clamping mold from the plastically pre-bent substrate. The workpiece is manufactured in a layer upon layer fashion.

Exemplary differences between conventional substrate configurations for DED processes and the processes provided herein using the curved clamping mold are illustrated in FIGS. 12A and 12B. FIG. 12A illustrates a conventional configuration, where a substrate 300 is secured to a jig 400 (via clamps that are not shown) but is thermally isolated from the jig 400 by alumina insulation plates 540, 541, 542 and 543 positioned between the substrate 300 and the jig 400. Substrate 300, which has not been subjected to any stress mitigation treatment, is flat, and metal material is deposited during the DED process on the upper surface of substrate 300 to produce preforms 600 and 600'.

In contrast, FIG. 12B illustrates an exemplary embodiment of a substrate configuration using the curved clamping mold 100 having a knurled or corrugated surface (not shown in the figure) coated with a ceramic coating 150. In the illustrated configuration, the curved clamping mold 100 can serve as an underlying support for substrate 300 when the substrate 300 is secured to the jig 400 (via clamps that are not shown). The curved clamping mold 100 can obviate the need for use of any alumina insulation plates, or other substrate supporting apparatus, conventionally used to thermally separate the substrate from the jig, because the curved clamping mold 100 can thermally isolate the substrate 300 from the jig 400. The substrate 300 can be subjected to the stress mitigation processes disclosed herein, resulting in pre-bending of the substrate 300. The pre-bent substrate 300 can be clamped to the curved clamping mold 100 using insulated clamps (not shown). The illustrated curve is exaggerated; the radius of curvature of the curved clamping mold 100 is large enough that the effect of gravity does not adversely affect the weld pool dynamics, so that deposition is similar to that achieved as if depositing in a flat position. Metal material is deposited during the DED process on the upper surface of substrate 300 to produce preforms 600 and 600'.

D. Systems

Also provided are systems for building metallic workpieces by DED processes. The systems can include a jig to which a pre-bent substrate is secured; a curved clamping mold that can act as an underlying support of the pre-bent substrate when the pre-bent substrate is secured to the jig; insulated clamps for securing the pre-bent substrate to the jig; one or more melting tools comprising a DED energy source to melt a source of metal into metallic molten material that can be deposited on a surface of a base material (for the first layer, the base material will be a surface of the substrate; for subsequent layers, the base material will be the surface of the previously deposited metal layer); a gas jet device that can direct a cooling gas across the liquid molten pool, or to impinge on the liquid molten pool, or to impinge upon a solidified material adjacent to a liquid-solid boundary of the liquid molten pool, or any combination thereof, a supply of the cooling gas; a system for positioning and moving the base material relative to the melting tool and the gas jet device; and a controller able to read a design model, such as a computer assisted design (CAD) model, of the metallic workpiece to be formed, and employing the design model to regulate the position and movement of the system for positioning and moving the base material and to operate the melting tool and gas jet device such that the workpiece is built by fusing the metallic material onto the base material to form successive deposits of the metallic material to form the workpiece.

A single melting tool can be used, or two melting tools can be used. For example, a first pre-heating torch producing a single pre-heating electric arc plasma and a second torch producing a double electric arc plasma. The two torches can be used simultaneously in a tandem configuration. The pre-heating arc can deliver thermal energy to a portion of the surface of the base material, e.g., at the position at which the metallic DED material is to be deposited, for surface heating of the substrate, or preconditioning. In addition, the double electric arc plasma can be powered by separate power supplies. The double electric arc plasma can be used to resistive heat and melt a metal onto the surface heated area of the base material. The double electric plasma arcs can ensure adequate fusion between the base material of workpiece and the molten metal produced by the action of the electric arc plasma arc on a metal, such as a metal wire feedstock. For example, the second melting tool can be a torch producing a double electric arc plasma whereby one of the arcs burns between the tungsten electrode of the torch and the workpiece (PTA), and the other arc burns between the tungsten electrode of the torch and the wire feedstock (main arc), both using straight polarity. The PTA electric arc plasma can deepen the fusion characteristics of the molten metal into the preheated surface of the base material, which can be controlled independently from the main electric arc plasma. The main electric arc plasma can be established between the torch and a current-carrying wire feedstock. The wire feedstock can be melted by the heat generated by the column of the PTA electric arc plasma which is transferred to the workpiece, and the heat generated by the main electric arc plasma circuit. The wire feedstock can produce molten metal that can be deposited on the workpiece. The superheat from the droplets of molten metal can maintain a melt pool in the vicinity of the surface heated area of the base material. The surface heating of the base material can lead to enhanced fusion, improved wetting and spreading characteristics of the liquid pool, and thus yield better overall DED characteristics. Regarding the deposition profile, by surface heating the substrate, it can be possible to obtain a shallower and wider deposition profile. The improved weld bead characteristics can result in a profile with a beneficial weld bead contact angle towards the base material, which can promote adequate fusion to the base material and adjacent weld beads. Improved weld bead and fusion characteristics can yield a manufactured product with improved mechanical integrity.

Each melting tool can be separately controlled, and thus be modulated individually to produce separate fields of temperature and pressure. An advantage of this arrangement can be that the amount of thermal energy applied to the metallic feedstock to be melted onto the surface heated area of the base material can be greater than that applied to the surface of the base material, avoiding over-heating of the base material.

The DED manufacturing system provided herein can include a PTA torch, a laser device, an electron beam device, or any combination thereof as a melting tool. In some configurations, a first PTA torch electrically connected to the base material surface heats a target deposition area on the base material to form a surface heated area, and a second PTA torch electrically connected to the consumable electrode can heat and melt a consumable electrode, which can result in drops of molten metal that can fall onto the surface heated area of the target deposition area. In some configurations, a PTA torch can surface heat a target deposition area on the base material to form a surface heated area, and a laser device can heat and melt a metal wire or metal powder, which can result in formation of molten metal that can be deposited onto the surface heated area of the target deposition area. In some configurations, a PTA torch can heat a target deposition area on the base material to form a surface heated area, and an electron beam device can heat and melt a metal wire, which can result in drops of molten metal that can fall onto the surface heated area of the target deposition area.

In some configurations, a laser device can spot heat a target deposition area on the base material to form a spot heated area, and a PTA torch electrically connected to the consumable electrode can heat and melt the consumable electrode, which can result in drops of molten metal that can fall into the spot heated area of the target deposition area. In some configurations, a first laser device can spot heat a target deposition area on the base material to form a spot heated area, and a second laser device can heat and melt a metal wire or metal powder, which can result in formation of molten metal that can be deposited onto the spot heated area of the target deposition area. In some configurations, a laser device can spot heat a target deposition area on the base material to form a spot heated area, and an electron beam device can heat and melt a metal wire, which can result in drops of molten metal that can fall onto the spot heated area of the target deposition area.

In some configurations, an electron beam device can spot heat a target deposition area on the base material to form a spot heated area, and a PTA torch electrically connected to a consumable electrode can heat and melt the consumable electrode, which can result in drops of molten metal that can fall onto the spot heated area of the target deposition area. In some configurations, an electron beam device can spot heat a target deposition area on the base material to form a preheated area, and a laser device can heat and melt a metal wire or metal powder, which can result in drops of molten metal that can fall onto the spot heated area of the target deposition area. In some configurations, a first electron beam device can spot heat a target deposition area on the base material to form a spot heated area, and a second electron beam device can heat and melt a metal wire or powder, which can result in drops of molten metal that can fall onto the spot heated area of the target deposition area.

In some configurations, the DED manufacturing system can include a laser device or a PTA torch that can be arranged to direct energy (e.g., laser energy or a plasma transferred arc, respectively) to a target area of the base material to form a surface heated area, and a PTA torch or a laser device can be arranged to direct energy onto an end of a consumable electrode or metal wire positioned above the surface heated area of the base material. The energy can melt the end of the consumable electrode or metal wire, forming droplets of molten metal that can drop onto the surface heated area of the base material beneath the end of the consumable electrode or metal wire. The melting tool that directs energy to a target deposition area can promote fusion between the base material and the molten metal material being deposited thereon by deepening the melt-in of the droplets of molten metal into the base material. The melting tool used to melt the consumable electrode or metal wire also can contribute thermal energy in the vicinity of the spot heated area of the target deposition area, contributing to the thermal energy provided by the melting tool directed to the base material. The superheat from the droplets of molten metal can help maintain a melt pool in the vicinity of the spot heated area of the base material.

The consumable electrode or metal wire can be or contain Al, Cr, Cu, Fe, Hf, Sn, Mn, Mo, Ni, Nb, Si, Ta, Ti, V, W, or Zr, or composites or alloys thereof. In some embodiments, the consumable electrode can be a wire that contains Ti or a Ti alloy. The consumable electrode or metal wire can be or contain a titanium alloy containing Ti in combination with one or a combination of Al, V, Sn, Zr, Mo, Nb, Cr, W, Si, and Mn. For example, exemplary titanium alloys include Ti-6Al-4V, Ti-6Al-6V-2Sn, Ti-6Al-2Sn-4Zr-6Mo, Ti-45Al-2Nb-2Cr, Ti-47Al-2Nb-2Cr, Ti-47Al-2W-0.5Si, Ti-47Al-2Nb-1Mn-0.5W-0.5Mo-0.2Si, and Ti-48Al-2Nb-0.7Cr-0.3Si. The consumable electrode or metal wire can contain aluminum, iron, cobalt, copper, nickel, carbon, titanium, tantalum, tungsten, niobium, gold, silver, palladium, platinum, zirconium, alloys thereof, and combinations thereof. The consumable electrode can include a solid wire electrode, a cored wire electrode or a strip electrode.

A typical cross section of the consumable electrode or metal wire is a circular cross section. The diameter of the consumable electrode or metal wire can be up to about 10 mm, and can be in the range of from about 0.8 mm to about 5 mm. The consumable electrode or metal wire can have any practically implementable cross-sectional dimension, e.g., 1.0 mm, 1.6 mm, and 2.4 mm, or from about 0.5 to about 3 mm. The feed rate and positioning of the consumable electrode or metal wire can be controlled and regulated in accord with the effect of the power supply to the PTA torch, laser device, electron beam device, or any combination thereof, in order to ensure that the consumable electrode or metal wire is being continuously heated and is melted when it reaches the intended position above the preheated area of the base material.

The laser device can generate a laser beam of sufficient energy to transfer thermal energy to the base material to pre-heat a surface area of the base material, or to melt a metal wire. The preheating of the base material via energy from the laser beam can promote fusion between the base material and the melted metallic material by deepening the melting characteristics in the base material. In some embodiments, at least a portion of the base material can be melted by the energy from the laser beam of the laser device. In some embodiments, sufficient heat can be applied by the laser beam of the laser device to form a molten pool in the base material at the position at which the metallic material produced by the PTA torch, or another laser device, or an electron beam device, is to be deposited.

Examples of suitable laser devices include a ytterbium (Yb) laser, a Yb fiber laser, a Yb fiber coupled diode laser, a Yb:glass laser, a diode-pumped Yb:YAG laser, a neodymium-doped yttrium aluminum garnet (Nd:YAG) laser, a $CO_2$ laser, a CO laser, a Nd:glass laser, a neodymium-doped yttrium orthovanadate (Nd:YVO) laser, a Cr:ruby laser, a diode laser, a diode pumped laser, an excimer laser, a gas laser, a semiconductor laser, a solid-state laser, a dye laser, an X-ray laser, a free-electron laser, an ion laser, a gas mixture laser, a chemical laser, and combinations thereof. Preferred lasers include Yb lasers, particularly Yb fiber lasers. In many applications, the wavelength used in a Yb fiber laser can be less reflective compared to other laser wavelengths.

The PTA torch can be of any configuration capable of creating an electric arc plasma to resistively heat and melt the consumable electrode, or to heat a target area on the surface of the base material, such as gas metal arc welding (GMAW), particularly using non-reactive gases to establish the arc (metal inert gas welding or MIG-welding). The consumable electrode can be made to melt in the plasma produced by the PTA torch using an electric arc, and the melting consumable electrode can be deposited into the molten pool on the work piece to add to and to form the near net shape metal bodies. The preheating of the base material via energy from the PTA torch can promote fusion between the base material and the melted metallic material by deepening the melting characteristics in the base material. In some embodiments, at least a portion of the base material can be melted by the energy from the plasma of the PTA torch. In some embodiments, sufficient heat can be applied by the plasma of the PTA torch to form a molten pool in the base material at the position at which the metallic material melted by a different PTA torch or laser device is to be deposited.

The combination of the thermal pre-bending of the substrate by inducing melting tracks, use of the curved clamping mold, and pre-heating of the substrate prior to formation of the workpiece using a DED process allows the formation of a near-net-shape metal workpiece that significantly alleviates the problems related to internal residual stresses and deformations evident in many traditional additive manufactured products. This can result in improved manufacturing repeatability, increased dimensional accuracy, and a manufactured workpiece that demonstrates increased strength, fatigue resistance, and durability.

E. Examples

The following examples are included for illustrative purposes only and are not intended to limit the scope of the embodiments provided herein.

Example 1

A first base plate substrate having dimensions (L×W×T) of 635 mm×190 mm×9.5 mm and made of Ti-6Al-4V was used as a first test substrate to determine deflection without residual stress mitigation. The substrate was clamped to a jig or welding table and a workpiece was produced on the workpiece using a first PTA torch to pre-heat the base material, and a second PTA torch to melt a Ti-6Al-4V wire to form molten metal that was deposited onto the pre-heated base material. The speed of deposition was between 7.5 and 10 mm/s and inert gas was used to direct a cooling gas at high flow rate to impinge upon the as-solidified material adjacent to a liquid-solid boundary of the liquid molten pool. After the deposition was complete, the component was cooled and removed from the jig, and the substrate was examined for deformations.

Figure 13A:
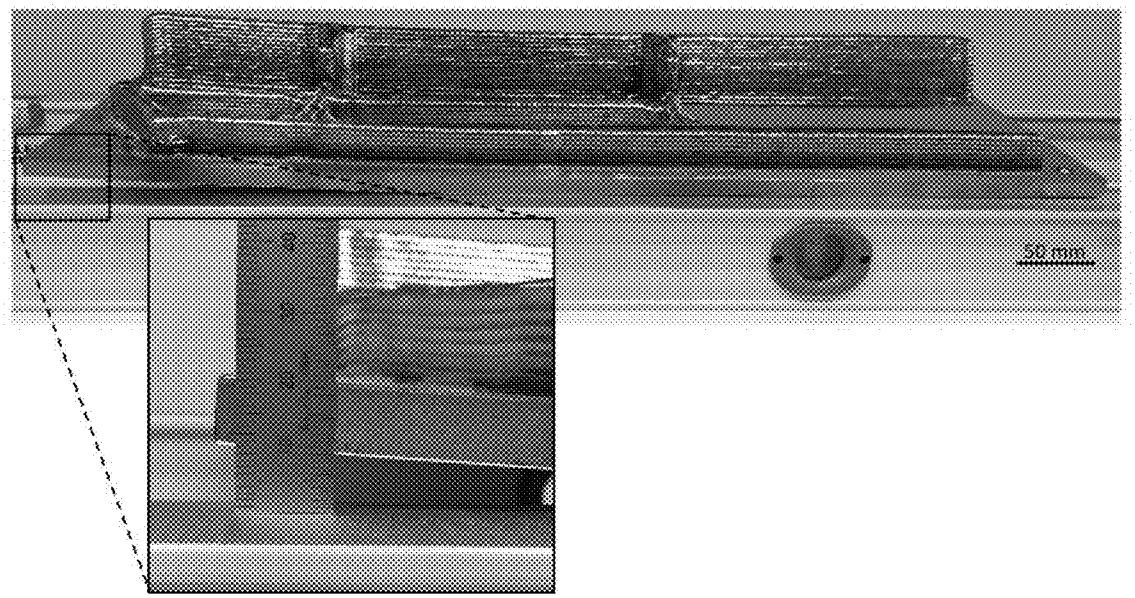
FIG. 13A shows the deformation caused by DED deposition forming a workpiece on a first substrate having a thickness of 9.5 mm not subjected to any type of stress mitigation. Distortion was apparent at the short edges of the substrate, which bowed upward compared to the flatness profile of the substrate prior to deposition.

Distortion was apparent at the short edges of the substrate, which bowed upward compared to the flatness profile of the substrate prior to deposition. The deformations observed are shown in FIG. 13A.

Figure 13B:
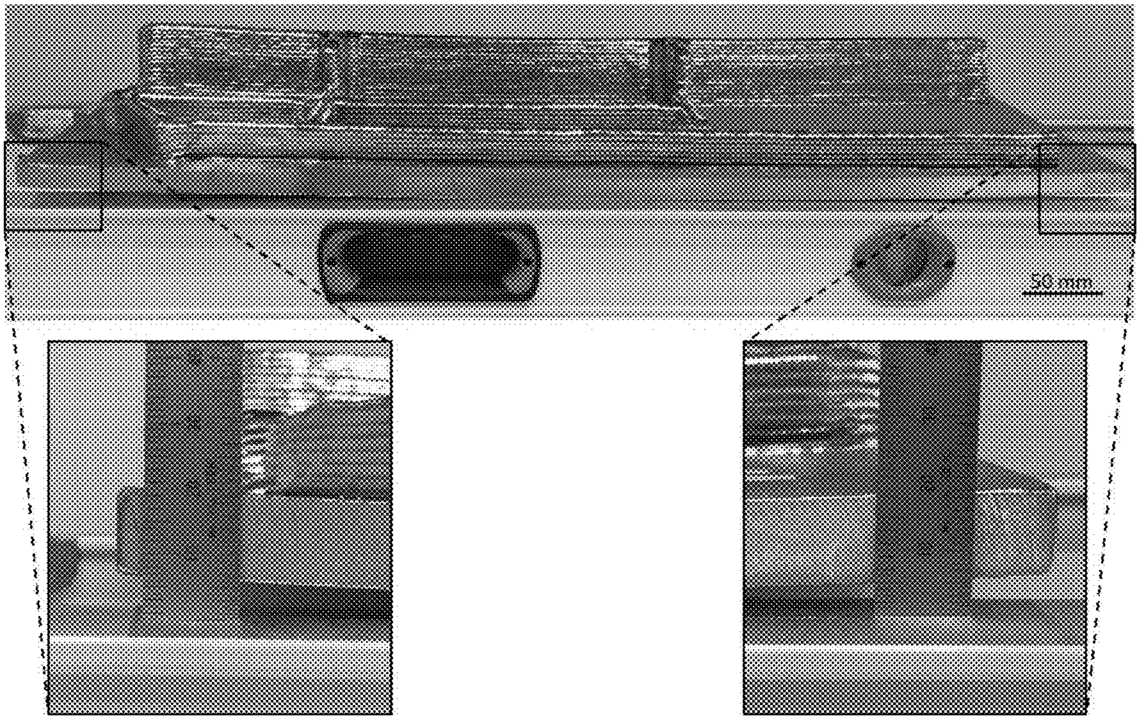
FIG. 13B shows the deformation caused by DED deposition on a second substrate with a thickness of 12.7 mm not subjected to any type of stress mitigation.

A second base plate substrate having dimensions (L×W×T) of 635 mm×190 mm×12.7 mm and made of Ti-6Al-4V was used as a second test substrate. The same workpiece was fabricated using the same conditions as described above. FIG. 13B shows the deformation caused by DED deposition on a substrate having a thickness of 12.7 mm not subjected to any type of residual stress mitigation, exhibiting upward bowing at the short edges of the substrate, the left edge bowing upward by about 7 mm and the right edge bowing upward by about 6.0 mm compared to the flatness profile of the substrate prior to deposition.

Figure 13C:
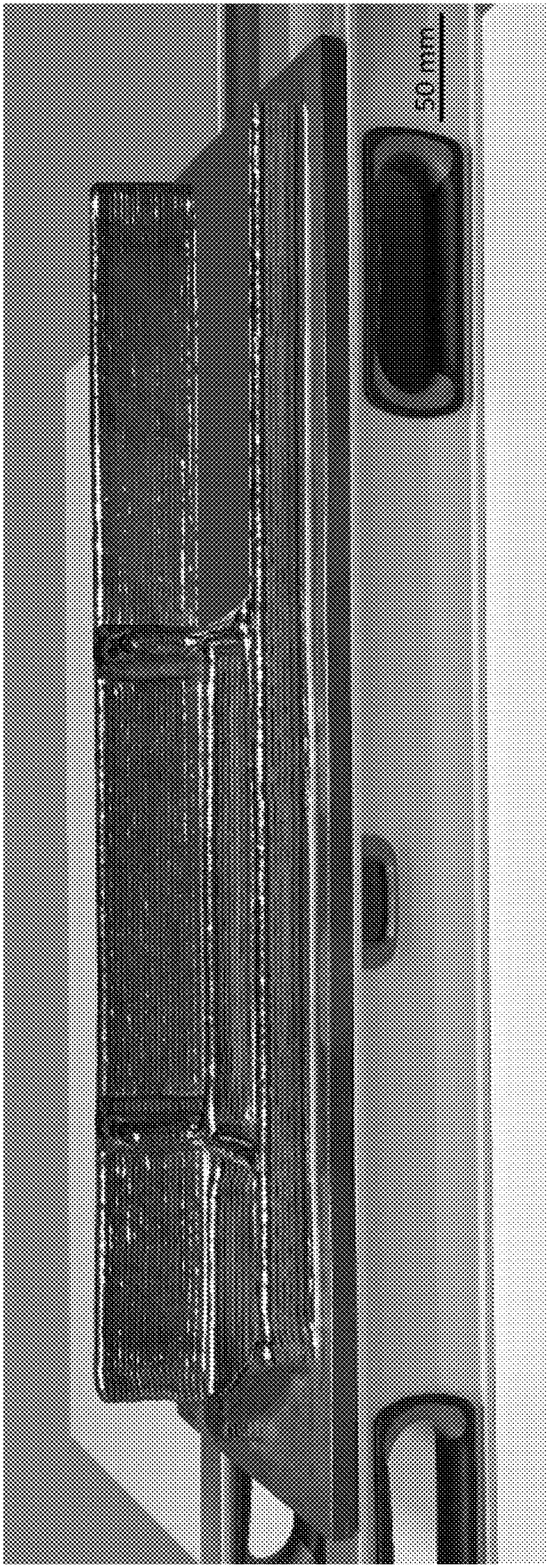
FIG. 13C shows a third substrate with a thickness of 9.5 mm that was used for formation of an object by being subjected to thermal pre-bending, preheating and DED processing.

FIG. 13C shows a third base plate substrate having dimensions (L×W×T) of 635 mm×190 mm×9.5 mm and made of Ti-6Al-4V that was used for formation of an object by being subjected to thermal pre-bending, preheating and DED processing as described herein. The substrate was firmly clamped to the jig using insulated clamps around the full lengths of the long edges of the substrate, but no clamps were used as the short edges of the substrate. Four layers of alumina insulation plates, each having a thickness of about 3.2 mm (RS-1200 Keranova) having the same dimensions as the substrate was used between the substrate and the jig to thermally isolate the substrate from the jig.

A PTA torch was used to provided thermal energy to the first side of the substrate to create melting tracks in the substrate. The final aggregated residual stress distribution, determined by the combination of the DED and melting tracks, has lower tensile peak at the centerline of the DED, and lower balancing compressive stresses away from the centerline of the DED, when compared to the original residual stress profile of the DED, without pre-bending melting tracks (i.e. high tensile peak at the DED centerline and balancing compressive stresses further away. The pattern used for creating the melting tracks is shown in FIGS. 7A and 7B. As illustrated in the figure, the PTA torch acting as the DED thermal source was positioned at one edge of the substrate. The spacing between the melting tracks can be predicated on the shape of the workpiece to be produced. For example, the melting tracks can be formed in areas that are not in an area under a wall of the workpiece to be formed in order to minimize the final aggregated residual stress distribution in the workpiece. For example, a majority of the melting lines on the first surface can be formed at one or more locations other than those corresponding to one or more areas occupied by of one or more walls of the workpiece to be formed on the second side of the substrate. In order to induce the largest thermal stresses in the substrate, high energy density (e.g., an arc energy delivered at about 450 J/mm to about 550 J/mm) was applied at a speed of between 6 and 16 mm/s to rapidly melt a portion of the surface of the substrate to create autogenous weld lines, which were rapidly cooled using a gas jet device to direct a cooling gas at a temperature of 25° C. at high flow rate toward the weld line, thereby forming melting tracks that have a high tensile stress near the centerline of the melting track, and high compressive stresses at a distance away from the centerline. In exemplary embodiments, for a substrate thickness of 9.5-10 mm, a single heat source with a current of from about 150 A to about 250 A, a voltage of about 20V to about 30V, and a traverse speed of from 6 mm/s to 16 mm/s, was used to produce melt tracks that were approximately 3 mm wide and up to 1 mm deep.

When released from the jig, the pre-bent substrate bowed upward, exhibiting a deflection of about 15 mm, similar to that shown in FIG. 8A. This pre-bent substrate was then attached to a jig using the curved clamping mold as an underlying support and insulated clamps to attached the pre-bent substrate to the jig. The pre-bent substrate was positioned so that the side with the melting tracks was toward the curved clamping mold. Pre-heating of the pre-bent substrate was accomplished using two PTA torches delivering a lower energy density to the pre-bent substrate surface by positioning the PTA torches at a higher standoff distance to reduce the risk of producing local melting tracks, which could cause fusion issues at the baseplate interface during DED metal deposition. For example, pre-heating was performed with two PTA torches using a range between 150-250 A and with arc voltages between 20-30V. The traverse speed was between 6-12 mm/s. For example, an arc energy delivered by the first PTA torch could be 460 J/mm and an arc energy delivered by the second PTA torch could be 430 J/mm. Another important aspect is the fact that pre-bending tracks were performed with higher plasma gas flow compared to that used in pre-heating. Higher plasma gas flows produce stiffer electric arcs, thus with higher energy densities. With regards to standoff distance, a 25% to 50% higher standoff distance, or 30% to 40% higher standoff distance during pre-heating compared to that used in pre-bending can be used. No cooling gas was used during the pre-heating process.

After the temperature of the substrate reached between 450° C. and 550° C., DED deposition of metal to form the object was performed within a closed chamber containing an argon inert atmosphere. The DED process used two PTA torches. The first PTA torch directed thermal energy to a target area of the base material to form a preheated area, and the second PTA torch directed thermal energy onto (1) an end of a consumable electrode or metal wire positioned above the preheated area of the base material, and (2) towards the preheated area. The energy from the second PTA torch melted the end of the consumable electrode or metal wire, forming droplets of molten metal that dropped onto the preheated area of the base material beneath the end of the consumable electrode or metal wire. The process included use of the gas jet device to direct a cooling gas at a temperature of 25° C. at high flow rate toward the as-solidified material adjacent to the liquid-solid boundary of the molten metal. The deposition continued until the workpiece was completed. The workpiece was allowed to cool down within the deposition chamber to a temperature below 400° C. or less. The workpiece then was removed from the deposition chamber, and the pre-bent substrate then was removed from the jig. Depending on how fast the operators remove the workpiece, the pre-bent substrate can be removed from the jig at a temperature between 200-300° C., or lower. In this instance, the pre-bent substrate was removed from the jig at a temperature of about 250° C.

As shown in FIG. 13C, the workpiece exhibited a small (only about 0.5 mm) movement upwards at the short edges of the substrate, indicating that a significant amount of residual stress that was observed in the test substrate when conventional DED processes were used was eliminated using the curved clamping mold in combination with pre-bending and pre-heating.

Repeatability was tested by using similar substrates and the same workpiece design, under the same conditions described above. The method exhibited consistent reproducible results across all three workpieces produced. The deviation in substrate deformation between workpiece #1 and workpiece #2 was about 0.5 mm, while the deviation in substrate deformation between workpiece #2 and workpiece #3 was about 0.1 mm.

Stress relief heat treatment did not have a significant impact on overall dimensions of the workpiece. For example, after stress relief only a small movement upward occurred by approximately 0.5 mm at the shorter edges of the plate. This means the residual stress in the workpiece in the as-deposited condition is very low as a result of the described stress mitigation.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

REFERENCE SIGNS LIST

The following is a listing of the reference numerals used in the description and the accompanying Drawings.

100 Curved clamping mold 372 Third pre-bending heating path
105 Knurled or corrugated surface 373 Fourth pre-bending heating path
110 Top surface 374 Fifth pre-bending heating path
115 Edge 375 Sixth pre-bending heating path
120 Ridge 380 Preform wall
130 Trough 382 Preform wall
140 Flat rim 384 Preform wall
150 Ceramic coating 400 Jig
155 Bond coat 410 Nominal substrate deflection
160 Cavity 500 Clamp
162 Cavity 501 Threaded hole
164 Cavity 502 Hole
166 Cavity 505 Bottom contact facet
170 Stiffening member 506 Side contact facet
180 Maximum height 507 Top surface of clamp
200 Gas jet device 509 Ceramic-coated surfaces
210 Nozzles 510 Countersunk screw
230 Support 515 Tip of countersunk screw
250 PTA torch 520 Bolt
300 Substrate 525 Nut
310 First side 530 Top surface of jig
320 Second side 540 Alumina insulation plate
330 DED backwall of preform 541 Alumina insulation plate
350 Melting track 542 Alumina insulation plate
355 Space between melting tracks 543 Alumina insulation plate
360 Melting track 544 Area of non-uniform pressure and heat transfer distribution
370 First pre-bending heating path 545 Area of non-uniform pressure and heat
371 Second pre-bending heating path transfer distribution
546 Area of non-uniform pressure and heat transfer distribution
547 Area of non-uniform pressure and heat transfer distribution
548 Area of non-uniform pressure and heat transfer distribution
549 Area of non-uniform pressure and heat transfer distribution
550 Baseplate
575 Box showing areas of uniform pressure and heat transfer distribution
576 Box showing areas of uniform pressure and heat transfer distribution
577 Box showing areas of uniform pressure and heat transfer distribution
578 Box showing areas of uniform pressure and heat transfer distribution
600 Preform
600' Preform
610 Clamping entity
615 Clamping entity
620 Clamping entity
625 Clamping entity
630 Clamping entity
650 Non-optimal clamping area
700 First pre-heating heating path
705 Second pre-heating heating path
710 Third pre-heating heating path
715 Fourth pre-heating heating path
720 Fifth pre-heating heating path
725 Sixth pre-heating heating path
730 Seventh pre-heating heating path
735 Eighth pre-heating heating path

What is claimed:

1. A directed energy deposition method for producing a metal workpiece, the method comprising:

providing a curved clamping mold, the curved clamping mold comprising:

a first side comprising two or more cavities separated by a stiffening member and a rim having a flat surface around a perimeter of the first side;

a second side opposite of the first side, the second side having a curved surface and comprising knurls or corrugations on the second side; and a ceramic coating;

providing a pre-bent substrate;

supporting the pre-bent substrate on the curved clamping mold; and forming the metal workpiece on a surface of the pre-bent substrate opposite the curved clamping mold.

2. The directed energy deposition method of claim 1, further comprising:

securing the pre-bent substrate and the curved clamping mold supporting the pre-bent substrate to a jig using a plurality of clamps.

3. The directed energy deposition method of claim 1, further comprising:

forming the pre-bent substrate, the forming the pre-bent substrate comprising:

applying thermal energy to a metal substrate to form a plurality of melting tracks on a surface of the metal substrate; and bending the metal substrate with the plurality of melting tracks to form the pre-bent substrate.

4. The directed energy deposition method of claim 1, wherein the forming the pre-bent substrate further comprises:

directing a cooling gas toward the melting tracks using a gas jet device to accelerate cooling of the melting track, wherein directing the cooling gas toward the melting tracks forms a thermal gradient in the substrate, and imparts a residual stress in the substrate upon cooling.

5. The directed energy deposition method of claim 4, wherein:

the cooling gas comprises an inert gas selected from among argon, helium, neon, xenon, krypton and combinations thereof; and the cooling gas is applied at a temperature 100° C. or less.

6. The directed energy deposition method of claim 1, wherein the ceramic coating is disposed on the curved surface of the second side of the curved clamping mold.

7. The directed energy deposition method of claim 1, wherein:

(a) the ceramic coating comprises zirconium dioxide, zirconium dioxide stabilized by addition of yttrium oxide, yttrium aluminum oxide, alkaline earth metal silicates, $ZrV_2O_7$, $Mg_3(VO_4)_2$ or a combination thereof; or (b) the ceramic coating comprises $ZrO_28Y_2O_3$; or (c) the ceramic coating has a thickness of 0.1 mm to about 5 mm; or (d) any combination of (a), (b) and (c).

8. The directed energy deposition method of claim 1, further comprising:

pre-heating the pre-bent substrate prior to forming the metal workpiece while secured to the jig to a temperature of about 400° C. to about 900° C. by applying thermal energy to the second side of the substrate.

9. The directed energy deposition method of claim 1, wherein the forming the metal workpiece comprises:

melting a metal feedstock to deposit a layer of molten metal on the substrate to form a base material; and depositing subsequent layers of molten metal on the base material to form the workpiece.

10. A directed energy deposition method for producing a metal workpiece, the method comprising:

providing a pre-bent substrate;

providing a curved clamping mold;

supporting the pre-bent substrate on the curved clamping mold;

securing the pre-bent substrate and the curved clamping mold to a jig; and forming the metal workpiece on a surface of the substrate by an additive manufacturing process that comprises melting a metal feedstock to deposit a layer of molten metal on the surface of the substrate to form a base material and deposits subsequent layers of molten metal on the base material to form the metal workpiece.

11. The directed energy deposition method of claim 10, wherein the curved clamping mold comprises:

a first side comprising two or more cavities separated by a stiffening member and a rim having a flat surface around a perimeter of the first side;

a second side opposite of the first side, the second side having a curved surface and comprising knurls or corrugations on the second side; and a ceramic coating formed on the second side.

12. The directed energy deposition method of claim 10, further comprising forming the pre-bent substrate, the forming the pre-bent substrate comprising:

applying, using a melting tool, thermal energy to a surface of a metallic substrate to form melting tracks on the surface; and bending the metallic substrate to form the pre-bent substrate.

13. The directed energy deposition method of claim 12, wherein:

during applying the thermal energy, an area of application of the thermal energy reaches a temperature that is from about 50° C. less than to about 50° C. greater than the melting point of the metal material, and formation of the melting tracks results in formation of tensile stress at a centerline of each of the melting tracks and formation of a compressive stress in an area away from the centerline of each of melting tracks upon cooling of the substrate.

14. The directed energy deposition method of claim 12, wherein the forming the pre-bent substrate further comprises:

directing a cooling gas toward the melting tracks using a gas jet device to accelerate cooling of the melting tracks, wherein directing the cooling gas toward the melting tracks forms a thermal gradient in the substrate, and imparts a residual stress in the substrate upon cooling.

15. The directed energy deposition method of claim 14, wherein:

the cooling gas comprises an inert gas selected from among argon, helium, neon, xenon, krypton and combinations thereof; and the cooling gas is applied at a temperature 100° C. or less.

16. The directed energy deposition method of claim 12, the forming the pre-bent substrate further comprising:

determining centerlines of walls of a preform to be formed on the metallic substrate; and positioning the melting tracks on a surface of the substrate opposite the preform from about 10 mm to about 20 mm away from the centerlines of the walls of the preform.

17. The directed energy deposition method of claim 12, the forming the pre-bent substrate further comprising:

forming a majority of the melting lines on the first surface at one or more locations other than those corresponding to one or more areas occupied by of one or more walls of the workpiece to be formed on the second side of the substrate.

18. The directed energy deposition method of claim 10, further comprising:

pre-heating the pre-bent substrate prior to forming the metal workpiece to a temperature of about 400° C. to about 900° C. by applying thermal energy to the pre-bent substrate.

19. The directed energy deposition method of claim 1, wherein the forming the metal workpiece comprises:

melting a metal feedstock to deposit a layer of molten metal on the pre-bent substrate to form a base material; and depositing subsequent layers of molten metal on the base material to form the workpiece.

20. The directed energy deposition method of claim 19, wherein the forming the metal workpiece comprises:

providing the metal feedstock in the form of a wire;

using a single melting tool to heat and melt the wire such that molten metallic material is deposited onto an area of the substrate to form the base material; and moving the base material relative to a position of the melting tool in a predetermined pattern such that successive deposits of the molten metallic material onto the base material solidifies and forms the three-dimensional object.

* * * * *